United States Patent
Edge et al.

(10) Patent No.: US 9,119,167 B2
(45) Date of Patent: Aug. 25, 2015

(54) GENERIC BROADCAST OF LOCATION ASSISTANCE DATA

(75) Inventors: Stephen William Edge, Escondido, CA (US); Sven Fischer, Nuremberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 77 days.

(21) Appl. No.: 13/598,549

(22) Filed: Aug. 29, 2012

(65) Prior Publication Data

US 2013/0252630 A1 Sep. 26, 2013

Related U.S. Application Data

(60) Provisional application No. 61/529,202, filed on Aug. 30, 2011, provisional application No. 61/549,160, filed on Oct. 19, 2011, provisional application No. 61/586,737, filed on Jan. 13, 2012, provisional (Continued)

(51) Int. Cl.
*H04W 64/00* (2009.01)
*H04W 12/04* (2009.01)

(Continued)

(52) U.S. Cl.
CPC .............. *H04W 64/00* (2013.01); *G01S 19/05* (2013.01); *G01S 19/25* (2013.01); *H04L 9/0637* (2013.01);

(Continued)

(58) Field of Classification Search
CPC ... G01S 19/05; H04L 2209/80; H04L 9/0637; H04L 9/3249; H04W 12/04; H04W 12/10; H04W 4/02; H04W 4/06; H04W 4/20; H04W 64/00

USPC .................... 455/414.1, 466, 575.1
See application file for complete search history.

(56) References Cited

U.S. PATENT DOCUMENTS 6,313,787 B1 11/2001 King et al.
8,463,294 B2 6/2013 Kone
(Continued)

FOREIGN PATENT DOCUMENTS

CN 101888587 A 11/2010
JP 2001208825 A 8/2001
(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 9)", 3GPP Standard; 3GPP TS 36.355, 3rd Generation Partnership Project (3GPP), Mobile Competence Centre; 650, Route Des Lucioles; F-06921 Sophia-Anti Polis Cedex; France, No. V9.2.1, Jun. 22, 2010, pp. 1-112, XP050441988, (retrieved on Jun. 22, 2010).

(Continued)

*Primary Examiner* — Kashif Siddiqui
(74) *Attorney, Agent, or Firm* — Kilpatrick Townsend & Stockton LLP

(57) ABSTRACT

Various techniques are provided for Location Services (LCS) Assistance Data broadcast, for example for implementation in LTE and LTE-A systems. The embodiments described herein may use the LPP/LPPe positioning protocol, by making use of existing unsolicited Provide Assistance Data (PAD) messages. Embodiments avoid the need to define and implement a separate broadcast Assistance Data protocol. Additional exemplary embodiments for scheduling and verifying of the broadcast Assistance Data messages are described herein.

47 Claims, 34 Drawing Sheets

Related U.S. Application Data application No. 61/606,993, filed on Mar. 6, 2012, provisional application No. 61/686,619, filed on Apr. 6, 2012, provisional application No. 61/621,466, filed on Apr. 7, 2012, provisional application No. 61/664,119, filed on Jun. 25, 2012.

(51) Int. Cl.

| | | |
|---|---|---|
| *H04W 12/12* | (2009.01) | |
| *H04W 4/00* | (2009.01) | |
| *H04W 4/20* | (2009.01) | |
| *H04W 4/02* | (2009.01) | |
| *H04L 9/06* | (2006.01) | |
| *H04L 9/32* | (2006.01) | |
| *H04W 12/10* | (2009.01) | |
| *H04W 4/06* | (2009.01) | |
| *G01S 19/05* | (2010.01) | |
| *G01S 19/25* | (2010.01) | |

(52) U.S. Cl.
CPC .............. *H04L 9/3249* (2013.01); *H04W 4/06* (2013.01); *H04W 4/20* (2013.01); *H04W 12/04* (2013.01); *H04W 12/10* (2013.01); *H04L 2209/80* (2013.01); *H04W 4/02* (2013.01)

(56) References Cited

U.S. PATENT DOCUMENTS

| | | | |
|---|---|---|---|
| 2005/0272405 A1 | 12/2005 | Tomlinson et al. | |
| 2005/0272439 A1* | 12/2005 | Picciriello et al. | 455/456.1 |
| 2007/0049344 A1 | 3/2007 | Van Der Velde et al. | |
| 2007/0120737 A1 | 5/2007 | Moilanen et al. | |
| 2007/0257838 A1* | 11/2007 | Cheng | 342/357.15 |
| 2008/0182592 A1 | 7/2008 | Cha et al. | |
| 2008/0242373 A1* | 10/2008 | Lu et al. | 455/575.1 |
| 2009/0061898 A1 | 3/2009 | Johnson et al. | |
| 2009/0208001 A1 | 8/2009 | Kent, Jr. et al. | |
| 2009/0253422 A1 | 10/2009 | Fischer | |
| 2010/0090822 A1 | 4/2010 | Benson et al. | |
| 2010/0167746 A1 | 7/2010 | Lee et al. | |
| 2010/0232362 A1 | 9/2010 | Tenny | |
| 2010/0283677 A1 | 11/2010 | Halivaara | |
| 2011/0032859 A1 | 2/2011 | Wirola et al. | |
| 2011/0039577 A1 | 2/2011 | Stern-Berkowitz et al. | |
| 2011/0081884 A1 | 4/2011 | Sennett et al. | |
| 2011/0212733 A1 | 9/2011 | Edge et al. | |
| 2012/0252492 A1* | 10/2012 | Chien | 455/456.2 |
| 2013/0033999 A1* | 2/2013 | Siomina et al. | 370/252 |
| 2013/0223626 A1 | 8/2013 | Edge et al. | |
| 2013/0225185 A1 | 8/2013 | Edge et al. | |
| 2013/0237247 A1 | 9/2013 | Lee et al. | |
| 2013/0305053 A1 | 11/2013 | Laffey | |

FOREIGN PATENT DOCUMENTS

| | | |
|---|---|---|
| JP | 2006058178 A | 3/2006 |
| WO | 2008084382 A2 | 7/2008 |
| WO | 2010105213 A1 | 9/2010 |
| WO | 2011069555 A1 | 6/2011 |

OTHER PUBLICATIONS

Open Mobile Alliance: "OMA-RD-LPPe-V1_0-20110628-C," LPP Extensions Requirements Candidate Version 1.0, Jun. 28, 2011, pp. 1-25.

International Search Report and Written Opinion—PCT/US2012/053238—ISA/EPO—Mar. 22, 2013.

Orange et al., "A-GNSS in UTRAN", 3GPP Draft; R2-070907 GNSS in Utran, 3rd Generation Partnership Project (3GPP), Mobile Competence Centre; 650, Route Des Lucioles; F-06921 Sophia-Antipolis Cedex; France, vol. RAN WG2, No. St. Louis, USA; Feb. 20, 2007, XP050133921.

Qualcomm Europe; "Anticipated Impact on RAN2/3 Specifications of LTE Positioning Work lte", 3GPP Draft; R3-090703, 3rd Generation Partnership Project (3GPP), Mobile Competence Centre; 650, Route Des Lucioles; F-06921 Sophia-Antipolis Cedex; France, No. Seoul, Korea; Mar. 18, 2009, XP050341090.

3rd Generation Partnership Project; Technical Specification Group Services and System Aspects; Telecommunication management; Charging management; Location Services (LCS) charging (Release 10), 3GPP Standard; 3GPP TS 32.271, 3rd Generation Partnership Project (3GPP), Mobile Competence Centre ; 650, Route Des Lucioles ; F-06921 Sophia-Antipolis Cedex ; France, No. V10.0.0, Dec. 30, 2010 , pp. 1-26, XP050462465, [retrieved on Dec. 30. 2010].

Partial International Search Report—PCT/US2012/053238—ISA/EPO—Dec. 20, 2012.

T1P1 5: "Modifications to support broadcast of GPS assistance data", 3GPP Draft; S2-000275, 3rd Generation Partnership Project (3GPP), Mobile Competence Centre ; 650, Route Des Lucioles ; F-06921 Sophia-Antipolis Cedex ; France, vol. SA WG2, no. Puerto Vallarta, Mexico; Feb. 4, 2000, XP050232729, [retrieved on Feb. 4, 2000].

Open Mobile Alliance, "LPP Extensions Specification," Candidate Version 1.0, Jun. 28, 2011, OMA-TS-LPPe-V1_0-20110628-C, pp. 1-280.

3GPP TS 36.305: "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN", Version 10.2.0, Release 10, Jun. 2011, pp. 51.

3GPP TS 36.355: "3rd Generation Partnership Project; Technical Specification Group Radio Access Network; Evolved Universal Terrestrial Radio Access (E-UTRA); LTE Positioning Protocol (LPP)", Version 10.2.0, Release 10, Jun. 2011, pp. 114.

3GPP TS 44.035: "Digital Cellular Telecommunications System (Phase 2+); Location Services (LCS); Broadcast Network Assistance for Enhanced Observed Time Difference (E-OTD) and Global Positioning System (GPS) Positioning Methods," ETSI TS 144 035, Version 10.0.0, Release 10, Apr. 2011, pp. 36.

\* cited by examiner

*LPP Assistance Data Restrictions and Labels*

| Label | ASN.1 Assistance Data Type | Area Limitation | Other Restrictions |
|---|---|---|---|
| 1 | commonIEsProvideAssistanceData | None | None |
| 2 | otdoa-ProvideAssistanceData | | |
| > 1 | > otdoa-ReferenceCellInfo | Limited to the area served by the provided neighbor cells and reference cell | |
| > 2 | > otdoa-NeighbourCellInfo | Limited to the area served by the provided neighbor cells and reference cell | expectedRSTD may refer to a UE at the midpoint between the reference cell and neighbor cell eNodeB antenna locations. expectedRSTD-Uncertainty may allow for a target at any location where the neighbor and reference cells can both be measured. |
| 3 | a-gnss-ProvideAssistanceData | | |
| > 1 | > gnss-CommonAssistData | | |
| >> 1 | >> gnss-ReferenceTime | Limited to the area served by the provided cells (up to 16) if GNSS-cell time is included. No restriction otherwise. | GNSS-cell time association, if provided for any cell, applies to the antenna location for the cell |
| >> 2 | >> gnss-ReferenceLocation | None | The location uncertainty ellipsoid may encompass the area within which this assistance data may broadcast |
| >> 3 | >> gnss-IonosphericModel | None | None |
| >> 4 | >> gnss-EarthOrientationParameters | None | None |
| > 2 | > gnss-GenericAssistData | | |
| >> N | >> gnss-ID / sbas-ID | | The label N indicates the GNSS or SBAS system as follow: N=1: GPS N=2: QZSS N=3: Galileo N=4: Glonass N=5: WAAS N=6: EGNOS N=7: MSAS N=8: GAGAN |
| >>> 1 | >>> gnss-TimeModels | None | None |
| >>> 2 | >>> gnss-DifferentialCorrections | None | None |
| >>> 3 | >>> gnss-NavigationModel | None | None |

FIG. 16A

*LPP Assistance Data Restriction and Labels - Continued*

| >>> 4 | >>> gnss-RealTimeIntegrity | None | None |
|---|---|---|---|
| >>> 5 | >>> gnss-DataBitAssistance | None | None |
| >>> 6 | >>> gnss-AcquisitionAssistance | It may be recommended to limit this data type to an area of 100 miles across or less | The server may ensure that the data is valid for all locations at which it may be received (e.g. by providing suitable values for Doppler uncertainty and Code Phase search window). |
| >>> 7 | >>> gnss-Almanac | None | None |
| >>> 8 | >>> gnss-UTC-Model | None | None |
| >>> 9 | >>> gnss-AuxiliaryInformation | None | None |

FIG. 16B

*LPPe Assistance Data Restrictions and Labels*

| Label | ASN.1 Assistance Data Type | Area Limitation | Other Restrictions |
|---|---|---|---|
| 1 | commonIEsProvideAssistanceData | None | None |
| > 1 | > assistanceContainerList | Any area limitation is specific to the type of proprietary assistance data | checkOrUpdateOrError may not be included<br><br>dataResult may contain OMA-LPPe-AssistanceContainerData |
| > 2 | > providePeriodicADwithUpdate | Any area limitation is specific to the type of assistance data | |
| > 3 | > segmentedADTransfer | | Not used in this version of LPPe. A target may ignore this parameter if included by a server. |
| > 4 | > default-reference-point | None | None |
| > 5 | > localCellInformation | Limited to the area served by the provided cells. | GNSS-cell time association, if provided for any cell, applies to the antenna location for the cell |
| 2 | agnss-ProvideAssistanceData | | |
| > 1 | > commonAssistData | | |
| >> 1 | >> ionosphericModel | None | None |
| >> 2 | >> tropoSphereModel | None | None |
| >> 3 | >> altitudeAssistance | None | None |
| >> 4 | >> solarRadiation | None | None |
| >> 5 | >> ccpAssistCommonProvide | Limited to a geographic area supported by the provided reference stations. | |
| > 2 | > genericAssistData | | |
| >> N | >> gnss-ID | | The label N indicates the GNSS or SBAS system as follow:<br><br>N=1: GPS<br><br>N=2: QZSS<br><br>N=3: Galileo<br><br>N=4: Glonass |
| >>> 1 | >>> wideAreaIonoSurfacePerSVlist | None | None |
| >>> 2 | >>> mechanicsForAllSVs | None | None |
| >>> 3 | >>> dcbsForAllSVs | None | None |
| >>> 4 | >>> navModelDegradationModel | None | None |
| >>> 5 | >>> ccpAssistProvide | Limited to a geographic area supported by the provided reference | |

FIG. 16C

*LPPe Assistance Data Restrictions and Labels – Continued*

| | | | stations. |
|---|---|---|---|
| >>> 6 | >>> navModelList | None | None |
| 3 | otdoa-ProvideAssistanceData | | |
| > 1 | > otdoa-ReferenceCellInfo | Limited to the area served by the neighbor cells and reference cell | None |
| > 2 | > otdoa-NeighbourCellInfo | Limited to the area served by the neighbor cells and reference cell | expectedRSTD may refer to a target at the midpoint between the reference cell and neighbor cell eNodeB antenna locations. expectedRSTD-Uncertainty may allow for a target at any location where the neighbor and reference cells can both be measured. |
| 4 | eotd-ProvideAssistanceData | | |
| > 1 | > referenceBTS | Limited to the area served by the provided neighbor cells and reference cell | None |
| > 2 | > msrAssistDataList | Limited to the area served by the provided neighbor cells and reference cell | expectedOTD may refer to a target at the midpoint between the reference BTS and neighbor BTS antenna locations. expOTDUncertainty may allow for a target at any location where the neighbor and reference BTSs can both be measured. |
| > 3 | > systemInfoAssistDataList | Limited to the area served by the provided neighbor cells and reference cell | expectedOTD may refer to a target at the midpoint between the reference BTS and neighbor BTS antenna locations. expOTDUncertainty may allow for a target at any location where the neighbor and reference BTSs can both be measured. |
| 5 | otdoa-utra-ProvideAssistanceData | | |
| > 1 | > referenceCellInfo | Limited to the area served by the provided neighbor cells and reference cell | roundTripTime and roundTripTimeExtension may not be included and may be ignored by a target if included. |
| > 2 | > neigborCellList | Limited to the area served by the provided neighbor cells and reference cell | searchWindowSize may allow for a target at any location where the reference and neighbor cells can both be measured. roundTripTime and roundTripTimeExtension may not be included and may be ignored |

FIG. 16D

*LPPe Assistance Data Restrictions and Labels - Continued*

| | | | by a target if included. |
|---|---|---|---|
| 6 | ecid-lte-ProvideAssistanceData | | |
| > 1 | > ecid-LTE-NetworkData | Limited to the area served by the provided eNBs and HeNBs | None |
| 7 | ecid-gsm-ProvideAssistanceData | | |
| > 1 | > ecid-gsm-NetworkData | Limited to the area served by the provided BTSs | |
| 8 | ecid-utra-ProvideAssistanceData | | |
| > 1 | > ecid-UTRA-NetworkData | Limited to the area served by the provided Node Bs and HNBs | None |
| 9 | wlan-ap-ProvideAssistanceData | | |
| > 1 | > wlan-DataSet | Limited to the area served by the provided WLAN APs | None |
| 10 | sensor-ProvideAssistanceData | None | None |
| 11 | srn-ProvideAssistanceData | | |
| > 1 | > srnGroup | Limited to the area served by the provided SRNs | May provide srnGroupList and may not provide srnGroupUpdateResponse |
| > 2 | > antennaPattern | Limited to the area served by the referenced SRNs | None |

FIG. 16E

*OMA-LPPe-ver1-1-BroadcastContainer*

| Parameter Name | Assistance Data Type | Optional | Description |
|---|---|---|---|
| digitalSignature | OMA-LPPe-ver1-1-DigitalSignature | Optional | Contains a digital signature for the octet string composing the messageContents. This parameter is included only when a UE needs to authenticate the message contents. However, the parameter may be mandatory present if the IE digitalSignature is included to protect against replay attacks. Otherwise, the field is optional. |
| >authenticationSetID | OMA-LPPe-ver1-1-AuthenticationSetID | | Identifies the public key authentication set to be used to authenticate the signature as an integer between 0-255. The IE OMA-LPPe-ver1-1-AuthenticationSet defines an authentication set comprising an authentication ID, an RSA public key value and a salt length for encoding. |
| >signature | BIT STRING (SIZE (2048)) | | The digital signature to be authenticated |
| messageContents | OCTET STRING (messageContents) | | Contains the broadcast assistance data and control parameters in the form of an octet string. |
| >Broadcast Message | OMA-LPPe-ver1-1-BroadcastMessage | | |
| >>broadcastControlIEs | OMA-LPPe-ver1-1-BroadcastControlIEs | | Provides the following parameters applicable to broadcast of an LPP or LPPe Provide Assistance Data message. |
| >>>serverID | OMA-LPPe-ver1-1-ServerID | | Defines the identity of the server that broadcast the message. This parameter is mandatory. |
| >>>>provider-ID | OMA-LPPe-VendorOrOperatorID | | Defines the vendor or operator ID. |
| >>>>server-ID | OCTET STRING (SIZE(4)) | | Defines the server ID for the particular vendor or operator. |
| >>>messageID | OCTET STRING (SIZE (4)) | Optional | Defines a message ID unique to the server. When included this parameter can be used to identify receipt of a duplicate message. |
| >>>validity-time | OMA-LPPe-ValidityPeriod | Optional | Defines the validity time for the broadcast assistance data. This parameter is conditional upon digitalsignature. |
| >>>validity-area | OMA-LPPe-ValidityArea | Optional | Defines the valid geographic area for the broadcast assistance data. |
| >>>broadcastAD Types | OMA-LPPe-ver1-1-BroadcastADTypes | Optional | Provides a list of the assistance data types in the message referred to by their labels. |
| >>>>lppLabels | SEQUENCE (SIZE (1..maxLPPLabelSets)) OF OMA-LPPe-ver1-1-LabelSet | | These parameters define the LPP/LPPe label set representing assistance data types for LPP/LPPe and use the data type OMA-LPPe-ver1-1-LabelSet. OMA-LPPe-ver1-1-LabelSet parameter defines a label subset containing labels that differ only in their last elements. This parameter contains the following fields: Level1-element-value defines the common first (level 1) element for each label in the label subset. This field may be included when defining labels at nesting level 2 or higher. Level2-element-value defines the common second (level 2) element for each label in the label subset. This field may be included when defining labels at nesting level 3 or higher. Level3-element-value defines the common third (level 3) element for each label in the label subset. This field may be included when defining labels at nesting level 4. LastElements defines the final elements for the labels in the label subset using a bit string where a one value at bit position n (n = 1 to 32) indicates that element n is present and a zero value or absence of bit n indicates the element is absent. AdditionalElements in the case that the labels specified by the preceding fields can be suffixed with additional elements to |
| >>>>lppeLabels | SEQUENCE (SIZE (1..maxLPPeLabelSets)) OF OMA-LPPe-ver1-1-LabelSet | | |

FIG. 17A

*OMA-LPPe-ver1-1-BroadcastContainer - Continued*

| | | | |
|---|---|---|---|
| | | | create further valid labels, this field specifies whether none or all of these further labels are to be included in the final label set (and thus whether none or all of the associated data items are to be included in the set S). If this field is not included and if further label subsets do not indicate which of the further labels are to be included and not included, the inclusion of the further labels is undefined in any context where the associated assistance data types refer to target capabilities or broadcast system support. This field may not be included when the further labels are specified in additional label subsets.<br>To enable forward compatibility with later versions of LPP and LPPe, a receiver may ignore any labels containing elements values that it does not recognize and may act as if these labels were not included. |
| >>cipheringIEs | OMA-LPPe-ver1-1-CipheringIEs | Optional | Included only if ciphering is used. The parameter contains the following fields |
| >>>CipherSetID | OMA-LPPe-ver1-1-CipherSetID | | The IE OMA-LPPe-ver1-1-CipherSetID uniquely identifies a cipher set comprising a ciphering key value and first component c0 for the initial ciphering counter C1. A server may not reuse a particular cipher set ID for a new cipher set for a predetermined period (e.g., 24 hrs) following usage for the last broadcast for a previous cipher set. |
| >>>D0 | BIT STRING (SIZE (1..128)) | | Provides the second component for the initial ciphering counter C1. This field is defined as a bit string with a length of 1 to 128 bits. A UE may first pad out the bit string if less than 128 bits with zeroes in more significant bit positions to achieve 128 bits. C1 is then obtained from d0 and c0 (defined by the cipherSetID) as:<br>C1 = (d0 + c0) mod 2**128    (with all values treated as non-negative integers) |
| >>broadcastMessage | OCTET STRING (broadcastMessage) | | Contains either a ciphered or unciphered LPP or LPP/LPPe Provide Assistance Data message. Ciphering is used when the parameter cipheringIEs is included. |

FIG. 17B

OMA-LPPe-CommonIEsRequestCapabilities

| Parameter Name | Assistance Data Type | Optional | Description |
|---|---|---|---|
| ver1-1-broadcast-ReqCapabilities | OMA-LPPe-ver1-1-broadcast-ReqCapabilities | Optional | Included by a server to request the UE capabilities to support reception of assistance data via broadcast. A server may indicate that it wishes to receive capabilities for certain broadcast systems. In this case, a UE may return its capabilities only for the requested broadcast systems. If the server does not indicate particular broadcast systems, a UE should report its capabilities for standard broadcast systems and may report its capabilities for proprietary broadcast systems. |
| >broadcastSystems | SEQUENCE (SIZE (1..16)) OF OMA-LPPe-ver1-1-BroadcastSystemID | Optional | A server may indicate that it wishes to receive capabilities for certain broadcast systems via this field |
| >>standardSystemID | INTEGER (1..16) | Optional | This field identifies a standardized broadcast system using an integer between 1 and 16. |
| >>proprietarySystemID | | Optional | This field identifies a broadcast system that is proprietary to a particular vendor or operator. Assignments may be made by the particular vendor or operator. |
| >>>vendorOrOperator | OMA-LPPe-VendorOrOperatorID | | Included to identify vendor-/operator-specific assistance data. A VendorOrOperatorID may be used to identify the vendor/operator using the proprietary data content. In one method, the vendor/operator identifier may be standardized. The alternative method may be to use a generalized method based on the CRC sum of the vendor/operator name. |
| >>>proprietarySystemID | INTEGER (1..16) | | This field identifies a broadcast system that is proprietary to a particular vendor or operator. |

FIG. 18

*OMA-LPPe-CommonIEsProvideCapabilities*

| Parameter Name | Assistance Data Type | Optional | Description |
|---|---|---|---|
| ver1-1-broadcast-ProvideCapabilities | OMA-LPPe-ver1-1-broadcast-ProvideCapabilities | Optional | Included by a UE to provide its capabilities to receive assistance data via broadcast. |
| >broadcastSystemID | OMA-LPPe-ver1-1-BroadcastSystemID | | Specifies a particular broadcast system that is supported by a UE. |
| >>standardSystemID | INTEGER (1..16) | | Identifies a standardized broadcast system using an integer between 1 and 16. Assignments may be unique and agreed upon by a standards board, such as OMA. |
| >>proprietarySystemID | | | This field identifies a broadcast system that is proprietary to a particular vendor or operator. Assignments may be made by the particular vendor or operator. |
| >>>vendorOrOperator | OMA-LPPe-VendorOrOperatorID | | Included to identify vendor-/operator-specific assistance data. A VendorOrOperatorID may be used to identify the vendor/operator using the proprietary data content. In one method, the vendor/operator identifier may be standardized. The alternative method may be to use a generalized method based on the CRC sum of the vendor/operator name. |
| >>>proprietarySystemID | INTEGER (1..16) | | Identifies a broadcast system that is proprietary to a particular vendor or operator. |
| >broadcastADTypes | OMA-LPPe-ver1-1-BroadcastADTypes | Optional | Specifies the types of assistance data a UE can receive via broadcast using a particular broadcast system. |
| >>lppLabels | SEQUENCE (SIZE (1..maxLPPLabelSets)) OF OMA-LPPe-ver1-1-LabelSet | | These parameters define the LPP/LPPe label set representing assistance data types for LPP and LPPe and use the data type OMA-LPPe-ver1-1-LabelSet. OMA-LPPe-ver1-1-LabelSet parameter defines a label subset containing labels that differ only in their last elements. This parameter contains the following fields:<br>Level1-element-value defines the common first (level 1) element for each label in the label subset. This field may be included when defining labels at nesting level 2 or higher.<br>Level2-element-value defines the common second (level 2) element for each label in the label subset. This field may be included when defining labels at nesting level 3 or higher.<br>Level3-element-value defines the common third (level 3) element for each label in the label subset. This field may be included when defining labels at nesting level 4.<br>LastElements defines the final elements for the labels in the label subset using a bit string where a one value at bit position n (n = 1 to 32) indicates that element n is present and a zero value or absence of bit n indicates the element is absent.<br>AdditionalElements in the case that the labels specified by the preceding fields can be suffixed with additional elements to create further valid labels, this field specifies whether none or all of these further labels are to be included in the |
| >>lppeLabels | SEQUENCE (SIZE (1..maxLPPeLabelSets)) OF OMA-LPPe-ver1-1-LabelSet | | |

FIG. 19A

OMA-LPPe-CommonIEsProvideCapabilities – Continued

| | | | |
|---|---|---|---|
| | | | final label set (and thus whether none or all of the associated data items are to be included in the set S). If this field is not included and if further label subsets do not indicate which of the further labels are to be included and not included, the inclusion of the further labels is undefined in any context where the associated assistance data types refer to target capabilities or broadcast system support. This field may not be included when the further labels are specified in additional label subsets.<br>To enable forward compatibility with later versions of LPP and LPPe, a receiver may ignore any labels containing elements values that it does not recognize and may act as if these labels were not included. |
| >point2pointAD | OMA-LPPe-ver1-1-point2pointAD | Optional | Included when a UE can support receipt of assistance data sent point to point that provides information on a broadcast system used by the server. |
| >ciphering | OMA-LPPe-ver1-1-Ciphering | Optional | Included when the UE supports ciphering of LPP/LPPe broadcast messages. Absence of this parameter may imply that a UE does not support ciphering. |
| >authentication | OMA-LPPe-ver1-1-Authentication | Optional | Included when the UE supports authentication of LPP/LPPe broadcast messages. Absence of this parameter may imply that a UE does not support authentication. |

FIG. 19B

OMA-LPPe-CommonIEsRequestAssistanceData

| Parameter Name | Assistance Data Type | Optional | Description |
|---|---|---|---|
| ver1-1-BroadcastAssistanceDataReq | OMA-LPPe-ver1-1-BroadcastAssistanceDataReq | | Included by the UE to request assistance data associated with broadcast of AD. The UE may include information related to a particular broadcast system and the server may return information for that broadcast system if supported, including an updated cipher sets for a UE that supports ciphering and if UE is authorized to receive according to a subscription or service agreement. If the UE does not specify a broadcast system, the server may return information for any supported broadcast system consistent with the UE capabilities, location and serving network |
| >broadcastSystem | OMA-LPPe-ver1-1-BroadcastSystem | Optional | Identifies a particular broadcast system. A UE may include the IDs for the most recent list of cipher sets and/or authentication sets previously received from the server for this broadcast system if any of the cipher sets and/or authentication sets, respectively, are currently being used (e.g. have not yet expired). A server may use the list to deduce service previously provided to the UE without the need to keep records that may assist charging for the service |
| >>broadcastSystemID | OMA-LPPe-ver1-1-BroadcastSystemID | | Defines a specific broadcast system |
| >>>standardSystemID | INTEGER (1..16) | Optional | Identifies a standardized broadcast system using an integer between 1 and 16. Assignments may be unique and agreed upon by a standards board, such as OMA. |
| >>>proprietarySystemID | | Optional | This field identifies a broadcast system that is proprietary to a particular vendor or operator. Assignments may be made by the particular vendor or operator. |
| >>>>vendorOrOperator | OMA-LPPe-VendorOrOperatorID | | Included to identify vendor-/operator-specific assistance data. A VendorOrOperatorID may be used to identify the vendor/operator using the proprietary data content. In one method, the vendor/operator identifier may be standardized. The alternative method may be to use a generalized method based on the CRC sum of the vendor/operator name. |
| >>>>proprietarySystemID | INTEGER (1..16) | | Identifies a broadcast system that is proprietary to a particular vendor or operator. |
| >>cipherSets | SEQUENCE (SIZE (1..16)) OF OMA-LPPe-ver1-1-CipherSetID | Optional | Applies to encapsulated mode and provides a list of 1 to 16 cipher sets each containing information relevant to ciphering for some or all assistance data being broadcast using a particular broadcast system. Cipher set may refer to ongoing |

FIG. 20A

*OMA-LPPe-CommonIEsRequestAssistanceData - Continued*

| | | | |
|---|---|---|---|
| | | | ciphering or to ciphering that is scheduled for a later time as well as to ciphering applicable to the UE location or to other locations. A UE that supports ciphering may request new assistance data from a server when it detects use of a cipher set by the server that it does not possess. To avoid periods when a UE does not have the right cipher set, a UE may request new broadcast AD once it detects that a particular cipher set used previously has not been used for a period of one hour. |
| >>authenticationSets | SEQUENCE (SIZE(1..4)) OF OMA-LPPe-ver1-1-AuthenticationSetID | Optional | Provides a list of 1 to 4 authentication sets each containing information relevant to authentication for some or all AD being broadcast using a particular broadcast system. A UE that supports authentication may request new AD from a server for any broadcast system for which authentication when it detects use of an authentication set by the server that it does not possess. To avoid periods when a UE does not have the right authentication set, a UE may request new broadcast AD once it detects that a particular authentication set used previously has not been used for a period (e.g. 1 hr). |

FIG. 20B

*OMA-LPPe-CommonIEsProvideAssistanceData*

| Parameter Name | Assistance Data Type | Optional | Description |
|---|---|---|---|
| ver1-1-BroadcastAssistanceData | OMA-LPPe-ver1-1—BroadcastAssistanceData | Optional | Provides information on assistance data available via broadcast for a particular broadcast system. The following information can be included. |
| >broadcastSystem | OMA-LPPe-ver1-1-BroadcastSystemID | | The broadcast system for which information is provided |
| >>standardSystemID | INTEGER (1..16) | Optional | Identifies a standardized broadcast system using an integer between 1 and 16. Assignments may be unique and agreed upon by a standards board, such as OMA. |
| >>proprietarySystemID | | Optional | This field identifies a broadcast system that is proprietary to a particular vendor or operator. Assignments may be made by the particular vendor or operator. |
| >>>vendorOrOperator | OMA-LPPe-VendorOrOperatorID | | Included to identify vendor-/operator-specific assistance data. A VendorOrOperatorID may be used to identify the vendor/operator using the proprietary data content. In one method, the vendor/operator identifier may be standardized. The alternative method may be to use a generalized method based on the CRC sum of the vendor/operator name. |
| >>>proprietarySystemID | INTEGER (1..16) | | This field identifies a broadcast system that is proprietary to a particular vendor or operator. |
| >accessNetworks | SEQUENCE (SIZE (1..16)) OF OMA-LPPe-ver1-1-AccessNetworkID. | | The access network or networks supporting this broadcast system in the vicinity of the UE |
| >coverageArea | CHOICE { Circle-Ellipsoid-PointWithUncertaintyCircle, ellipse-EllipsoidPointWithUncertaintyEllipse, Polygon -Polygon....} | Optional | Provides a continuous broadcast coverage area that includes or is close to the location of the UE |
| >broadcastADTypes | OMA-LPPe-ver1-1-BroadcastADTypes | Optional | ver1-1-broadcastADTypes - the types of assistance data being broadcast |

FIG. 21A

*OMA-LPPe-CommonIEsProvideAssistanceData - Continued*

| | | | |
|---|---|---|---|
| >>lppLabels | SEQUENCE (SIZE (1..maxLPPLabelSets)) OF OMA-LPPe-ver1-1-LabelSet | | These parameters define the LPP/LPPe label set representing assistance data types for LPP/LPPe and use the data type OMA-LPPe-ver1-1-LabelSet. OMA-LPPe-ver1-1-LabelSet parameter defines a label subset containing labels that differ only in their last elements. This parameter contains the following fields: Level1-element-value defines the common first (level 1) element for each label in the label subset. This field may be included when defining labels at nesting level 2 or higher. Level2-element-value defines the common second (level 2) element for each label in the label subset. This field may be included when defining labels at nesting level 3 or higher. |
| >>lppeLabels | SEQUENCE (SIZE (1..maxLPPeLabelSets)) OF OMA-LPPe-ver1-1-LabelSet | | Level3-element-value defines the common third (level 3) element for each label in the label subset. This field may be included when defining labels at nesting level 4. LastElements defines the final elements for the labels in the label subset using a bit string where a one value at bit position n (n = 1 to 32) indicates that element n is present and a zero value or absence of bit n indicates the element is absent. AdditionalElements in the case that the labels specified by the preceding fields can be suffixed with additional elements to create further valid labels, this field specifies whether none or all of these further labels are to be included in the final label set (and thus whether none or all of the associated data items are to be included in the set S). If this field is not included and if further label subsets do not indicate which of the further labels are to be included and not included, the inclusion of the further labels is undefined in any context where the associated assistance data types refer to target capabilities or broadcast system support. This field may not be included when the further labels are specified in additional label subsets. To enable forward compatibility with later versions of LPP and LPPe, a receiver may ignore any labels containing elements values that it does not recognize and may act as if these labels were not included |
| >broadcastMode | CHOICE (unencapsulated NULL, encapsulated OMA-LPPe-ver1-1-EncapsulatedMode, ...} | | Identifies whether unencapsulated or encapsulated LPP and LPP/LPPe messages are broadcast |
| >>encapsulated | OMA-LPPe-ver1-1-EncapsulatedMode | Opti onal | |
| >>>serverID | OMA-LPPe-ver1-1-ServerID | | Defines the identity of the server. |
| >>>>provider-ID | OMA-LPPe-VendorOrOperatorID | | Defines the vendor or operator ID. |
| >>>>server-ID | OCTET STRING (SIZE(4)) | | Defines the server ID for the particular vendor or operator. |
| >>>cipherSets | SEQUENCE (SIZE (1..16)) OF OMA-LPPe-ver1-1-CipherSet | Opti onal | Applies to encapsulated mode and provides a list of 1 to 16 cipher sets each containing information relevant to ciphering for some or all assistance data being broadcast |

FIG. 21B

*OMA-LPPe-CommonIEsProvideAssistanceData - Continued*

| | | | |
|---|---|---|---|
| | | | using a particular broadcast system. A UE may replace any previous cipher sets from a particular server with any new sets from the same server. A cipher set may refer to ongoing ciphering or to ciphering that is scheduled for a later time as well as to ciphering applicable to the UE location or to other locations. A server may, if possible, use a cipher set over the entire area supported by the server for a period of at least 2 hours and may stagger the change to a new cipher set by introducing the new set over the entire area a piece at a time in order to avoid all UEs in the area requesting new assistance data all at the same time. When this parameter is not included, a UE may continue to use any cipher sets previously received from the server. |
| >>>>CipherSetID | OMA-LPPe-ver1-1-CipherSetID | | The IE OMA-LPPe-ver1-1-CipherSetID uniquely identifies a cipher set comprising a ciphering key value and first component c0 for the initial ciphering counter C1. A server may not reuse a particular cipher set ID for a new cipher set for a predetermined period (e.g., 24 hrs) following usage for the last broadcast for a previous cipher set. |
| >>>>CipherKey | BIT STRING (SIZE (128)). | | Provides a cipher key as a bit string of size 128 bits |
| >>>>C0 | BIT STRING (SIZE (1..128) | | Provides the first component of the initial ciphering counter C1. If less than 128 bits, c0 is padded out with zeroes in more significant bit positions to achieve 128 bits. |
| >>>authentication | SEQUENCE (SIZE (1..4)) OF OMA-LPPe-ver1-1-AuthenticationSet | Optional | Applies when a server requires a UE to authenticate every assistance data broadcast message received via the indicated broadcast system. Any broadcast assistance data message received via the indicated broadcast system that cannot be authenticated (e.g. that does include a digital signature) or that fails authentication or that is received after the end of its validity period may be discarded by a UE. This parameter provides protection to a UE against broadcast messages that may be unauthorized or fraudulent. This parameter provides a list of 1 to 4 authentication sets each containing information relevant to authentication for some or all assistance data being broadcast using a particular broadcast system. A UE may replace any previous authentication sets from a particular server with any new sets from the same server. An authentication set may refer to ongoing authentication or to authentication that is scheduled for a later time as well as to authentication applicable to the UE location or to other locations. A server may, if possible, use an authentication set over the entire area supported by the server for a period (e.g., 24 hours) and may stagger the change to a new cipher set by introducing the new set over the entire area a piece at a time in order to avoid all UEs in the area requesting new assistance data all at the same time. When this parameter is not included, a UE may continue to use any authentication sets previously received from the server. |
| >>>>Authentication SetID | OMA-LPPe-ver1-1-AuthenticationSetID | | Identifies the public key authentication set to be used to authenticate the signature as an integer between 0-255. |

FIG. 21C

*OMA-LPPe-CommonIEsProvideAssistanceData - Continued*

| | | | |
|---|---|---|---|
| | | | The IE OMA-LPPe-ver1-1-AuthenticationSet defines an authentication set comprising an authentication ID, an RSA public key value and a salt length for encoding. |
| >>>>rsaPublicKey modulus | Bit String (Size 2048) | | Provides an RSA public key consisting of a 2048 bit modulus and a 2 to 2048 bit exponent. Integer versions of the modulus and exponent may be obtained by truncating any leading zero bits and treating the remaining bits as the binary representation of a positive integer. |
| >>>>rsaPublicKey exponent | Bit String (Size (2..2048) | | |
| >>>>SaltLength | Integer (0..32) | | Provides the length in octets of the salt value. |

FIG. 21D

GENERIC BROADCAST OF LOCATION ASSISTANCE DATA

CROSS-REFERENCES TO RELATED APPLICATIONS

This patent application claims the benefit of U.S. Provisional Patent Application No. 61/529,202, filed Aug. 30, 2011, and entitled "GENERIC BROADCAST OF LOCATION ASSISTANCE DATA," U.S. Provisional Patent Application No. 61/549,160, filed Oct. 19, 2011, and entitled "GENERIC BROADCAST OF LOCATION ASSISTANCE DATA," U.S. Provisional Patent Application No. 61/586,737, filed Jan. 13, 2012, and entitled "GENERIC BROADCAST OF LOCATION ASSISTANCE DATA," U.S. Provisional Patent Application No. 61/606,993, filed Mar. 6, 2012, and entitled "GENERIC BROADCAST OF LOCATION ASSISTANCE DATA," U.S. Provisional Patent Application No. 61/686,619, filed Apr. 6, 2012, and entitled "GENERIC BROADCAST OF LOCATION ASSISTANCE DATA," U.S. Provisional Patent Application No. 61/621,466, filed Apr. 7, 2012, and entitled "GENERIC BROADCAST OF LOCATION ASSISTANCE DATA," U.S. Provisional Patent Application No. 61/664,119 Jun. 25, 2012, and entitled "GENERIC BROADCAST OF LOCATION ASSISTANCE DATA,", all of which are incorporated by reference herein in its entirety for all purposes.

BACKGROUND

Location Services (LCS) provided by or in association with wireless networks can be useful or essential to many applications—for example to locate a user engaged in an emergency call, to obtain navigation (e.g. driving directions), to locate nearby friends or facilities and to track valuable objects and assets.

The Long Term Evolution (LTE) wireless access interface is a standard in the mobile phone network technology tree, developed by the 3rd Generation Partnership Project (3GPP), that also produced the Global System for Mobile Communications (GSM), Enhanced Data rates for GSM Evolution (EDGE), Universal Mobile Telecommunications System (UMTS) and High Speed Packet Access (HSPA) network technologies. The LTE Positioning Protocol (LPP) is the protocol defined by 3GPP to support LCS in a wireless network based on LTE with capabilities to locate a User Equipment (UE). LPP extensions (LPPe) is a positioning protocol developed by the Open Mobile Alliance (OMA) that extends LPP to support location for access types in addition to LTE as well as adding further position methods applicable to both LTE and other wireless access types such as GSM, UMTS and WiFi. LPP may be used by itself in an LTE network or may be combined with LPPe to support LCS in LTE and/or other networks. In the latter case, the combined protocol may be referred to as LPP/LPPe.

Current 3GPP defined technology uses point-to-point positioning protocols such as LPP and LPP/LPPe to support LCS. The use of point-to-point protocols may result in significant signaling and processing requirements on both the network and UEs and difficulty in providing adequate location support for all UEs accessing a network. Furthermore, while delivery of LCS Assistance Data via broadcast has been standardized for GSM and UMTS access, it has not been deployed. One reason for this is additional implementation impact—e.g. to network base stations, Location Servers and UEs. A second reason is that the broadcast Assistance Data standards are based on an old 3GPP Release (Release 98 completed in 1999) and do not contain any Assistance Data enhancements defined since then. A third reason is that some broadcast systems, such as those already defined to support GSM and UMTS broadcast location Assistance Data, have limited bandwidth and cannot broadcast large amounts of Assistance Data (e.g. GNSS (Global Navigation Satellite System) ephemeris data) with a low latency. However, broadcast location Assistance Data remains potentially useful to avoid the overhead and delay in obtaining assistance data by point to point means (e.g. using LPP or LPP/LPPe). The problem is to define it in a manner that would be suitable for implementation and with adequate performance for receiving devices.

SUMMARY

Various techniques are provided for LCS Assistance Data broadcast, for example for implementation in LTE and LTE Advanced (LTE-A) systems. The embodiments described herein, use the LPP/LPPe combined positioning protocol, by making use of existing unsolicited Provide Assistance Data (PAD) messages. The embodiments of the invention avoid the need to define and implement a separate broadcast Assistance Data protocol. Enabling broadcasting for LCS Assistance Data has the potential of enabling: faster and more accurate location; use of target based position methods such as GNSS; offloading of Location Servers; an ability to charge for some/all broadcast assistance if ciphering is used; and an ability to support roamers as well as home subscribers in the serving network. Broadcast of Assistance Data is also potentially applicable to both control plane location solutions developed by 3GPP and 3GPP2 and the SUPL (Secure User Plan Location) location solutions developed by OMA.

An exemplary method for broadcasting data may include sending information associated with broadcast messaging from a Location Server point to point to a device using a positioning protocol, and broadcasting one or more Assistance Data (AD) messages from the Location Server to the device based on the information associated with the broadcast messaging. In one embodiment, the positioning protocol may be an LTE Positioning Protocol (LPP) protocol combined with an LPP extensions (LPPe) protocol The information associated with the broadcast messaging may include at least one of deciphering keys, deciphering key IDs, AD Types, AD Type IDs, scheduling of one or more AD messages, broadcast systems, broadcast areas and authentication information. The sending of the information associated with the broadcast messaging point to point may be in response to a request from the device sent point to point to the Location Server using the positioning protocol.

In some embodiments, one or more AD messages may use, ciphering described in the information associated with the broadcast messaging sent point to point, or scheduling described in the information associated with the broadcast messaging sent point to point. Additionally, the information associated with the broadcast messaging may be used to identify where and how the one or more AD messages are being broadcast, wherein the information identifying where and how the one or more AD messages are being broadcast comprises one or more of a geographic area within which the one or more AD messages are being broadcast, a set of cell sites within which the one or more AD messages being broadcast, a period of time for a transmission of the one or more AD messages, a validity period for the one or more AD messages or a system broadcasting the one or more AD messages, or information identifying a type of the AD being broadcast described in the information associated with the broadcast messaging sent point to point.

In some implementations of the method, at least a portion of the one or more AD messages may be ciphered, wherein the one or more AD messages are encapsulated for ciphering and wherein the one or more AD messages are ciphered using information associated with broadcast messaging sent point to point.

In some embodiments, broadcasting the AD from the Location Server to the device comprises transmitting the one or more AD messages to a Broadcast Subsystem for broadcast to the device. Broadcasting the AD may further comprise exchanging information with the Location Server including one or more of exchanging broadcast capabilities, receiving a request for a specific AD from the Broadcast Subsystem at the Location Server, receiving an indication from the Broadcast Subsystem at the Location Server on a current or future available broadcast capacity, or receiving an acknowledgement for the one or more AD messages successfully transferred to the Broadcast Subsystem from the Location server.

Moreover, in some embodiments, the method performed by the Location Server may associate each of the one or more AD messages with a unique message ID, wherein no more than one AD message is associated with the same unique message ID within a message validity period. The method may assign a label to each of a plurality of broadcast AD types in an AD message from the Location Server to the device. The method may also obtain location AD associated with an access node or Global Navigation Satellite Systems (GNSS). In one implementation, the AD may be obtained using Operations and Maintenance (O&M) signaling. The method may also include updating the one or more AD messages at the Location Server when a plurality of contents of the one or more AD messages need to be changed.

In some implementations, the contents or/and scheduling of the one or more AD messages may be adapted based on a type and a number of point to point AD requests from a plurality of devices and/or a type of access network available in a local area. The content for the one or more AD messages may be adapted based on a level of device support detected for the device. The content for one or more AD messages may comprise the AD for Assisted-Global Navigation Satellite System (A-GNSS) and the level of device support comprises the device supporting A-GNSS, and a frequency of the one or more AD messages is increased in response to detecting a large number of attached devices that support device based A-GNSS.

In some aspects, the broadcasting frequency of the AD may be increased in response to one or more of determining that an increased number of devices are requesting information associated with the broadcast messaging point to point, determining that an increased number of location requests from a plurality of devices is high, determining that a current time is similar to a time of day associated with statistically high activity, determining that a density of attached devices for a geographic area is high, and determining that the Location Server is congested by point to point location service requests or by scarcity of resources.

In an exemplary method for receiving Assistance Data (AD), the method may include receiving information associated with broadcast messaging from a Location Server point to point using a positioning protocol, and receiving one or more AD messages broadcasted from the Location Server according to the information associated with the broadcast messaging. The information associated with the broadcast messaging may comprise at least one of deciphering keys, deciphering key IDs, AD Types, AD Type IDs, scheduling of one or more AD messages, broadcast systems, broadcast areas and authentication information. In some implementations, the positioning protocol may be an LTE Positioning Protocol (LPP) protocol combined with an LPP extensions (LPPe) protocol. Moreover, the information associated with the broadcast messaging comprises information identifying where and how one or more AD messages are being broadcast, wherein the information identifying where and how the one or more AD messages are being broadcast comprises one or more of a geographic area within which the one or more AD messages being broadcast, a set of cell sites within which the one or more AD message are being broadcast, a period of time for a transmission of the one or more AD messages, a validity period for the one or more AD messages, a system broadcasting the one or more AD messages or a type of the AD being broadcast. In some implementations, the one or more AD messages are received through a Broadcast Subsystem.

An exemplary server for broadcasting data may include a transceiver configured to send information associated with broadcast messaging from a server point to point to a device using a positioning protocol, and broadcast Assistance Data (AD) messages from the server to the device according to the information associated with the broadcast messaging, sent point to point; and a processor configured to determine the information associated with the broadcast messaging, wherein the information associated with the broadcast messaging may comprise at least one of deciphering keys, deciphering key IDs, AD Types, AD Type IDs, scheduling of AD, broadcast systems, broadcast areas and authentication information. The sending of the information associated with the broadcast messaging point to point may be in response to a request from the device sent point to point to the Location Server using the positioning protocol.

In some embodiments, the processor may cipher the one or more AD messages using the information associated with the broadcast messaging sent point to point, or scheduling described in the information associated with the broadcast messaging sent point to point. Additionally, the information associated with the broadcast messaging may be used, by the processor, to identify where and how the one or more AD messages are being broadcast, wherein the information identifying where and how the one or more AD messages are being broadcast comprises one or more of a geographic area within which the one or more AD messages are being broadcast, a set of cell sites within which the one or more AD messages being broadcast, a period of time for a transmission of the one or more AD messages, a validity period for the one or more AD messages or a system broadcasting the one or more AD messages, or information identifying a type of the AD being broadcast described in the information associated with the broadcast messaging sent point to point.

In some aspects of the server, at least a portion of the one or more AD messages may be ciphered, by the processor, wherein the one or more AD messages are encapsulated for ciphering and wherein the one or more AD messages are ciphered using information associated with broadcast messaging sent point to point.

In some embodiments, broadcasting the AD from the Location Server to the device comprises transmitting the one or more AD messages to a Broadcast Subsystem for broadcast to the device, using the transceiver. Broadcasting the AD may further comprise exchanging information with the Location Server including one or more of exchanging broadcast capabilities, receiving a request for a specific AD from the Broadcast Subsystem at the Location Server, receiving an indication from the Broadcast Subsystem at the Location Server on a current or future available broadcast capacity, or receiving an acknowledgement for the one or more AD messages successfully transferred to the Broadcast Subsystem from the Location server.

Moreover, in some embodiments, the processor associated with the Location Server may associate each of the one or more AD messages with a unique message ID, wherein no more than one AD message is associated with the same unique message ID within a message validity period. The processor may assign a label to each of a plurality of broadcast AD types in an AD message from the Location Server to the device. The server may also obtain location AD associated with an access node or Global Navigation Satellite Systems (GNSS). In one implementation, the AD may be obtained using Operations and Maintenance (O&M) signaling. The method may also include updating the one or more AD messages at the Location Server when a plurality of contents of the one or more AD messages need to be changed.

In some implementations, the contents or/and scheduling of the one or more AD messages may be adapted based on a type and a number of point to point AD requests from a plurality of devices and/or a type of access network available in a local area. The content for the one or more AD messages may be adapted based on a level of device support detected for the device. The content for one or more AD messages may comprise the AD for Assisted-Global Navigation Satellite System (A-GNSS) and the level of device support comprises the device supporting A-GNSS, and a frequency of the one or more AD messages is increased in response to detecting a large number of attached devices that support device based A-GNSS.

In some implementations the broadcasting frequency of the AD may be increased, by the processor and the transceiver, in response to one or more of determining that an increased number of devices are requesting information associated with the broadcast messaging point to point, determining that an increased number of location requests from a plurality of devices is high, determining that a current time is similar to a time of day associated with statistically high activity, determining that a density of attached devices for a geographic area is high, and determining that the Location Server is congested by point to point location service requests or by scarcity of resources.

An exemplary device for receiving Assistance Data (AD) may include a transceiver for receiving information associated with broadcast messaging from a Location Server point to point using a positioning protocol, and receiving one or more AD messages broadcasted from the Location Server according to the information associated with the broadcast messaging. The information associated with the broadcast messaging may be determined by a processor to include one or more of at least one of deciphering keys, deciphering key IDs, AD Types, AD Type IDs, scheduling of one or more AD messages, broadcast systems, broadcast areas and authentication information. In some implementations, the positioning protocol may be an LTE Positioning Protocol (LPP) protocol combined with an LPP extensions (LPPe) protocol. Moreover, the information associated with the broadcast messaging may comprise information identifying where and how one or more AD messages are being broadcast, wherein the information identifying where and how the one or more AD messages are being broadcast comprises one or more of a geographic area within which the one or more AD messages being broadcast, a set of cell sites within which the one or more AD message are being broadcast, a period of time for a transmission of the one or more AD messages, a validity period for the one or more AD messages, a system broadcasting the one or more AD messages or a type of the AD being broadcast. In some implementations, the one or more AD messages are received through a Broadcast Subsystem.

An exemplary non-transitory computer readable storage medium coupled to a processor, wherein the non-transitory computer readable storage medium may comprise instructions executable by the processor, the instructions comprising instructions to send information associated with broadcast messaging from a Location Server point to point to a device using a positioning protocol, wherein the information associated with the broadcast messaging comprises at least one of deciphering keys, deciphering key IDs, AD Types, AD Type IDs, scheduling of one or more AD messages, broadcast systems, broadcast areas and authentication information, and broadcast Assistance Data (AD) messages from the Location Server to the device according to the information associated with the broadcast messaging, sent point to point.

Another exemplary non-transitory computer readable storage medium coupled to another processor, wherein the non-transitory computer readable storage medium may include instructions executable by the processor, the instructions comprising instructions to receive information associated with broadcast messaging from a Location Server point to point using a positioning protocol, wherein the information associated with the broadcast messaging comprises at least one of deciphering keys, deciphering key IDs, AD Types, AD Type IDs, scheduling of one or more AD messages, broadcast systems, broadcast areas and authentication information; and to receive one or more AD messages broadcasted from the Location Server according to the information associated with the broadcast messaging.

An exemplary apparatus may include means for sending information associated with broadcast messaging from a server point to point to a device using a positioning protocol, wherein the information associated with the broadcast messaging comprises at least one of deciphering keys, deciphering key IDs, AD Types, AD Type IDs, scheduling of one or more AD messages, broadcast systems, broadcast areas and authentication information, and means for broadcasting Assistance Data (AD) messages from the server to the device according to the information associated with the broadcast messaging, sent point to point. An exemplary device may include means for receiving information associated with broadcast messaging from a Location Server point to point using a positioning protocol, wherein the information associated with the broadcast messaging comprises at least one of deciphering keys, deciphering key IDs, AD Types, AD Type IDs, scheduling of one or more AD messages, broadcast systems, broadcast areas and authentication information, and means for receiving one or more AD messages broadcasted from the Location Server according to the information associated with the broadcast messaging.

Embodiments of the invention create the possibility for a device to use LPP/LPPe point-to-point as a means of obtaining critical information related to LPP/LPPe broadcast. This avoids relying on network based control plane protocols to obtain broadcast related information at a device (such as deciphering keys for use when broadcast Assistance Data is ciphered), which is not suitable when SUPL rather than a control plane is used as a location solution in many implementations. In addition, a method of categorizing and advertising broadcast location Assistance Data is defined and a method of adapting existing LTE System Information Blocks (SIBs) is defined to support LPP/LPPe assistance data broadcast. Segmentation of LPP/LPPe broadcast messages is also enabled. Applicability to any broadcast system is enabled by treating PAD messages as blocks of data from the perspective of the broadcast system that may carry labeling information on content, use of ciphering, change of data content and segmentation inside the PAD messages and invisibly to the broadcast system. This will enable PAD messages to be broadcast (like any other data) by any broadcast system. Embodiments of the invention additionally describe techniques for labeling Assistance Data, for example to refer to assistance data parameters inside the messages in a concise manner or to indicate supported broadcast Assistance Data. Other embodiments enable broadcast Assistance Data to be authenticated by any receiving UE to overcome possible falsified broadcast from malicious sources.

BRIEF DESCRIPTION OF THE DRAWINGS

FIGS. 16A, 16B, 16C, 16D and 16E define exemplary broadcast restrictions and labeling applicable to the content of broadcast Assistance Data and limitations on the areas within which certain types of Assistance Data may be broadcast.

FIGS. 17A and 17B illustrate an exemplary Broadcast Container used in embodiments of the invention.

FIG. 18 illustrates exemplary enhancements to the LPP/LPPe Request Capabilities message.

FIGS. 19A and 19B illustrate exemplary enhancements to the LPP/LPPe Provide Capabilities message.

FIGS. 20A and 20B illustrate exemplary enhancements to the LPP/LPPe Request Assistance Data message.

FIGS. 21A, 21B, 21C and 21D illustrate exemplary enhancements to the LPP/LPPe Provide Assistance Data message for supporting embodiments of the invention.

DETAILED DESCRIPTION

Figure 1:
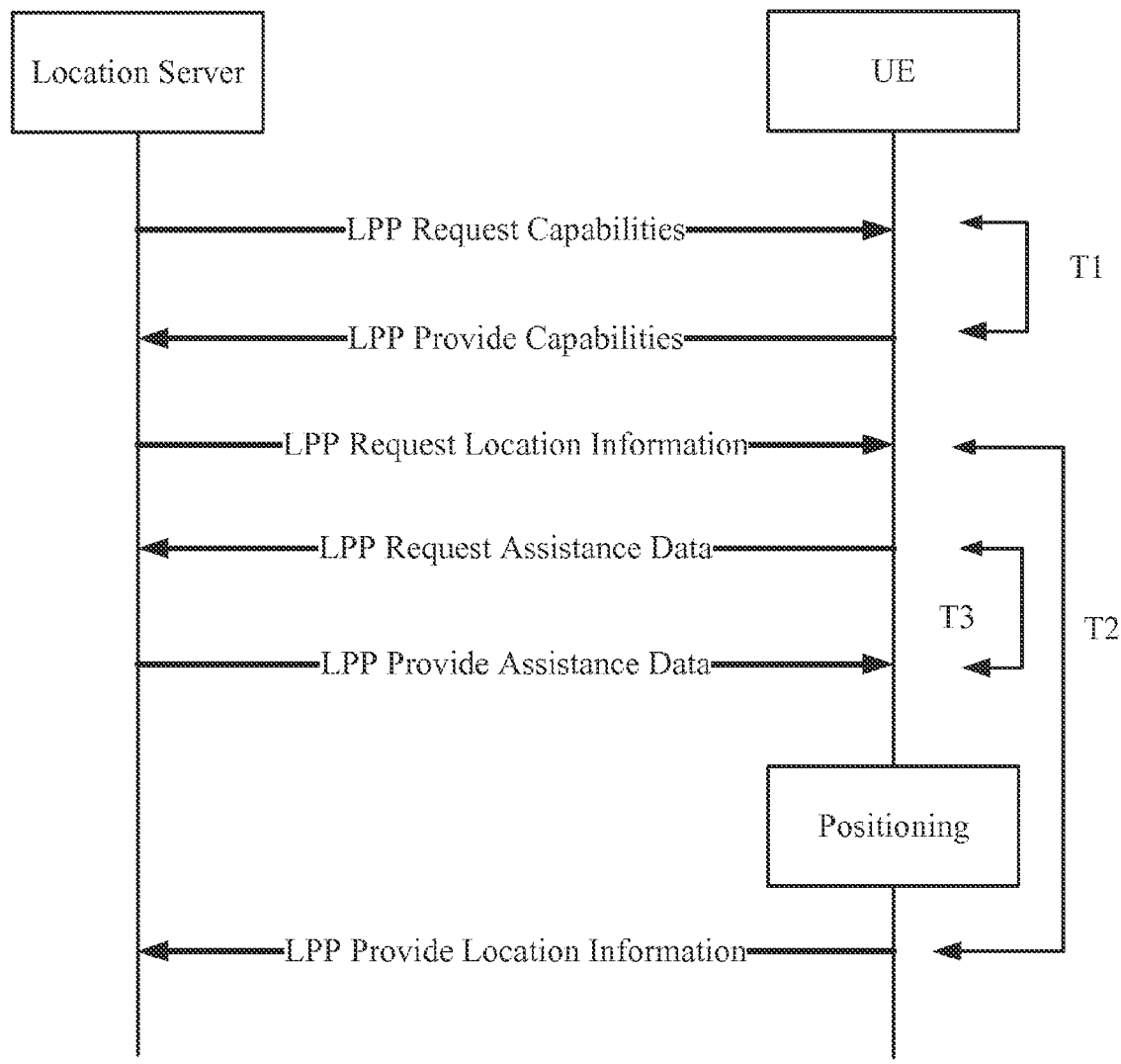
FIG. 1 (PRIOR ART) shows a sample positioning session using the LPP (point-to-point) positioning protocol for Location services (LCS) for LTE.

LCS support by or in association with a wireless network typically employs a Location Server in or associated with the network that enables the location of a mobile terminal to be obtained by the Location Server and/or by the terminal. The location may be needed (e.g. requested) by some client application which may be inside or associated with the mobile terminal (e.g. an application or the mobile terminal user) or may be external to the network and not directly associated with the mobile terminal. In some standards and implementations, the mobile terminal may make measurements of radio transmission from network base stations, access points (e.g. WiFi access points (APs)) and/or satellites (e.g. the Global Positioning System (GPS)) and may transfer these measurements (e.g. on request) to the Location Server for computation of the mobile terminal location by the Location Server. In other standards and implementations, a mobile terminal may make the radio measurements and in addition then compute its position—and possibly then transfer the position to the Location Server if requested. To enable a mobile terminal to make radio measurements more reliably, accurately and faster and optionally enable a terminal to compute its position from the radio measurements, a Location Server may transfer Assistance Data to the mobile terminal (e.g. on request) such as Assistance Data containing orbital data for GPS satellites or satellites for other Global Navigation Satellite System (GNSS) systems such as GLONASS and Galileo. Assistance data may also contain location coordinates of base stations and access points nearby to the terminal, timing information and signal power for base station radio transmission and other data to assist location measurements and location computation. Examples of positioning methods that may make use of Assistance Data include Assisted GPS (A-GPS), Assisted GNSS (A-GNSS), Observed Time Difference Of Arrival (OTDOA), Advanced Forward Link Trilateration (AFLT) and Enhanced Cell ID (E-CID). The 3GPP LPP definition in 3GPP Technical Specification (TS) 36.355 and the OMA definition of LPPe in LPPe Extensions Specification version 1.0 contain definitions of A-GPS, A-GNSS, OTDOA and E-CID, while the 3rd Generation Partnership Project 2 (3GPP2) provides a definition of AFLT in 3GPP2 TS C.S0022.

To enable a Location Server to know the capabilities of a mobile terminal to support different types of Assistance Data, make different types of radio measurement and support different positioning methods, the capabilities of the terminal may be transferred (e.g. on request) by the terminal to the Location Server. A similar capability transfer in the reverse direction may be used to provide a mobile terminal with the capabilities of a Location Server to provide different types of Assistance Data and support different types of radio measurements. All of the interactions just mentioned between the Location Server and mobile terminal would typically be conducted using point to point signaling (e.g. via a radio access network and one of more core network entities such as routers or gateways) which may consume resources and increase delay.

The point to point interactions just described may be supported by positioning protocols such as LPP, LPP/LPPe and the protocol defined in 3GPP2 TS C.S0022. The interactions may be supported within a control plane solution such as one of the solutions defined in 3GPP TSs 23.271, 49.059, 25.305 and 36.305 and in 3GPP2 TS X.S0002. The interactions may also be supported within a user plane solution such as one of the OMA Secure User Plane Location (SUPL) version 1.0, version 2.0, version 2.1 and version 3.0 solutions defined by OMA in Enablers OMA-ERP-SUPL-V1_0, OMA-ERP-SUPL-V2_0, OMA-ERP-SUPL-V2_1 and OMA-ERP-SUPL-V3_0, respectively. In a control plane location solution, existing network interfaces and protocols are enhanced and used for most signaling (e.g. to support UE to Location Server point to point interaction) whereas with a user plane solution such as SUPL, the SUPL Secure Location Platform (SLP) Location Server interacts with a UE, known in SUPL as a SUPL Enabled Terminal (SET), via a data (e.g. TCP/IP) connection that is mostly transparent to other network entities.

FIG. 1 (PRIOR ART) shows a sample positioning session using the LPP (point-to-point) positioning protocol for Location services (LCS) for LTE. This is an example of point to point interaction between a Location Server and a mobile terminal. Transaction T1 from FIG. 1, is for capability exchange between the Location Server and the UE (LPP Request/Provide Capabilities). In transaction T1, the Location Server sends a request to the UE for some or all of the UE's positioning capabilities with respect to the LPP protocol and the UE then returns these capabilities. A UE could be a mobile phone, wireless PDA, PC, or any other device that can connect to an LTE wireless network. A UE may also be interchangeably referred to as a target, a mobile terminal, a mobile device, a SET or a device throughout the specification. The location information subsequently obtained by the Location Server may be made available to support Location Based Services (LBS) for value-added applications or clients which are accessible to mobile subscribers or to other third parties. Wireless network and wireless devices are in an advantageous position to support LCS due to the inherent geo-location capability of radio signals as well as the user mobility tracking of the system. The information exchange in transaction T1 in FIG. 1 makes the server aware of the UE positioning capabilities (e.g. A-GNSS support, supported cellular network measurements for OTDOA and E-CID, etc.). Based on this information, the server can make a decision on the positioning method to be used, based on both the UE capabilities and the requested quality-of-position (response time, accuracy).

As shown in FIG. 1, the actual location information request is carried out during the T2 transaction which starts with the server sending an LPP Request Location Information message to the UE containing the position methods being requested, details on the measurements needed (e.g. which GNSS systems, GNSS signals and network base stations need to be measured and whether the UE or the Location Server will compute the location). The message may also carry other reporting instructions such as periodicity for multiple locations and required response time.

Having received the LPP Request Location Information message, the UE begins its positioning activities. In some scenarios, this activity may trigger a request for some Assistance Data—e.g. if the UE does not already have sufficient Assistance Data from previous requests to obtain all the requested measurements and, if asked, compute a location. For instance, if the server requests UE based A-GNSS location in which the UE both obtains GNSS measurements and computes its own location, and the UE does not have the latest ephemeris data for the requested GNSS systems, the UE may request these with the LPP Request/Provide Assistance Data mechanism (Transaction T3). Other Assistance Data, such as an approximate reference location for the UE (e.g. based on the current UE serving cell or serving AP), a reference time, a GNSS ionosphere model, base station and WiFi AP locations to name just a few may also be provided to the UE as part of transaction T3. As part of transaction T3, the UE sends its request for specific Assistance Data to the server and the server returns as much of this Assistance Data as it can to the UE. Having received the requested Assistance Data, the UE makes measurements (e.g. of GNSS systems, base stations, WiFi APs) and then, if also asked by the server, computes its location, and reports the location information (for example, measurements or a computed location) back to the Location Server in an LPP Provide Location Information message which terminates transaction T2.

As described above, the current 3GPP based technology uses point-to-point protocols such as LPP and LPP/LPPe to support LCS. The same applies to support of LCS in networks defined by 3GPP2 such as Code Division Multiple Access 2000 (CDMA2000) and High Rate Packet Data (HRPD) networks which also employ point to point positioning protocols between a server and mobile terminal such as the protocol defined in 3GPP2 TS C.S0022. The use of point-to-point protocols results in significant signaling and processing requirements on both the network and UEs and difficulty in providing location support for all UEs accessing a network. Furthermore, while LCS Assistance Data via broadcast has been standardized for GSM and UMTS access, it has not been deployed. One reason is the additional implementation impact to network base stations, Location Servers and UEs. Another reason is that the broadcast Assistance Data standards are based on 3GPP Release 98 (defined in 1999) and do not contain any Assistance Data enhancements defined since then. A third reason is that some broadcast capabilities, such as those already defined to support broadcast location Assistance Data for GSM and UMTS, have limited bandwidth and cannot broadcast large amounts of Assistance Data (e.g. GNSS ephemeris data) with a low latency. However, broadcast location Assistance Data remains potentially very useful. The problem is to define it in a manner that would be suitable for implementation and with adequate performance for receiving devices. Embodiments of the invention, described below, solve these and other problems.

I. Broadcast Support Using Point to Point

Figure 2:
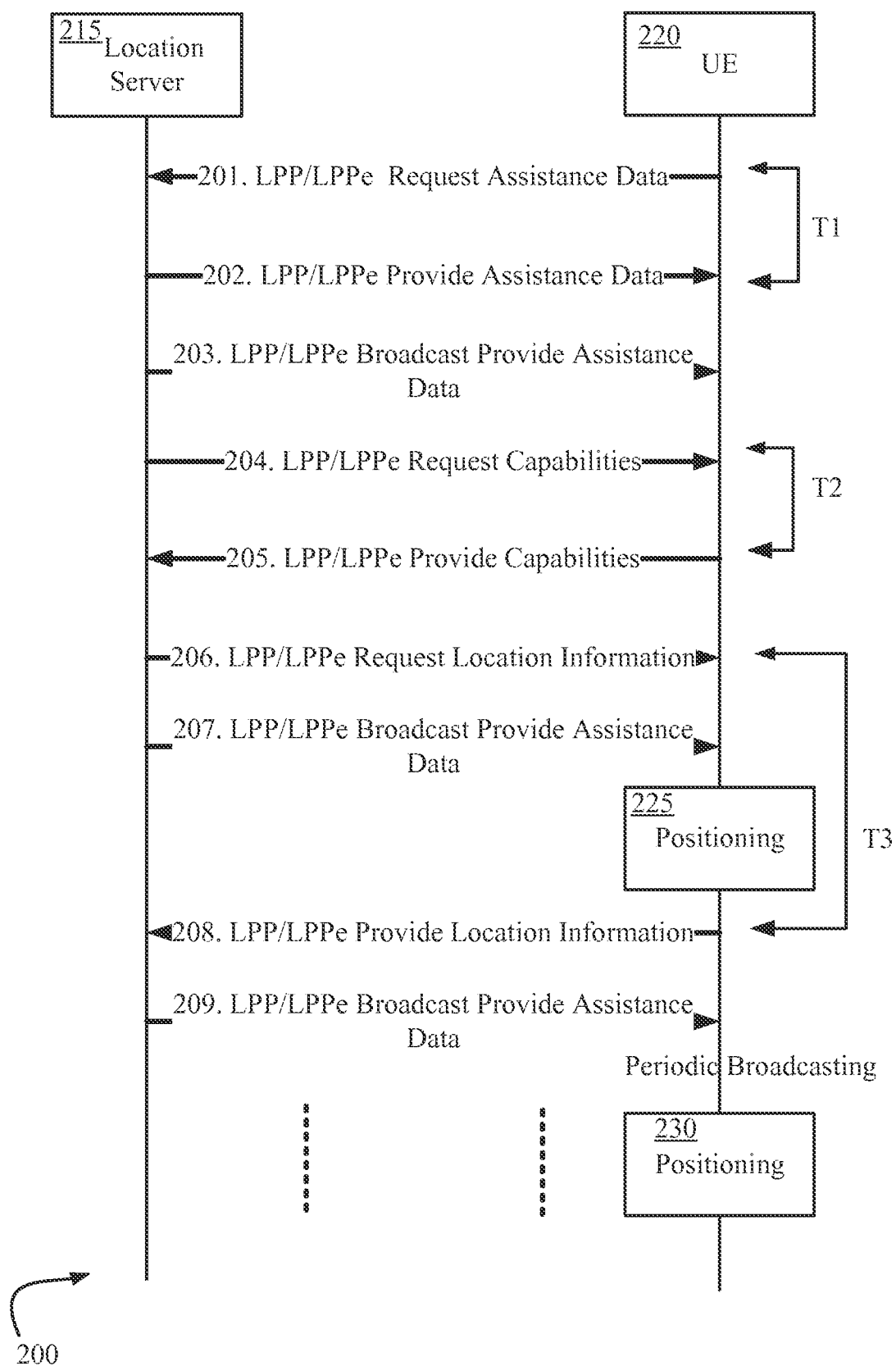
FIG. 2 is a signaling flow diagram illustrating an exemplary embodiment of the invention for a broadcast protocol for Location Service (LCS) for LTE.

FIG. 2 is a signaling flow diagram illustrating an exemplary embodiment of the invention for a broadcast protocol for Location Service (LCS) for LTE. The signaling in process 200 is performed by processing logic that comprises hardware (circuitry, dedicated logic, etc.), software (such as is run on a general purpose computing system or a dedicated machine), firmware (embedded software), or any combination thereof. In one embodiment, the process 200 is performed by one or more computer systems 2300 as described in FIG. 23. In one embodiment, the receiving and transmitting steps described below may be facilitated utilizing the transceiver 2350 described in FIG. 23.

In FIG. 2, the Location Server 215 may correspond to Location Server 504 described later with reference to FIG. 5A and UE 220 may correspond to UE/SET 502 in FIG. 5A. The Location Server 215 in FIG. 2 communicates point to point with the UE 220 for exchanging some Assistance Data, location estimates, capabilities and providing the schedule and/or other information regarding Assistance Data that is being broadcast. In some implementations, an intermediary system or plurality of subsystems, such as a Broadcast Subsystem 506 described in FIG. 5A, FIG. 5B and FIG. 6, may facilitate exchange of information and also assume some or all of the broadcasting responsibilities.

During the T1 transaction in FIG. 2, using the LPP/LPPe Request Assistance Data message, at step 201, which is sent by UE 220 to Location Server 215, the UE 220 may provide its current serving cell (or current access point or current access network) along with other access networks visible to UE 220 and/or other optional related information to the Location Server 215 and may request information about Provide Assistance Data messages being broadcast by the Location Server 215. The UE 220 may request the Assistance Data at some initial time, for example when the UE attaches to the network or in instances when the Assistance Data is changing.

Exemplary enhancements to the LPP/LPPe Request Assistance Data message, as in step 201, are illustrated in FIG. 20. In response to UE 220's LPP/LPPe Request Assistance Data message, the Location Server 215 may respond with an LPP/LPPe Provide Assistance Data message, as illustrated at step 202, with information about Provide Assistance Data messages that are being broadcast. Exemplary enhancements to the LPP/LPPe Provide Assistance Data message for supporting broadcasting, as in step 202, are illustrated in FIGS. 21A and 21B.

Figure 3:
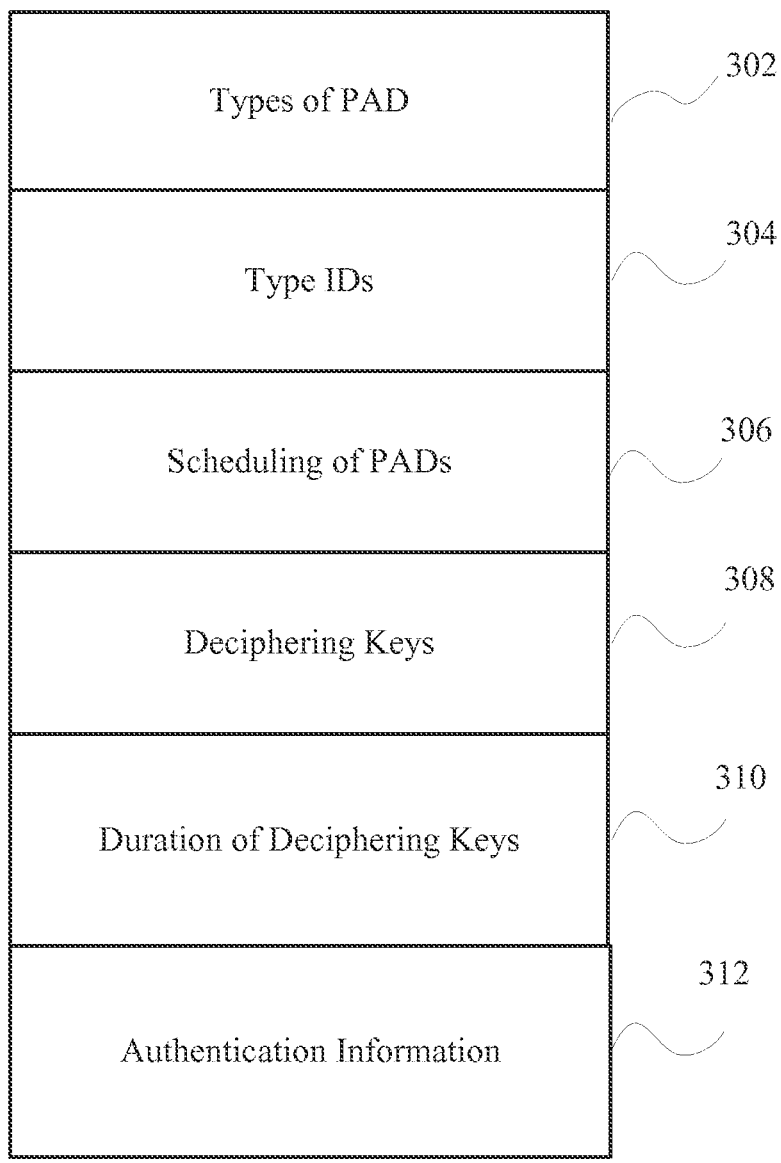
FIG. 3 shows exemplary additional information that may be included in a response from a Location Server to a user equipment (UE) in a LPP/LPPe Provide Assistance Data message.

Briefly discussing FIG. 3, the figure shows exemplary information that may also be included in the response from the Location Server 215 to the UE 220 in the LPP/LPPe Provide Assistance Data message, as in step 202, as part of the response to the LPP/LPPe Request Assistance Data message, as in step 201, in transaction T1 of FIG. 2. At block 302, the various types of PAD messages being broadcast in UE 220's local area may be included. GNSS ephemeris Assistance Data, GNSS almanac Assistance Data, WiFi related data, and E-CID related data are each examples of different PAD types. So, for example, GNSS ephemeris data for GLONASS may be one PAD type and may be broadcast in PAD messages separate to those for other PAD types such as GNSS almanac data or WiFi related data. At block 304, associated type IDs (also included in broadcast PAD messages) may also be included if the association between PAD types and Type IDs is not standardized. For example, a Type ID could contain several value fields—e.g. a primary field indicating a specific positioning method (e.g., A-GNSS, LTE OTDOA, UMTS OTDOA) and one or more secondary fields qualifying the Assistance Data for this position method (e.g. in the case of A-GNSS, one field indicating whether Assistance Data is ephemeris, almanac or ionospheric correction etc. and a further field indicating a specific GNSS constellation (e.g. GPS L1 C/A, modernized GPS, GLONASS etc.). Note that Type IDs may merely be labels for PAD types—e.g. short alphanumeric character strings or numeric values. When type IDs are standardized (i.e. when the type ID for any type of Assistance Data is defined in some publicly available standard), block 304 may be omitted and block 302 may carry the standardized types being supported for broadcast. When type IDs are not standardized, block 304 may carry some reference to different types of Assistance Data (e.g. using conventions already defined for point to point signaling) and a corresponding type ID which the Location Server may also include in the broadcast PAD messages to enable recipient UEs to quickly determine broadcast PAD message content. At block 306, the broadcasting schedule of the different PAD types may be included for the broadcasting phase. At block 308, deciphering key values and associated deciphering key IDs may be included if the broadcast of some or all PAD messages are ciphered. Deciphering key IDs are labels (e.g. numeric values or short alphanumeric character strings) for the actual deciphering key values. At block 310, the applicable duration of deciphering keys and optionally additional deciphering keys to be used after the duration of current deciphering keys expires may also be included. At block 312, the message may also include authentication information that allows the UE to determine if broadcast PAD messages that are later received actually come from server 215 versus some other untrusted source. In addition to the parameters discussed in FIG. 3, other parameters as discussed in FIGS. 21A and 21B, such as broadcastSystem, accessNetworks, coverageArea and serverID, may also be included as parameters for the LPP/LPPe Provide Assistance Data message for supporting broadcasting. Parameters additional to or distinct in some way from these may also be included such as identification of one or more broadcast systems that support broadcast of location Assistance Data, a geographic area or set of geographic areas or set of cell sites within which Assistance Data is broadcast.

The content of the information block in FIG. 3 may be specific to the UE's current location or current serving cell. For instance, if the user moves to some new serving cell or new location (nearby to or far from an earlier serving cell or earlier location), the UE 220 and the Location Server 215 may need to proceed through the provisioning steps 201 and 202 in FIG. 2 again in order to provide different data for the new serving cell or new location.

Returning back to FIG. 2, as illustrated by step 203, using the transceiver 2350 and the processor 2310, the UE 220 may begin monitoring for and receiving LPP/LPPe Broadcast Provide Assistance Data messages on broadcast systems that may have been indicated by the Location Server 215 in step 202 some time after exchanging information with the Location Server 215 during the T1 transactions. At some later time, at steps 204 and 205, during the T2 transactions, the Location Server 215 may instigate the capabilities exchange protocol between the Location Server 215 and the UE 220. For exchanging capabilities, in one embodiment, the LPP/LPPe protocol may be enhanced to allow the exchange of Assistance Data broadcast capabilities between the Location Server 215 and the UE 220. In some embodiments, both the Location Server 215 and the UE 220 are broadcast Assistance Data capable. Moreover, Location Server 215 and UE 220 may each support transfer of certain types of Assistance Data using one or more broadcast systems. The capabilities exchange shown in steps 204 and 205 enable Location Server 215 to discover which types of assistance UE 220 is able to receive using broadcast over different broadcast systems such as evolved/enhanced Multimedia Broadcast Multicast Service (eMBMS) and LTE SIBs. Messages sent in opposite directions to those shown in step 204 and 205 (not shown in FIG. 2) may enable UE 220 to discover similar information regarding server 215's capability to send Assistance Data via broadcast. Once the capabilities are exchanged, both the UE 220 and the Location Server 215 may be aware if they can begin or continue to participate in the broadcast Assistance Data protocol with one another. The capabilities information may additionally include, but is not limited to 1) the ability to send or receive broadcast Assistance Data, 2) types of broadcast system supported (e.g. LTE SIB, eMBMS, OMA BCAST), 3) ability to cipher/decipher broadcast Assistance Data, 4) ability to authenticate messages, 5) the Type IDs for the PADs supported and 6) ability to send assistance or receive assistance data point to point related to broadcast of PAD messages. In some embodiments, steps 204 and 205 may also or instead occur in the same direction and/or the reverse direction to that shown in FIG. 2 prior to steps 201 and 202—e.g. to enable UE 220 to determine whether Location Server 215 supports broadcast of assistance data and can provide the assistance data in step 202 that is requested in step 201. In some embodiments, the assistance data sent in step 202 may be sent unsolicited by the server—e.g. based on knowing the UE 220's capability to support this assistance data—without the need for the request in step 201.

Transaction T2 for exchanging capabilities may include LPP/LPPe Request Capabilities message, as in step 204, from the Location Server 215 to the UE 220 and LPP/LPPe Provide Capabilities message, as in step 205, from the UE 220 to the Location Server 215. Exemplary enhancements to the LPPe Request Capabilities message for supporting broadcasting are further illustrated in FIG. 18. Similarly, exemplary enhancements to the LPPe Provide Capabilities message for supporting broadcasting are further illustrated in FIG. 19.

Embodiments of the invention may also select to implement a T3 transaction instigated by the Location Server 215 for acquiring the location estimates from the UE 220. At step 206, the Location Server 215 may send an LPP/LPPe Request Location Information message for requesting location estimates from the UE 220. In one embodiment, the UE 220 may use previously acquired Assistance Data in performing its location measurements and location computation, using the processor 2310, if requested, such as Assistance Data received at step 203 via a broadcast LPP/LPPe Provide Assistance Data message. In another embodiment, at step 207, the UE 220 may monitor for another, perhaps updated, broadcast LPP/LPPe Provide Assistance Data message for estimating location information. At step 225, the UE 220 may perform positioning (e.g. location measurements and possibly location computation) using Assistance Data received from the Location Server 215 in step 203 and/or step 207. In some embodiments, the processor 2310 of the UE uses Assistance Data previously stored in device storage 2325 or temporarily maintained in the Working memory 2335. At step 208, the UE 220 sends an LPP/LPPe Provide Location Information message with the location measurements or location estimate obtained in step 225 to the Location Server 215.

As shown at step 209, the Location Server 215 may continue to broadcast LPP/LPPe Provide Assistance Data messages with the Assistance Data to the UE 220 along with other UEs at scheduled intervals. The broadcast schedule may be communicated to the UE 220 point to point, for example may be provided in step 202 of FIG. 2, and instead or in addition may be broadcast to the various UEs, such as via step 203 and/or step 207 and as described in further detail below. The UE 220 has the broadcast schedule and knows which types of Assistance Data are being broadcast and their schedule and can choose to receive Assistance Data rather than requesting the Assistance Data point to point from the Location Server each time. In some embodiments, the broadcast schedule is stored at the Storage Device 2325 or temporarily maintained in the working memory 2335. For example, the UE 220 may receive information from the Location Server identifying a type or types of Assistance Data that are broadcast.

The UE 220 may continue to receive broadcast Provide Assistance Data messages, as shown at step 209. In addition to responding to requests by the Location Server 215 for location estimates (e.g. as in steps 206 and 208), the UE 220 may perform positioning (as shown at block 230) autonomously without requesting additional information from the Location Server 215. For instance, the UE 220 may perform positioning in response to an internal application request from the UE 220 itself and may make use of Assistance Data received via broadcast (e.g. in step 209) to support such positioning.

In some embodiments, the UE 220 may receive information from the Location Server 215 (e.g. in step 202 and/or step 203 of FIG. 2) regarding where and/or how Assistance Data is being broadcast. For example, the information may indicate a geographic area or set of geographic areas and/or a set of cell sites within which location Assistance Data is broadcast, and/or the information may identify a system (e.g. eMBMS, LTE SIBs) which is broadcasting the location Assistance Data.

Receiving Assistance Data via broadcast, as exemplified in FIG. 2, may be more efficient from both a Location Server 215 and UE 220 perspective than receiving the same Assistance Data point to point, as exemplified in FIG. 1. In particular, the Location Server can broadcast the same Assistance Data, once, in a particular cell, to many UEs rather than sending the Assistance Data separately to each UE 220 by point to point means. Further, the UE 220 does not need to request the Assistance Data but can instead receive it via broadcast and store the data for future location use. Assistance data which has a long life time of several hours or more (e.g. GNSS ephemeris, GNSS almanac, GNSS ionospheric data, base station and WiFi AP coordinates and map related data for cities, towns or individual buildings) can be usefully broadcast at infrequent intervals by a server and stored for the period of the data validity by recipient UEs.

In the above described embodiment of FIG. 2, during transaction T1, the LPP/LPPe Provide Assistance Data response message, as in step 202, from the Location Server 215 to the UE 220 is provided using point to point protocol. This also applies to the Assistance Data request and transfer in transaction T3 in FIG. 1. When the request for Assistance Data by the UE in such a transaction includes a request for Assistance Data related to location support and/or a request for Assistance Data related to broadcast support, instead of using a point to point protocol, the Location Server 215 may broadcast the requested Assistance Data to one or more UEs (e.g. UEs 2212 of FIG. 22). Broadcasting the requested Assistance Data allows for additional efficiencies if the Location Server 215 has a number of open requests from UEs 2212 for Assistance Data associated with broadcasting and/or Assistance Data related to location support. Referring back to FIG. 3, in one embodiment, the Location Server broadcasts the data associated with types of PAD (block 302), associated type IDs (block 304), and scheduling information (block 306). In some embodiments, the deciphering keys (block 308) and the duration associated with the deciphering keys (block 310) are not broadcasted. Since UEs will have requested the Assistance Data initially point to point, the Location Server 215 may reply (e.g. in step 202 in FIG. 2) with an indication that some of the requested Assistance Data is available via broadcast. Alternatively, the Location Server 215 may not provide such an indication but may instead provide the UE with sufficient information related to the broadcast of Assistance Data to enable the UE to then look for the missing Assistance Data via broadcast. In some embodiments, Location Server 215 may provide all the Assistance Data that each UE explicitly requests by point to point means (e.g. as in transaction T1 in FIG. 2) but may record the Assistance Data requests and the areas in which they were made and use this record to predict likely future requests from other UEs in the same or other areas. Based on such a prediction, Location Server 215 may broadcast the Assistance Data that it expects UEs will later request thereby enabling these UEs to obtain the Assistance Data via broadcast and no longer need to request point to point.

The Location Server 215 may adapt the scheduling of broadcast Assistance Data according to the types and number of point to point Assistance Data requests from UEs 2212. A particular type of broadcast Provide Assistance Data message may be sent at a higher frequency when many UEs request the information contained in order to reduce the amount of point to point provisioning. The frequency of Provide Assistance Data broadcast may also be increased when 1) the location requests from UEs or from LCS clients are high (e.g. has increased), 2) the time of the day corresponds statistically to high location activity, 3) the density of attached UEs is high, or 4) the Location Server becomes congested by point to point location services. The content of the broadcast Assistance Data can also be adapted to the level of UE support. For instance, A-GNSS ephemeris, almanac, acquisition assistance and other types of A-GNSS Assistance Data can be sent more often when a large number of attached UEs 2212 support UE based A-GNSS and are able to receive A-GNSS Assistance Data via broadcast. Assistance Data content may also be adapted to the types of access networks available in a local area. For instance, broadcast of WiFi and Femto Assistance Data can occur in indoor locations where there are many WiFi access points and Femtos but not outside where there are usually only a few access points or Femto cells. In some embodiments, Assistance Data, for example as requested by a UE 220, may provide information on where and/or how Assistance Data is being broadcast. For example, the message may indicate a geographic area or set of cell sites within which location Assistance Data is broadcast and/or identification of a system which is broadcasting the location Assistance Data. The Assistance Data may instead or in addition identify a type or types of Assistance Data that are broadcast.

The Assistance Data may be ciphered by the Location Server 215, using one or more processors 2310, to allow billing for the service and/or restriction to only certain sets of UEs (e.g., home subscribers but not roamers). Cipher keys may be the same or different over different local areas (e.g. same or different per cell or per group of cells) and may be changed at intervals. Additionally, the cipher keys may also be the same or different for different types of broadcast Provide Assistance Data messages. Different cipher keys allow different levels of service to different user groups overlapping the same service area and provide for a model for selective charging of users based on the service provided. As described in FIG. 3, at block 308, the Location Server 215 can provide deciphering key values to UEs as part of other Assistance Data associated with support of broadcast Assistance Data. The deciphering key values may be associated with deciphering key IDs (which would be broadcast in the clear) so a UE 220 knows which deciphering key value to use. Furthermore, the deciphering keys may have temporal properties (disclosed at block 310) and the deciphering keys may expire after a pre-determined duration, requiring the user to periodically refresh their keys. These temporal properties of the deciphering keys allow for better control over the keys and also enable pay-per-duration usage models. Further details of ciphering techniques and exemplary embodiments are discussed in FIGS. 12, 13, 14 and 15.

It should be appreciated that the specific steps illustrated in FIG. 2 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 200.

Figure 4:
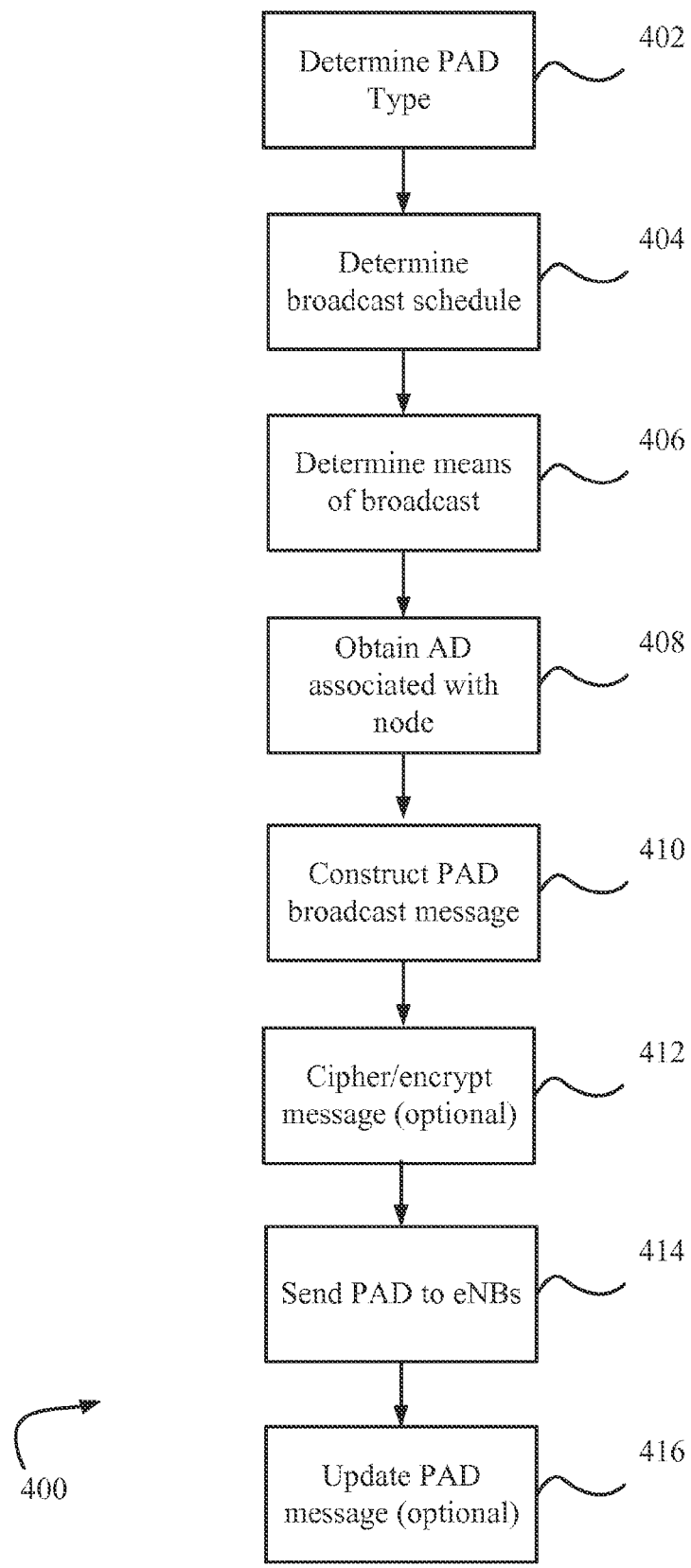
FIG. 4 is a flow diagram, showing an embodiment of the invention performed by a Location Server.

FIG. 4 is a flow diagram, showing an embodiment of the invention performed by the Location Server. The process 400 is performed by processing logic that comprises hardware (circuitry, dedicated logic, etc.), software (such as is run on a general purpose computing system or a dedicated machine), firmware (embedded software), or any combination thereof. In one embodiment, the process 400 is performed by one or more computer systems 2300 as described in FIG. 23. In one embodiment, the receiving and transmitting steps described below may be facilitated by the various devices utilizing the transceiver 2350 described in FIG. 23.

Figure 5A:
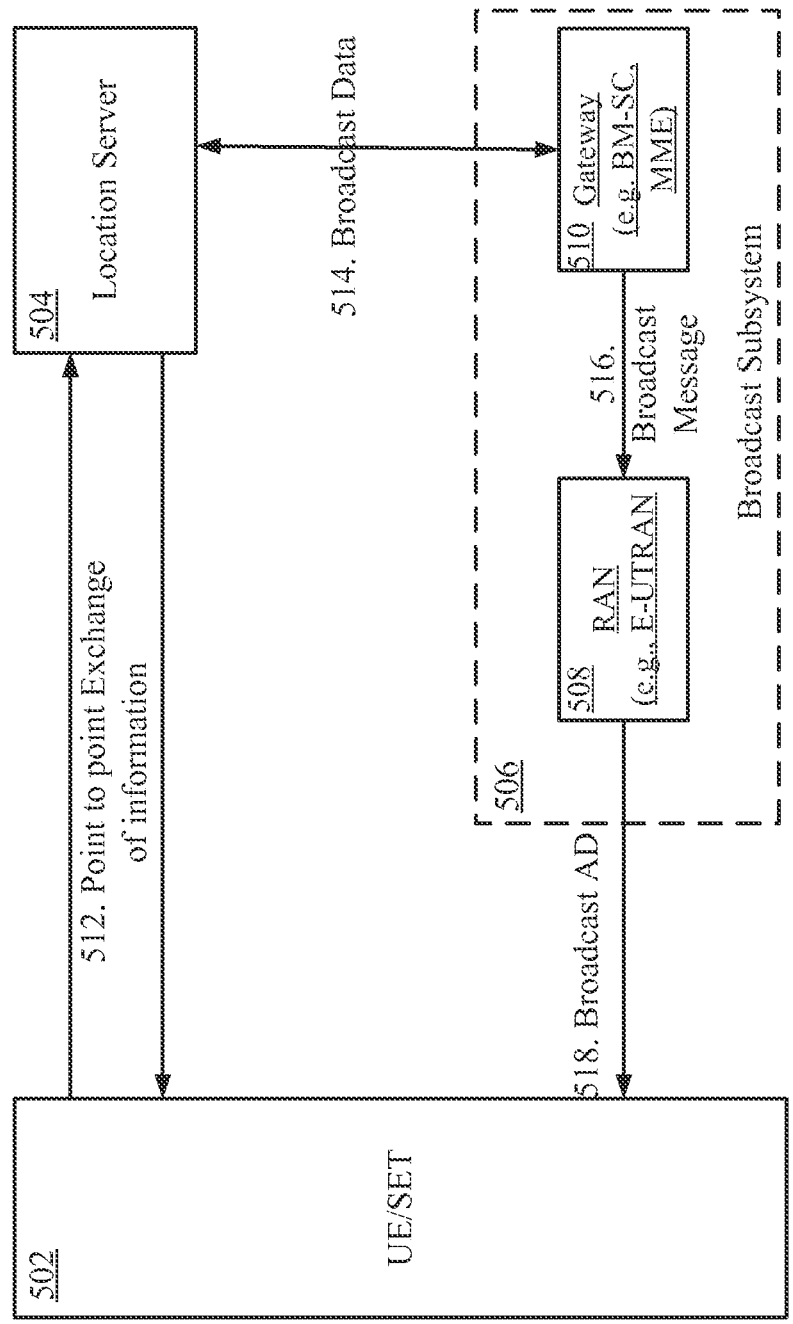
FIG. 5A is an exemplary architecture diagram describing an exemplary embodiment of the invention for a broadcast protocol for Location Services (LCS) for using a Broadcast Subsystem.
Figure 5B:
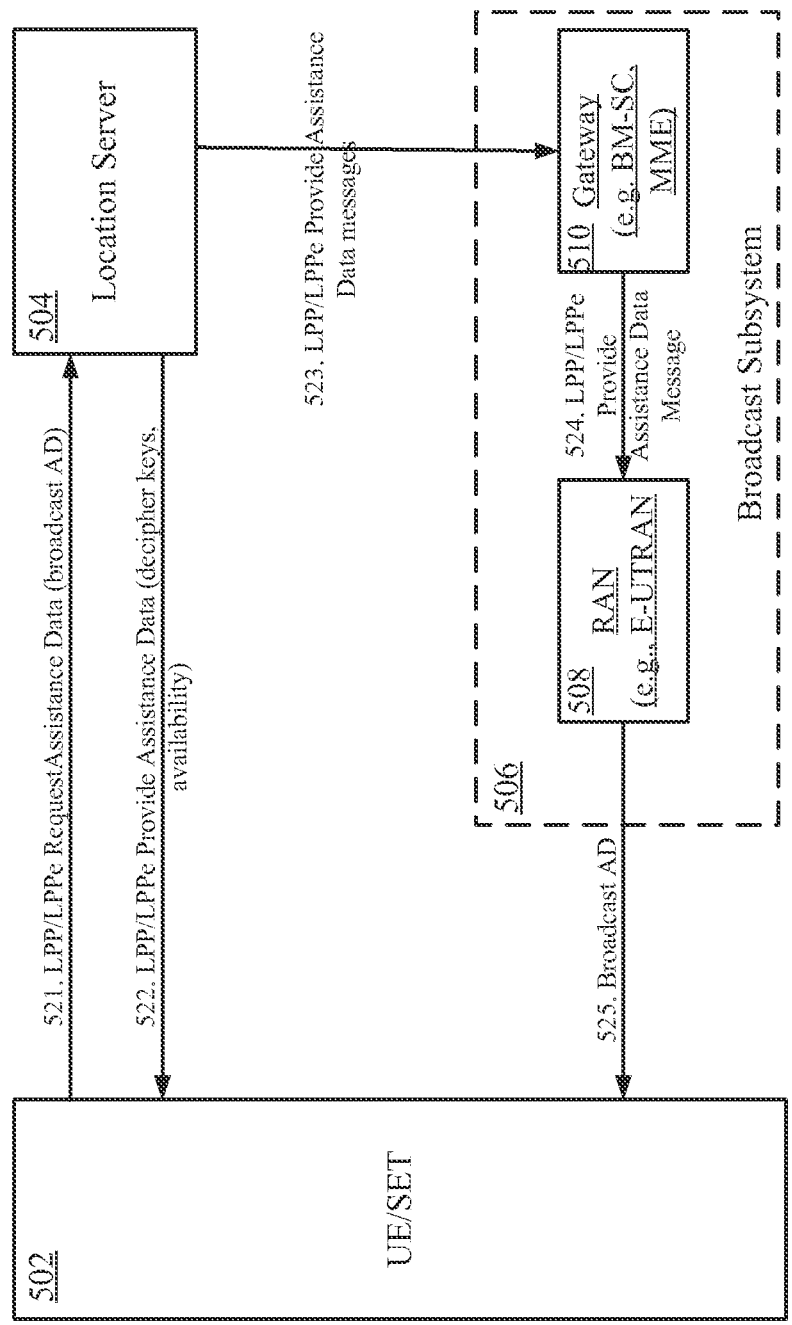
FIG. 5B is a block diagram describing an exemplary embodiment of the invention for a broadcast protocol for Location Services (LCS) for LTE using a Broadcast Subsystem.
Figure 6:
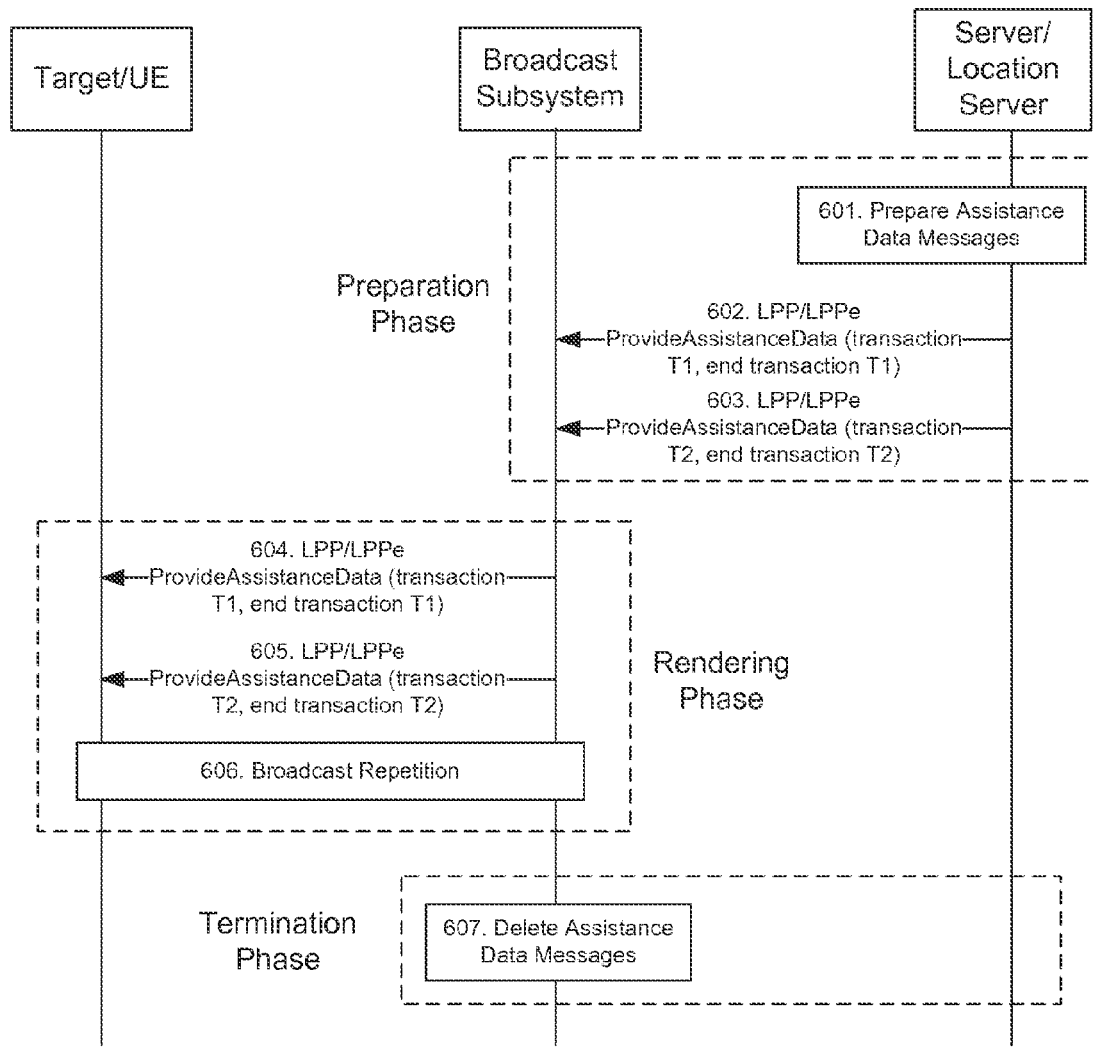
FIG. 6 is a signaling flow diagram illustrating an exemplary method performed by an embodiment of the invention for broadcasting location Assistance Data to one or more UEs.

In some embodiments, some of the responsibilities of broadcasting Assistance Data are facilitated by a Broadcast Subsystem 506 and location server 504 as discussed in FIG. 5A, FIG. 5B and FIG. 6. Referring to FIG. 4, in one embodiment, the Location Server, which may be the location server 215 of FIG. 2, may be responsible for deciding, using one or more processors 2310, what types of location Assistance Data are to be broadcast (block 402), deciding broadcast scheduling (e.g. periodicity for each PAD type) (block 404), deciding means of broadcast (e.g. LTE System Information Block (SIB), OMA BCAST (Mobile Broadcast Services Enabler Suite), eMBMS (evolved or enhanced Multimedia Broadcast and Multicast Service)) (block 406). Some Provide Assistance Data broadcast messages may be restricted to carry only certain types of Assistance Data in some broadcast systems (e.g. LPPe vendor proprietary Assistance Data such as map data might be allowed for eMBMS but not for LTE SIBs). The Location Server 215 may be configured for broadcast using operation and maintenance (O&M) signaling. O&M signaling allows adapting, controlling and upgrading of the network nodes. At block 408, the Location Server 215 obtains any Assistance Data associated with access nodes (such as network base stations and access points) including, but not limited to location coordinates and timing information from the nodes directly, through O&M signaling or through any other suitable means. The Location Server 215 may also obtain Assistance Data from other sources—e.g. GNSS reference receivers in the case of Assistance Data for A-GNSS. At block 410, the processor 2310 of the server constructs Provide Assistance Data broadcast messages in working memory 2335, based on available Assistance Data and in some cases specific to particular locations of the cell areas. For example, the server may include Assistance Data related to a certain set of neighboring base stations and access points in PAD messages to be broadcast in the general area served by these base stations and access points but not necessarily in PAD messages to be broadcast in other areas. The server also ciphers Provide Assistance Data messages, using one or more processors 2310, if ciphering is used (block 412). Details for ciphering a message are discussed in more detail in FIGS. 12, 13, 14 and 15. As part of block 412, the server may also include authentication data in PAD messages to enable recipient UEs to verify that the PAD messages received via broadcast indeed come from the Location Server 215 and not some other non-trusted source. At block 414, once the Provide Assistance Data messages are ready, the Location Server sends the Provide Assistance Data message to broadcast nodes (e.g. eNodeBs) or gateways (e.g. Mobility Management Entities (MMEs) or a Broadcast Multicast Service Center (BM-SC)), which may be part of the Broadcast Subsystem 506 of FIG. 5A/5B. The Location Server may separately include in association with each PAD message one or more of a message ID, a type ID or set of type IDs, decipher key ID, version ID and scheduling and duration information. The message ID may identify the PAD message and any later updated versions of the PAD message. The type ID or set of type IDs may indicate the type or types of Assistance Data contained in the PAD message. In some embodiments, the type ID or set of types IDs may also identify the PAD message and any later updated versions of the PAD message (e.g. if each PAD message contains a unique type ID or unique set of type IDSs) which may make inclusion of a message ID unnecessary. The decipher key ID may indicate the deciphering key value needed to decipher the PAD message. The version ID may indicate whether the PAD message has been updated with new Assistance Data where, for example, the version ID starts at some initial value (e.g. zero or one) in the first PAD message and changes (e.g. by being incremented by one) each time the content of the PAD message has changed. The scheduling and duration information may indicate the preferred periodicity of broadcast or particular triggering conditions for broadcast (such as having a certain minimum number of broadcast capable UEs in a particular serving cell) and the required overall duration of broadcast. At block 416, the Location Server 215 may update a Provide Assistance Data message when its content needs to change due to previous included Assistance Data no longer being valid and new Assistance Data being available and sends the new message possibly with an incremented version ID but same message ID to broadcast nodes to replace the previous Provide Assistance Data message of this type. In another implementation, some of the responsibilities described in reference to FIG. 4 may be shared or delegated to a Broadcast System, as described in further detail below in FIG. 5A, FIG. 5B and FIG. 6.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 400.

II. Broadcast Subsystem

FIG. 5A is a simplified architecture diagram illustrating embodiments of the invention for a broadcast protocol for Location Services (LCS) for using a Broadcast Subsystem. The interactions 512 between UE 502 and the Location Server 504, represent point to point interactions for exchanging information between the UE 502 and Location Server 504 (shown as interactions 512 of FIG. 5A) and may be conducted via one or more wireless and/or wireline networks such as GSM, UMTS, LTE, CDMA2000, HRPD, WiFi, packet cable networks (not shown in FIG. 5A). Interactions 512 may correspond to steps 201, 202, 204 and 205 in FIG. 2. The exchange of information may include information associated with broadcasting Assistance Data from the Location Server 504 to the UE 502 via the Broadcast System 506. The Location Server 504 may be implemented as a SUPL SLP, a Serving Mobile Location Center (SMLC) for GSM, a Standalone SMLC (SAS) for UMTS, an Evolved SMLC (E-SMLC) for LTE or a Position Determining Entity (PDE) for CDMA2000. The UE 502 may comprise a mobile phone, wireless PDA, PC, or any other device that can connect to a wireless or wireline IP capable network. The Location Server 504 communicates with a Broadcast Subsystem 506. In one embodiment, the Broadcast Subsystem 506 is responsible for receiving information associated with broadcasting Assistance Data from the Location Server 504 and broadcasting the Assistance Data to one or more UEs 502. The Broadcast Subsystem may exchange information with the Location Server 504, including one or more exchange of broadcast capabilities between the Broadcast Subsystem 506 and the Location Server 504, a request for specific AD from the Broadcast Subsystem 506 to the Location Server 504, an indication from the Broadcast Subsystem 506 to the Location Server 504 on the current or future available broadcast capacity, or an acknowledgement for AD data successfully transferred to the Broadcast Subsystem 506 from the Location Server 504.

In one embodiment, the Broadcast Subsystem 506 comprises a Gateway 510 and a RAN 508. In some embodiments, the Gateway 510 may be an MME or BM-SC the RAN 508 can be a system configured to operate within a GSM, UMTS, LTE, WiFi, CDMA2000, or HRPD network. The Location Server 504 broadcasts the Assistance Data via the Gateway 510 and the RAN 508 to the UE 502. In one embodiment, the message from the RAN 508 to the UE 502 is a Provide Assistance Data message, however, the interactions and data transmission between the Location Server 504 and the Gateway 510, and the Gateway 510 and the RAN 508 may comprise information associated with broadcasting Assistance Data rather than the final message that is broadcast out to the UEs. In one embodiment, Location Server 504 may perform the functions of Gateway 510 in which case Gateway 510 may not be present. Broadcasting assistance data from RAN 508 to UE/SET 502 may make use of a wireless network such a GSM, UMTS, LTE, CDMA2000, HRPD or WiFi network or access point (not shown in FIG. 5A). Broadcasting of assistance data, as exemplified by interactions 514, 516 and 518 in FIG. 5A, may correspond to steps 203, 207 and 209 in FIG. 2.

FIG. 5B is a block diagram describing an exemplary embodiment of the invention for a broadcast protocol for Location Service (LCS) using a Broadcast Subsystem. The embodiment may be applicable to LTE networks as well as to other networks such as GSM, UMTS, CDMA2000 and HRPD networks. Elements 502, 504, 506, 508 and 510 in FIG. 5B may correspond to the same numbered elements in FIG. 5A. As can be seen in FIG. 5B, a UE 502 (or SUPL Enabled Terminal (SET)) may use a point to point communication to obtain information on broadcast Assistance Data availability in some embodiments. The point to point communication may comprise an LPP/LPPe point to point communication over SUPL, for example. In some other embodiments, a UE 502 may communicate over a control plane to obtain the information. The UE 502 may additionally or instead obtain any decipher keys. The information and/or decipher keys may be obtained from a Location Server 504, for example. A UE 502 (implemented as a SET) may comprise a device that can communicate with a SUPL server (SLP). Communication with the SLP may be handled by SUPL supporting software running on the device. For example in the case of SUPL, a UE (or SET) may comprise a mobile phone, wireless PDA, PC, or any other device that can connect to a wireless or wireline IP capable network. In some embodiments, the UE 502 described above and/or with respect to FIG. 22 comprises a SET, and the two may be used interchangeably herein.

At step 521, the UE 502 may send a LPP/LPPe Request Assistance Data message to the Location Server 504. An example of the additional parameters for the LPP/LPPe Request Assistance Data message may be partially represented by FIG. 20. In response to the LPP/LPPe Request Assistance Data message, at step 522, the Location Server, in one embodiment, sends a LPP/LPPe Provide Assistance Data message with deciphering keys, geographic information, broadcast availability, etc. to the UE 502.

After and possibly before the UE 502 obtains the information and/or deciphering keys, at step 523, the Location Server 504 may send Assistance Data to one or more nodes for broadcast, such as a Broadcast Subsystem 506. For example, the Location Server 504 may package location Assistance Data into LPP/LPPe Provide Assistance Data messages (e.g. as described with respect to FIG. 4) and then send the packaged Assistance Data to a Broadcast Subsystem 506. In one embodiment, the Broadcast Subsystem 506 comprises a gateway 510 and a RAN 508 (radio access network). The Provide Assistance Data messages may arrive at the gateway 510—for example, an eMBMS BM-SC (Broadcast Multicast Service Center)—or other node, such as an MME for LTE SIB broadcast. At step 524, the gateway 510 or other node may transfer, forward, or otherwise transmit the Assistance Data to the RAN 508 for broadcast to the UE 502 (step 525), for example from network base stations. In some embodiments, Location Server 504 may transfer the Assistance Data messages to be broadcast directly to RAN 508 and may in this case emulate the functions of gateway 510.

In one embodiment, the communications illustrated in FIG. 5B and discussed above may be segmented into provisioning and broadcasting phases. In another embodiment, the communications illustrated in FIG. 5B may be segmented into preparation, rendering and termination phases as discussed below with respect to FIG. 6. For example, the preparation phase may comprise steps 521 and 522, when a UE 502 uses LPP/LPPe point to point over SUPL (or possibly control plane) to obtain information on broadcast Assistance Data availability and any decipher keys. As a further example, the rendering phase may comprise, steps 523, 524 and 525, when the Location Server 504 packages location Assistance Data into LPP/LPPe Provide Assistance Data messages which are sent to a gateway 510 (e.g. eMBMS BM-SC) or other node (e.g. MME for LTE SIB broadcast) for onward transfer to the RAN 508 for broadcast from network base stations. In some embodiments, steps 521 and 522 in FIG. 5B may correspond to steps 201 and 202, respectively, in FIG. 2 and steps 523, 524 and 525 in FIG. 5B may correspond collectively to each of steps 203, 207 and 209 in FIG. 2.

FIG. 6 is a signaling flow diagram illustrating an exemplary method performed by an embodiment of the invention for broadcasting location Assistance Data to one or more UEs. The signaling in process 600 is performed by processing logic that comprises hardware (circuitry, dedicated logic, etc.), software (such as is run on a general purpose computing system or a dedicated machine), firmware (embedded software), or any combination thereof. In one embodiment, the process 600 is performed by one or more computer systems 2300 as described in FIG. 23. In one embodiment, the receiving and transmitting steps described below may be facilitated utilizing the transceiver 2350 described in FIG. 23.

Referring to FIG. 6, the Broadcast Subsystem, Server/Location Server and Target/UE may denote, respectively, Broadcast Subsystem 506, Location Server 504 and UE/SET 502 in FIG. 5A and are then referred to as these in the description below. Thus, the Broadcast Subsystem may comprise a gateway 510, as shown in FIG. 5A and FIG. 5B. In another embodiment, the broadcast system may be interchangeably used with a gateway. In one embodiment, the Broadcast Subsystem 506 of FIG. 5A and FIG. 5B and the gateway discussed above are functionally similar.

Referring to FIG. 6, in one embodiment, the method for broadcasting the location Assistance Data to one or more UEs (e.g. UEs 2212 from FIG. 22) may be segmented into a preparation phase, a rendering phase and a termination phase. During the preparation phase, LPP/LPPe Assistance Data is transferred from the Location Server 504 to the Broadcast Subsystem 506. Depending on the Broadcast Subsystem 506, the preparation phase may include additional steps not shown in FIG. 6—e.g. exchange of broadcast capabilities between the Broadcast Subsystem 506 and the Location Server 504, a request for specific Assistance Data from the Broadcast Subsystem 506 to the Location Server 504, an indication from the Broadcast Subsystem 506 to the Location Server 504 on the current or future available broadcast capacity, an acknowledgment from the Broadcast Subsystem 506 for Assistance Data successfully transferred to the Broadcast Subsystem 506 from the Location Server 504.

At Step 601, the Location Server 504 may package the Assistance Data to be broadcast into one or more LPP/LPPe Provide Assistance Data messages, using one or more processors 2310 and working memory 2335. Each LPP/LPPe Provide Assistance Data message may be well formed (i.e. can be decoded by a UE 502 independently of other messages). The content of each message may be location and/or time specific—e.g. may be applicable to a specific geographic area and/or to a specific period of time. Each message may include an end of transaction indication. Different messages may or may not carry different transaction IDs. In some instances, messages may not include an LPP sequence number or LPP acknowledgment request. The Location Server 504 may include in each message a unique message ID and the validity time and/or the validity area for the included Assistance Data. The Location Server may optionally cipher some or all messages.

At step 602, the Location Server 504 transports an LPP/LPPe Provide Assistance Data message to the Broadcast Subsystem 506. The Location Server 504 may include additional information such as broadcast triggering conditions (e.g. periodicity), priority, applicable geographic area and time period.

At step 603, the Location Server 504 may repeat step 602 to transport one or more additional LPP/LPPe Provide Assistance Data messages to the Broadcast Subsystem 506. Depending on the interface to the Broadcast Subsystem 506, some or all of the messages in steps 602 and 603 may be sent together as a single package.

During the rendering phase, LPP/LPPe Assistance Data is broadcast to the plurality of UEs. Depending on the Broadcast Subsystem 506, the rendering phase may include additional steps not shown in FIG. 6—e.g. advance notification by the Broadcast Subsystem 506 to the UE 502 of the type or types of Assistance Data to be later broadcast together with scheduling information, requests by interested UEs to the Broadcast Subsystem 506 for information to enable subsequent broadcast reception.

At step 604, the Broadcast Subsystem 506 may broadcast the LPP/LPPe Provide Assistance Data message received in step 602 without modification. The broadcast may occur from multiple nodes (e.g. from multiple base stations) and may be accompanied by additional information identifying, for example, the type of Assistance Data and use of ciphering. The broadcasting may also employ segmentation of a large broadcast message by the broadcast subsystem 506 into a number of smaller segments with reassembly of these segments into the original broadcast message at the UE 502. A UE 502 that is both able to and chooses to receive the broadcast, using the transceiver 2350, may decipher the message, using the processor 2310, if ciphering was employed and decode the message contents. If the message includes a message ID, the target UE 502 may discard the message if a broadcast message with the same message ID was received and stored within a period less than the validity time if a validity time was included in the message or less than a pre-determined time (e.g., 24 hours) otherwise. Otherwise, the UE 502 may store the Assistance Data from the message, overwriting any previous Assistance Data of the same type, if needed. The UE 502 may use the Assistance Data to support positioning until such time as the validity time (if included in the message) has expired or the UE 502 recognizes it is no longer in the validity area (if included in the message).

In one implementation, the Location Server 504 is responsible for ensuring that any message ID included in a previous broadcast message is not reused for a new broadcast message before the message validity time, if included in the previous message, or a default value, such as 24 hours, have expired since the final broadcast of the previous message. This action may help prevent confusion of the new message with the previous message by recipient UEs. In some implementations, message duplication may be recognized in other ways (e.g. via a Cyclic Redundancy Check (CRC) on the message contents). In the event that message duplication is not recognized, the same Assistance Data will be re-stored, in working memory 2335 or storage 2325, which may be inefficient, but may not harm UE 502 operation.

At step 605, the Broadcast Subsystem 506 broadcasts the one or more additional LPP/LPPe Provide Assistance Data messages received in step 603 in a similar manner to step 604. At step 606, broadcast of each message in steps 604 and 605 may be repeated and the periodicity or other triggering conditions for broadcasting each message may be the same or different.

During the termination phase, LPP/LPPe Assistance Data that no longer needs to be broadcast may be removed from the Broadcast Subsystem 506. Depending on the Broadcast Subsystem 506, the termination phase may include additional steps not shown in FIG. 6—e.g. notification by the Broadcast Subsystem 506 to the Location Server 504 concerning the actual number of broadcasts for each LPP/LPPe Provide Assistance Data message, the areas in which and/or nodes from which the broadcasts occurred and, if known, the size of the UE audience. At step 607, the Broadcast Subsystem 506 ceases broadcasting any message received at step 602 or 603 and deletes it when instructed by the Location Server 504 or when dictated by scheduling information originally received at step 602 or step 603, for example.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 600.

Figure 7:
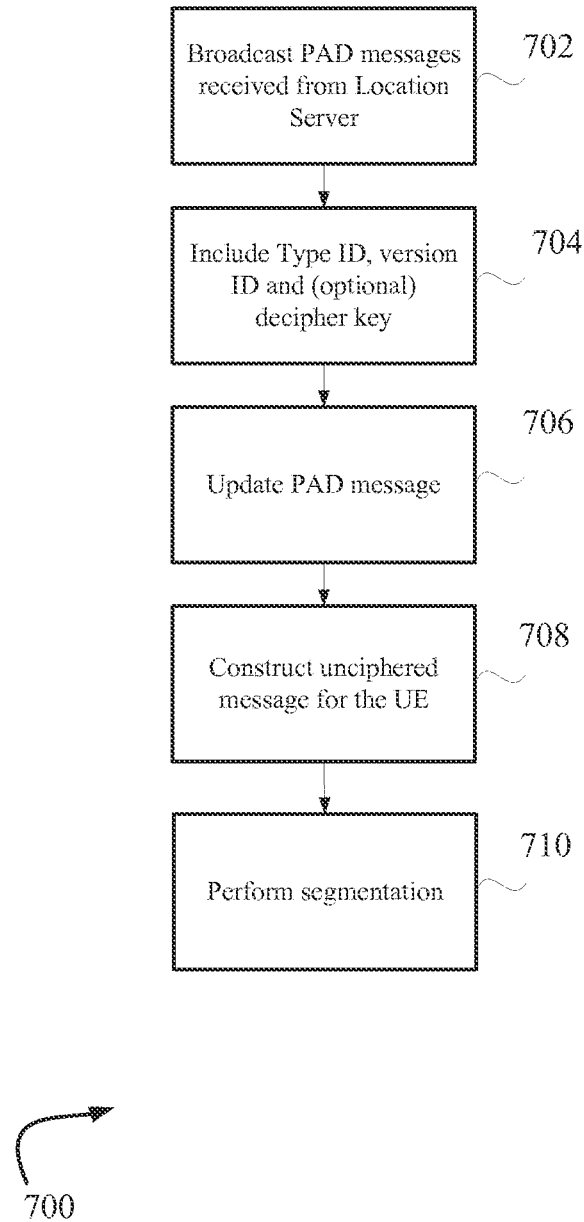
FIG. 7 is a flow diagram, showing an embodiment of the invention performed by a Broadcast Subsystem.

FIG. 7 is a flow diagram, showing an embodiment of the invention performed by the Broadcast Subsystem. The process 700 is performed by processing logic that comprises hardware (circuitry, dedicated logic, etc.), software (such as is run on a general purpose computing system or a dedicated machine), firmware (embedded software), or any combination thereof. In one embodiment, the process 700 is performed by one or more computer systems 2300 as described in FIG. 23. In one embodiment, the receiving and transmitting steps described below may be facilitated utilizing the transceiver 2350 described in FIG. 23.

As shown in FIG. 7, the broadcast system is responsible for broadcasting Provide Assistance Data messages received from a Location Server 504, such as Location Server 504 in FIG. 5A and FIG. 5B, according to the scheduling and for the duration (block 702), while possibly also broadcasting control parameters in association with each broadcast PAD message comprising one or more of a message ID, a type ID or set of type IDs, a version ID and optionally a decipher key ID, authentication information and other parameters (block 704). The control parameters may have been received from the Location Server 504 along with the broadcast message—e.g. may have been transferred in step 523 of FIG. 5B or step 602 or 603 of FIG. 6. The message ID may enable a recipient UE 502 to determine whether a particular message was already received or not. The version ID may tell a recipient UE 502 whether a particular message has been updated with new Assistance Data. The type ID or set of types IDs may tell a recipient UE 502 what type or types of Assistance Data are contained in the message and enable the UE 502 to decide if the broadcast message should be received or ignored. In some embodiments, the type ID or set of types IDs may also identify the PAD message and any later updated versions of the PAD message (e.g. if each PAD message contains a unique type ID or unique set of type IDs) which may make inclusion of a message ID unnecessary. The decipher key ID may identify a decipher key value received earlier by the UE 502 (e.g. by point to point means from the Location Server) that is needed to decipher the broadcast message. The authentication information may enable a recipient UE 502 to verify that the broadcast message was originated from the particular trusted Location Server 504. In some embodiments, one or more of the control parameters may be embedded inside the broadcast message by the Location Server 504 and not be visible to or require explicit transfer from the broadcast subsystem 506. The Broadcast Subsystem 506 may also replace a previous Provide Assistance Data message with any updated Provide Assistance Data message received from the Location Server 504 (block 706). At block 708, the Broadcast Subsystem 506 may possibly also construct and then broadcast an un-ciphered broadcast message containing the types IDs for PAD messages being broadcast and their associated scheduling information to enable UEs to promptly determine what is being broadcast and when. Furthermore, at block 710, the Broadcast Subsystem 506 may also be responsible for performing any segmentation of individual Provide Assistance Data messages wherein each segment may contain one or more of the message ID, the type ID, a segment number and possibly the total number of segments.

It should be appreciated that the specific blocks/steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 700.

Figure 8:
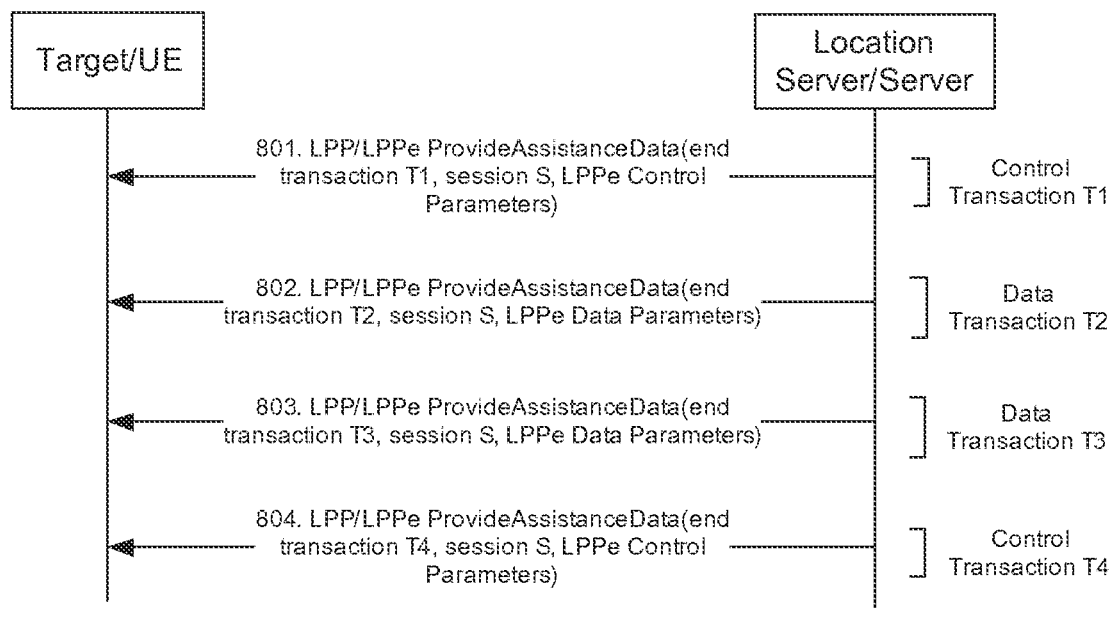
FIG. 8 is a signaling flow diagram illustrating an exemplary embodiment for a Periodic/Triggered Assistance Data Transfer, initiated and terminated for transfer of Assistance Data via broadcast.

FIG. 8 is a signaling flow diagram illustrating an exemplary embodiment for a Periodic/Triggered Assistance Data Transfer, initiated and terminated for transfer of Assistance Data via broadcast. The signaling in process 800 is performed by processing logic that comprises hardware (circuitry, dedicated logic, etc.), software (such as is run on a general purpose computing system or a dedicated machine), firmware (embedded software), or any combination thereof. In one embodiment, the process 800 is performed by one or more computer systems 2300 as described in FIG. 23. In one embodiment, the receiving and transmitting steps described below may be facilitated utilizing the transceiver 2350 described in FIG. 23.

Embodiments of the invention, as described in FIG. 8 may enable the same Assistance Data that would normally be transferred using the point to point "Periodic/Triggered Assistance Data Transfer with Update" procedure defined for OMA LPPe version 1.0 (in OMA TS OMA-TS-LPPe-V1_0) to be transferred instead using broadcast. In the point to point "Periodic/Triggered Assistance Data Transfer with Update" procedure defined for LPPe version 1.0, a target UE and Location Server initially agree, using a control LPP/LPPe transaction, specific types of Assistance Data that the Location Server will subsequently periodically send to the target using a separate data transaction. During the data transaction, the target UE or Location Server can request a change to the type or types of Assistance Data being transferred using another control transaction after which the initial data transaction continues but with the newly requested Assistance Data now being transferred. In the case of Assistance Data transferred via broadcast to many target UEs, it may not be possible for the Location Server to initially agree the types of Assistance Data to be transferred with each target UE by point to point means as, for example, the Location Server may not know which target UEs may wish to receive this Assistance Data. This may create a problem for certain types of Assistance Data defined in LPPe version 1.0 that can only be sent using the "Periodic/Triggered Assistance Data Transfer with Update" procedure because it may not then be possible to broadcast such Assistance Data—e.g. using the procedure exemplified here in FIG. 6.

To circumvent the above problem, the procedure exemplified in FIG. 8 may be employed for Assistance Data defined to be sent point to point using the "Periodic/Triggered Assistance Data Transfer with Update" procedure. In one embodiment, the Location Server 504 broadcasts an LPP/LPPe Provide Assistance Data message in step 801 using the procedure described in FIG. 7 and/or FIG. 6. The message may use an arbitrary transaction ID T1 and indicate the end of this transaction. The message may contain a periodic/triggered session ID S chosen by the Location Server 504, an indication that this is a response to an initial request (for compatibility with LPPe version 1.0), LPPe control parameters identifying the type or types of Assistance Data to be transferred in later steps, the triggering or periodicity conditions for sending this data and a duration or other specific conditions for ending the Assistance Data transfer. The Location Server 504 may ensure that the session ID S is not used for any other periodic/triggered Assistance Data transfer in any geographic area at the same time as the procedure of FIG. 8 is ongoing and for a pre-determined period (e.g., 24 hours) after the procedure in FIG. 8 terminates. In one embodiment, the session ID S may be defined as an integer between 1 and 256. In another implementation, the session ID S may include the provider ID, server ID and a 4 octet local session ID. The message in step 801 may be identical or almost identical to the message sent by a server point to point to a target UE to agree an initial UE request for transfer of Assistance Data point to point according to the "Periodic/Triggered Assistance Data Transfer with Update" procedure in LPPe version 1.0.

The Location Server 504 may periodically re-broadcast the message in step 801 to reach additional targets. A UE 502 that receives the message in step 801 via broadcast may identify the message as belonging to the "Periodic/Triggered Assistance Data Transfer with Update" procedure from inclusion of the session ID S and the indication that this is a response to an initial request for periodic/triggered Assistance Data transfer. If a UE 502 receives a subsequent message via broadcast that is identified as belonging to step 801 and carries the same session ID S as that for an ongoing procedure of this type and if the message may not be identified as a duplicate of the message that initiated this procedure (e.g. from use of the same broadcast message ID), then the UE 502 may abort reception for the ongoing procedure and may instigate reception for a new procedure based on the control parameters included in the subsequent message.

When the first triggering or periodicity condition occurs, the Location Server 504 sends via broadcast (e.g. using the procedure in FIG. 7 and/or the procedure in FIG. 6) an unsolicited LPP/LPPe Provide Assistance Data message containing the periodic/triggered session ID S assigned in step 801, an indication that this is a periodic/triggered Assistance Data delivery, and LPPe data parameters containing the Assistance Data indicated by the LPPe control parameters transferred in step 801. The message may carry an arbitrary transaction ID T2 and indicate the end of a transaction. In one implementation, no other Assistance Data may be included other than that indicated in step 801.

The Location Server 504 or Broadcast Subsystem 506 may continue to broadcast further LPP/LPPe Provide Assistance Data messages containing new Assistance Data conforming to what was indicated in step 801 when each additional triggering or periodicity condition occurs. Each subsequent message may carry the session ID S, an arbitrary transaction ID T3 and an end of transaction indication. Messages broadcast in steps 802 and 803 may also be resent by the broadcast subsystem in order to reach more target UEs. UEs that already received these messages may determine that the additional transmissions are duplicates from inclusion of the same message IDs. The session may be terminated by the Location server 504 at any time, after which the session ID S may not be used again for a period of 24 hours in one implementation. A UE that is receiving the messages in steps 801, 802 and 803 may assume the procedure has terminated if step 802 or a repetition of step 803 are not observed for a period of time, such as an hour.

When the session is terminated, a Location Server 504 may optionally broadcast an LPP/LPPe Provide Assistance Data message to indicate that the session is terminated. The message may contain an arbitrary transaction ID T4, an indication that this is the end of a transaction, the periodic/triggered session ID S and an indication that this is a server update for a Periodic/Triggered Assistance Data transfer. The message may also contain LPPe control parameters indicating a zero or minimal duration (depending on what is defined for the associated Assistance Data) and a zero or minimal applicable geographic region. The message may be periodically re-broadcast to reach more UEs. Recipient UEs may then replace the old control parameters with the new ones and thereby end or soon end the session.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 800.

III. Scheduling Using System Information Blocks (SIBs)

In one embodiment, where distinct broadcast channels are supported, Assistance Data information may be conveyed by particular broadcast channels. A broadcast channel may be some logical or physical portion of the overall broadcast capability supported by a particular broadcast subsystem. As an example, each distinct System Information Block (SIB) broadcast by LTE eNodeBs may be considered to be a separate broadcast channel. Distinct channels may be used either specifically or generically. With specific use, each broadcast channel may be assigned to carry just one type of broadcast PAD. The assignment of the broadcast PAD type may be fixed and standardized. Also, the assignment could be dynamic with each channel (or a master channel like SIB1 for LTE) defining the Assistance Data type ID conveyed by the particular channel. The dynamic information for each channel may be transmitted using a specific pre-designated channel, such as SIB1 or some other SIB in the case of LTE. SIB1 may also contain parameters needed to determine if a cell is suitable for cell selection, as well as information about the time domain scheduling of the other SIBs.

For generic use of broadcast channels, one channel may carry multiple types of broadcast PAD. The supported PAD type IDs and their associated scheduling for a particular broadcast channel may then be defined by a scheduling message with its own PAD type ID that is also broadcast on the same channel. In an alternate embodiment, as discussed before, the types of broadcast PADs transmitted on a particular broadcast channel and their scheduling could be provided by the server to each UE using a point to point connection with LPP/LPPe (e.g. as in steps 201 and 202 in FIG. 2). In the cases described above, a long Provide Assistance Data message may be segmented into separate segments by the broadcast subsystem (e.g. eNodeB) and sent as separate messages on a broadcast channel.

SIBs for LTE carry network related information to all UEs and may be broadcast in each cell by the eNodeB. Each SIB has a unique definition (e.g. in 3GPP TS 36.331) associated with specific data that it transports. One or more SIBs may be carried within a SIB message, which is broadcast with a defined periodicity, such as 8 to 512 radio frames (e.g. 1 radio frame may occupy 10 msecs). One or more SIB messages may be broadcast each containing a distinct set of SIBs.

Figure 9:
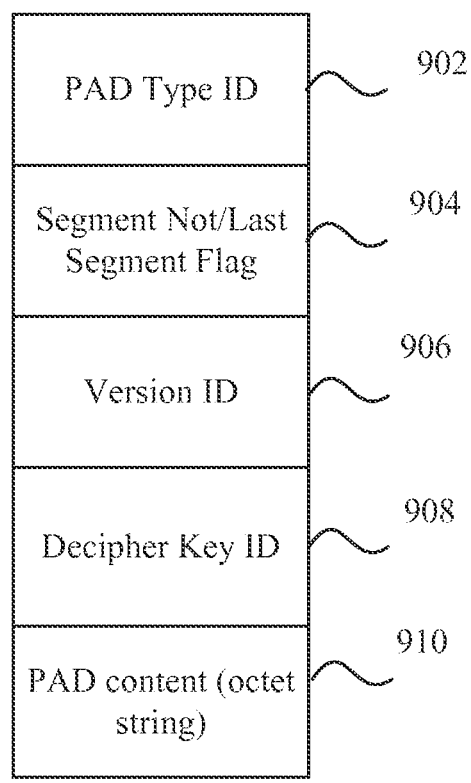
FIG. 9 is a block diagram of an exemplary data structure showing the additional information that may be included in a LPP/LPPe Provide Assistance Data message, when there is a one-to-one correspondence between the system information block (SIB) and the Provide Assistance Data message.

FIG. 9 is a block diagram of an exemplary data structure showing the additional information that may be included in a SIB, when there is a one-to-one correspondence between the SIB and a particular type of Provide Assistance Data message carried by the SIB. In one embodiment, the SIBs are used in one-to-one correspondence with the PADs. One new SIB would be used for each PAD type ID that is supported, such as GNSS almanac, GNSS acquisition assistance, GNSS ephemeris, or WiFi data. The Assistance Data content for a particular SIB could be defined by 3GPP as part of the SIB definition or some other organization (e.g. OMA) could define the PAD content as part of LPPe, which may define how the Provide Assistance Data message will be conveyed by the assigned SIB. An exemplary set of additional data in the SIB is shown in FIG. 9. In one embodiment, the SIB could include 1) a PAD type ID (902) for the PAD message being conveyed which may be included when a SIB is allowed to carry more than one type of PAD message, 2) a segment number or a last/not last segment flag (904) if the PAD message is segmented such that a SIB only carries one message segment at a time, 3) a version ID (906) indicating whether a PAD message has or has not been updated, 4) a decipher Key ID (908) indicating a decipher key value to be used to decipher the message, and 5) the PAD message content (910) (e.g. carried as an octet string). In addition, the SIB may also include authentication information (not shown). Only some of the data fields may need to be repeated in the SIB for further segments after the first segment has been transferred in the SIB when segmentation is used. In addition, the PAD type may not need to be conveyed if the association of the PAD type with a particular SIB is fixed (e.g. defined in 3GPP TS 36.331), but may be conveyed when the association is dynamic in some embodiments.

Figure 10:
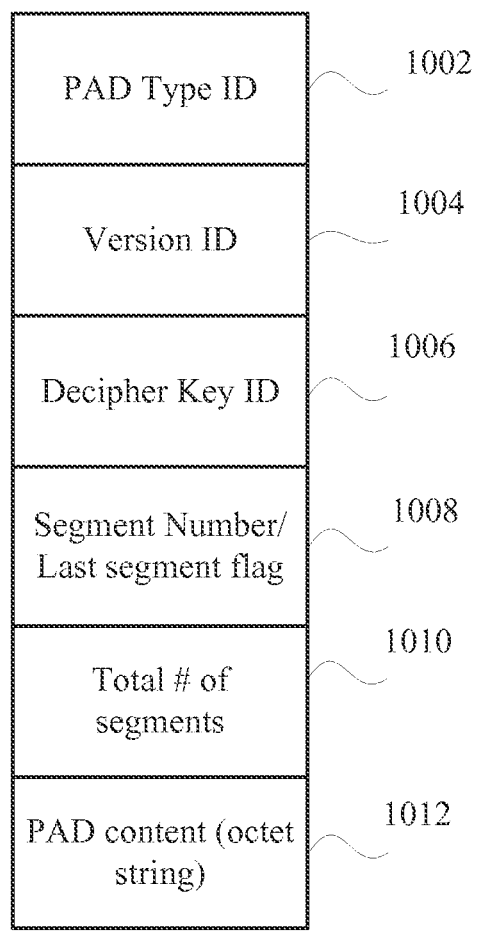
FIG. 10 is another block diagram of an exemplary data structure showing the additional information that may be included in a LPP/LPPe Provide Assistance Data message, when multiple PAD types may be assigned to one SIB.

FIG. 10 is another block diagram of an exemplary data structure showing the additional information that may be included in a SIB, when multiple PAD types may be conveyed by one SIB. In one embodiment, multiple PAD types may be conveyed by one SIB, where one or a few new SIBs are defined to each carry multiple PAD types. Each new SIB could be carried in its own SIB message or could share a common SIB message with other SIBs. Each new SIB may transport one Provide Assistance Data message or one Provide Assistance Data segment each time it is sent. The content of each new SIB may be 1) a PAD type ID (block 1002), 2) a version ID (e.g. included for the first segment only when a message is segmented) (block 1004), 3) a decipher key ID (block 1006), 4) a segment Number or last/not last segment flag (included if a message is segmented) (block 1008), 5) the total number of segments (e.g. included for the first segment only if a message is segmented) (block 1010), and 6) the PAD message content (e.g., carried as an octet string with a fixed maximum size) (block 1012). When segmentation is used, segments of each message may be broadcast serially but consecutive segments from one message could be interleaved with segments from another message in consecutive transmissions of the same SIB.

In another embodiment, when multiple PAD types can be conveyed within one SIB, the server may provide a master schedule for the SIB to each eNodeB using the 3GPP LPPa protocol defined in 3GPP TS 36.455. Alternatively, each eNodeB could create its own master schedule based on less detailed scheduling instructions from the server. The master schedule determines the scheduling of Provide Assistance Data messages within the SIB and may itself be broadcast. The schedule for broadcasting the master schedule itself may be referred to in the SIB and, in one embodiment, may be further referred to in the master schedule as well. In one embodiment, the PAD type used to refer to the master schedule uses a reserved PAD type (e.g. of zero). The master schedule defines the order of Provide Assistance Data messages or Provide Assistance Data segments when segmentation is used that are broadcast within the SIB and may include the schedule for an integral number of transmissions for each PAD message in order that when the sequence of PAD transmissions defined within the master schedule are complete there will be no outstanding un-transmitted segments for any PAD message. In addition, Provide Assistance Data message content may not change for any PAD message during one master scheduling cycle (in order that recipient UEs only need to receive one transmission of each message during the master scheduling cycle, for example), but may change in a new cycle.

Figure 11:
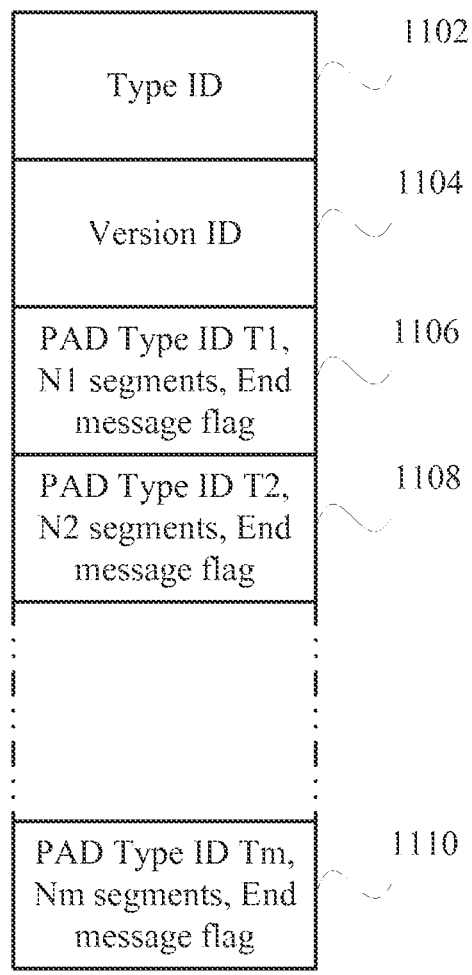
FIG. 11 is block diagram of an exemplary data structure showing the additional information that may be included in LPP/LPPe Provide Assistance Data message for scheduling, when multiple PAD types are scheduled within one SIB.

FIG. 11 is block diagram of an exemplary data structure showing the information that may be included in the master schedule for scheduling PAD transmission according to the embodiment just described, when multiple PAD types are scheduled within one SIB. As shown in FIG. 11, the master schedule message content may contain 1) a PAD type ID to identify the master schedule message (block 1102), 2) a version ID of the master schedule (which may be incremented whenever master schedule changes) (block 1104), and 3) PAD Type IDs (T1, T2, T3, .... Tm) for each PAD message being scheduled, the corresponding number of segments or messages associated with each PAD Type (N1, N2, N3, .... Nm), and an end message flag for each PAD message (blocks 1106, 1108 and 1110). Each of the PAD Type ID entries refers to consecutive transmission of segments or complete messages for the given PAD type. Thus, the schedule implies that either N1 segments or N1 complete messages for PAD type T1 will be initially broadcast using the SIB after any new master scheduling cycle has started followed by either N2 segments or N2 complete messages for PAD type T2 followed by either N3 segments or N3 complete messages for PAD type T3 and so until the scheduling cycle ends after either Nm segments or Nm complete messages have been transmitted for PAD type Tm. Each PAD type entry may further indicate whether complete messages or only message segments will be broadcast (e.g. whether N1 segments or N1 complete messages will be broadcast for PAD Type T1). In the case that message segments are to be broadcast, the end message flag may indicate whether the last message segment sent ends a complete message. It may be assumed (e.g. defined as part of the master schedule) that when message segments are broadcast, all segments will belong to the same PAD message. As an example, the following entry could be included in the master schedule: "PAD Type ID Ti, Ni segments, end message=Yes". This would indicate transmission of Ni segments for the PAD type with Type ID Ti at this point in the master schedule and would further indicate that the last segment transmitted in this sequence terminated a complete PAD message. If the Location Server creates the schedule, it may be beneficial to know details about SIB content and maximum size and the periodicity of SIB transmission. In one embodiment, the Location Server may be configured using O&M.

FIGS. 9, 10 and 11 describe embodiments in which information related to broadcast of PAD messages on a SIB, such as information on broadcast content (e.g. PAD type ID) and/or information on broadcast scheduling (e.g. a master schedule), is provided by a SIB to target UEs in an LTE wireless network. In other embodiments, this information may be provided to target UEs using a SIB different to the SIB on which broadcast of PAD messages occur or may be provided to UEs by point to point means—e.g. as in step 2 in FIG. 2. In yet other embodiments, which may apply to LTE wireless networks or to other networks, broadcast of PAD messages may occur on a broadcast channel (e.g. a WiFi channel) or using a broadcast system (e.g. eMBMS) different to an LTE SIB and information related to this (e.g. information on broadcast content and/or broadcast scheduling) may be the same as or similar to that described in FIGS. 9, 10 and 11 and may further be provided using the same broadcast channel or the same broadcast system as that on which PAD messages are broadcast or may be provided using a different broadcast channel or different broadcast system or may be provided by point to point means.

IV. Ciphering/Authentication

Encapsulated and Unencapsulated Broadcast Assistant Data Message:

A broadcast Assistance Data message (e.g. as broadcast according to FIG. 6 or FIG. 8) may comprise, a) an unencapsulated and unciphered LPP Provide Assistance Data message, b) an unencapsulated and unciphered LPP/LPPe Provide Assistance Data message, c) an encapsulated LPP Provide Assistance Data message that may optionally be ciphered and/or digitally signed, or d) an encapsulated LPP/LPPe Provide Assistance message that may optionally be ciphered and/or digitally signed. An unencapsulated message may consist of an LPP Provide Assistance Data message without an LPPe extension as defined for example in 3GPP TS 36.355 in case (a) or an LPP Provide Assistance Data message with an LPPe extension in case (b) as defined for example in OMA LPPe version 1.0.

Broadcast capable UEs may be informed of the variant being used by a server by point to point means—e.g. whether the server uses variant (a), (b), (c) or (d) above. Target UEs that have minimal broadcast capability (e.g. that do not support reception of Assistance Data point to point related to broadcast support and do not support variants (c) and (d) above) may assume the unencapsulated variant (a) or (b) and may then encounter decoding errors if the encapsulated variant (c) or (d) is used. Such UEs may then cease employing a particular broadcast system for receiving broadcast messages once a certain number of consecutive decoding errors are encountered.

Figure 12:
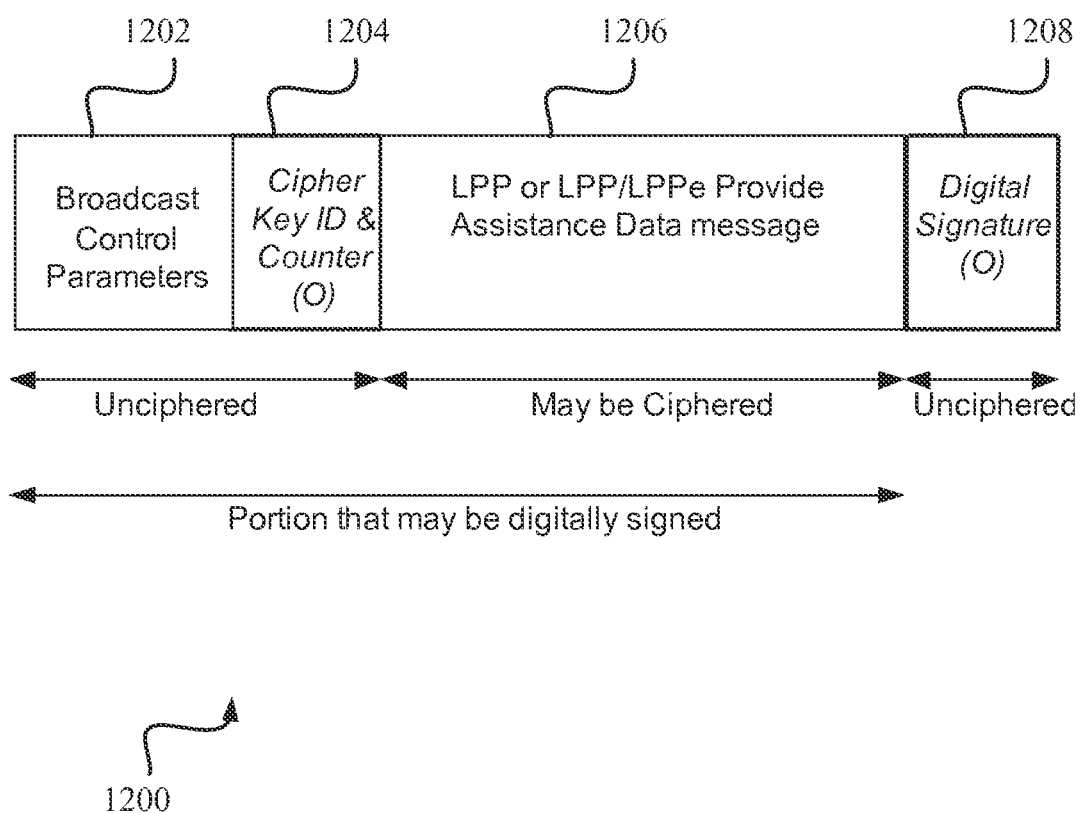
FIG. 12 illustrates an exemplary embodiment of an encapsulated broadcast message transmitted by a server.

FIG. 12 illustrates an exemplary embodiment of an encapsulated broadcast message transmitted by a server for case (c) and case (d). In one embodiment, the server is a Location Server. In another embodiment, the server is a node belonging to a Broadcast Subsystem 506. An encapsulated broadcast message comprises a plurality of broadcast control parameters (block 1202) and a Provide Assistance Data message (block 1206). The Provide Assistance Data message (block 1206) may be an LPP Provide Assistance Data message defined for example as in 3GPP TS 36.355 for case (c) or an LPP/LPPe Provide Assistance Data message defined as in the OMA LPPe specification for case (d). The Location Server may or may not select ciphering and/or digitally signing the encapsulated broadcast message. Additional message portions may be included in the encapsulated broadcast message, if the Location Server ciphers or digitally signs the encapsulated broadcast message.

The broadcast control parameters enable detection of an already received broadcast message and may contain information on the geographic and time applicability of the message and the types of Assistance Data included. The cipher key ID and counter value (block 1204) are included when ciphering is used and enable a recipient UE to determine the key value to be used for deciphering. The message portion (block 1206) contains an LPP or LPP/LPPe Provide Assistance Data message and may be ciphered. A digital signature (block 1208) may be appended, as shown in FIG. 12, and, if so, may be computed over portions of the message or the entire preceding message content. In FIG. 12, inclusion of an "(O)" indication for a block indicates that the block may be optional whereas inclusion of an "(M)" indication for a block or lack of an "O" indication indicates inclusion of the block may be mandatory in some embodiments. In other embodiments, the optional or mandatory elements may differ. In FIG. 12, a block A shown to the left of another block B indicates block A is transmitted before block B. In some embodiments, the blocks are transmitted in a different order than illustrated.

Figure 13:
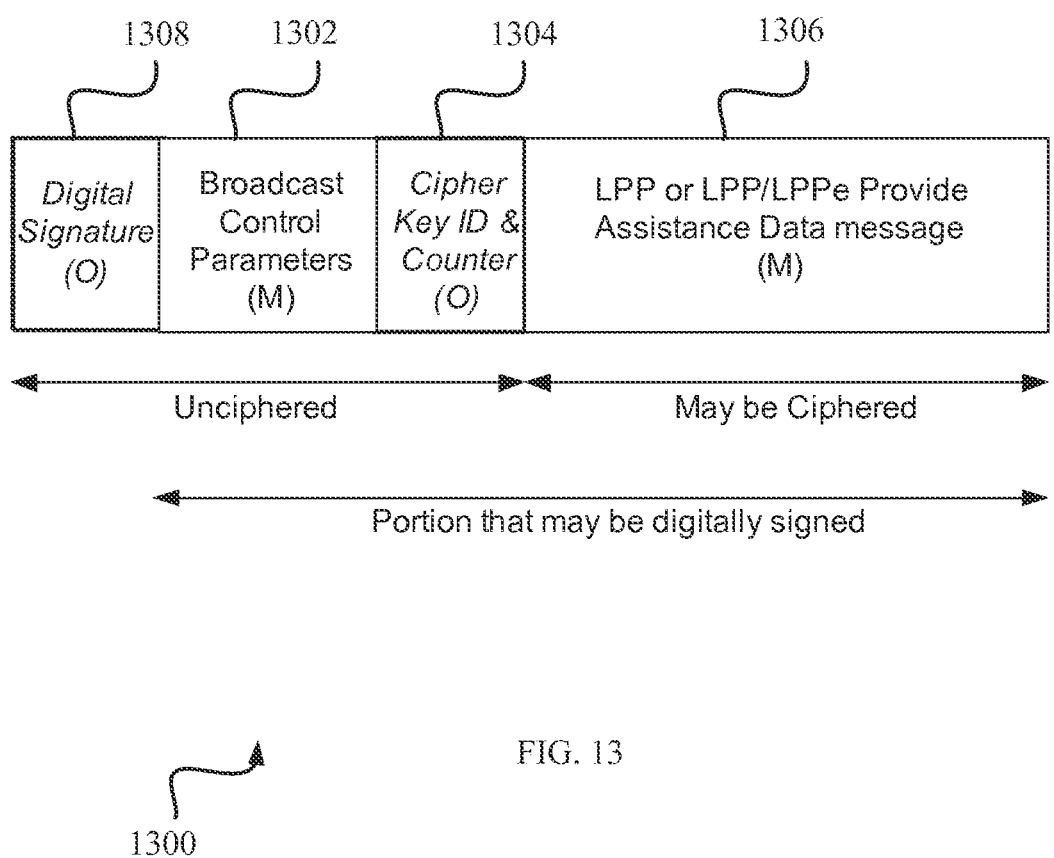
FIG. 13 illustrates another exemplary embodiment of an encapsulated broadcast message transmitted by a server.

FIG. 13 illustrates another exemplary embodiment of an encapsulated broadcast message transmitted by a server and uses the same conventions "(O)" and "(M)" as in FIG. 12 and the same conventions on block transmission order in some embodiments. In one embodiment, the server is a Location Server 504. In another embodiment, the server is a node belonging to a Broadcast Subsystem 506. The Location Server 504 may or may not select ciphering and/or digitally signing the broadcast message. Additional message portions may be included in the broadcast message, if the Location Server ciphers or digitally signs the broadcast message.

The broadcast control parameters (block 1302) enable detection of an already received broadcast message and may contain information on the geographic and time applicability of the message and the types of Assistance Data included. The cipher key ID and counter value (block 1304) are included when ciphering is used. The message portion (block 1306) contains an LPP or LPP/LPPe Provide Assistance Data message and may be ciphered. A digital signature (block 1308) may be prepended, as shown in FIG. 13, and, if so, may be computed over portions of the message or the entire preceding message content.

As shown in FIG. 13, the digital signature portion (block 1308) contains the associated public key identifier and may appear at the beginning of the message so that a target can determine as soon as reception begins whether it has the correct public key and, if so, can begin the authentication process while message reception is in progress.

In one embodiment, the Location Server may digitally sign the broadcast message. In one implementation, the Location Server may use asymmetric cryptography, such as RSA or elliptical cryptography or any other suitable means for digitally signing the broadcast message. In some aspects, a hash of the broadcast message may be signed. The Location Server may sign portions of the message or the entire encapsulated broadcast message. Authentication options enable a server to protect target UEs against spoofing of broadcast data by an attacker. The server may, for example, instruct all UEs via point to point means (e.g. as in steps 201 and 202 of FIG. 2) that all broadcast PAD messages received using a particular broadcast subsystem and/or in a particular area are to be authenticated. If a target UE receives a broadcast PAD message using such a subsystem and in the particular area if included that does not contain a digital signature or that contains a digital signature that fails verification or refers to a key that the target UE does not possess, the target UE may discard the message. The target UE may then only accept messages that contain a verifiable digital signature. This convention may ensure that fraudulent broadcast of false location Assistance Data cannot be used to dupe target UEs into computing false locations or making false measurements and may serve to ensure integrity and reliability of location services.

Ciphering the Broadcast Assistant Data Message:

The Location Server may cipher the broadcast message. As shown in FIG. 12 and FIG. 13, in one implementation, the Provide Assistance Data message may be ciphered. The Location Server may use symmetric cryptography, such as the Advanced Encryption Standard (AES) defined in Federal Information Processing Standards Publication 197, "Specification for the ADVANCED ENCRYPTION STANDARD (AES)", published in November 2001, or any other suitable means for ciphering the Assistance Data message. In one implementation, a 128-bit key value may be used for AES and counter mode may be used as defined in the National Institute of Standards and Technology (NIST) Special Publication 800-38A, "Recommendation for Block Cipher Modes of Operation Methods and Techniques", published in 2001. An example of such as implementation is further discussed in FIG. 15. An initial counter C1 may be used to cipher a LPP/LPPe message provided to the UE by a server. Counter C1 may be provided to the UE in two portions. The first portion, denoted C0, may be provided using point-to-point mode along with a ciphering key value (example, 128-bits). Additionally, an identifier (cipher key ID) for the first portion of the counter and the ciphering key value may be provided to the UE using point-to-point mode—e.g. according to steps 201 and 202 of FIG. 2. The cipher key ID may be included in the encapsulated broadcast message (e.g. in block 1204 of FIG. 12 and block 1304 of FIG. 13) to identify the ciphering key value for deciphering the message by the device. The second portion, denoted D0, may be provided in unciphered form as part of the overall encapsulated message—e.g. as part of block 1204 in FIG. 12 and block 1304 in FIG. 13. A UE may then obtain C1 as:

$$C1 = (C0 + D0) \bmod 2^{**}128 \quad \text{(Equation 1)},$$

where all values are treated as non-negative integers. In equation 1 and in other equations here, the double asterisk notation (**) denotes exponentiation. The value for D0 may be different for different broadcast messages and may help ensure that the counters derived from C1 for each message are different to the counters derived for any other message. To obtain any subsequent counter Ci from the previous counter Ci−1 for any message (as needed for counter mode AES deciphering of the message blocks contained within a message), the following operation may be used:

$$Ci = (Ci-1+1) \bmod 2^{**}128 \quad \text{(Equation 2)}.$$

Authenticating the Broadcast Assistance Data Message:

The broadcasted Provide Assistance Data messages may be optionally digitally signed by the server to protect target UEs against spoofing of broadcast data by an attacker. The server may be the Location Server or a node part of the Broadcast Subsystem. Assistance data may be optionally digitally signed using techniques such as asymmetric cryptography. In one implementation, the RSASSA-PSS variant of the PKCS#1 v.2.1 RSA method defined in "PKCS#1 v2.1: RSA Cryptography Standard", RSA Laboratories, published in June 2002 and in Internet Engineering Task Force (IETF) Request For Comments (RFC) 3447 where IETF RFC 3447 may take precedence for conflicts. These references define a set of fixed procedures and some optional procedures. An exemplary method for LPP/LPPe may use the following procedures and options for authentication, as shown in Table 1 below:

TABLE 1

Applicable Authentication Procedures and Options

| Authentication Input | Procedure or Option Used | PKCS#1 v2.1 and RFC 3447 section |
|---|---|---|
| Encoding method | EMSA-PSS | 9.1 |
| Hash Function | SHA-256 as defined in NIST 180-4 | 9.1.1, 9.1.2 |
| Mask Generation Function | MGF1 with SHA-1 as defined in NIST 180-4 | B.2.1 |
| Encoding salt length | 0 to 32 octets (exact value is provided $_{by\ the\ server}$) | 9.1 |
| RSA modulus n (and signature length) | 2048 bits | 8.1 |
| Signature Generation | RSASSA-PSS-SIGN | 8.1.1 |
| Signature Verification | RSASSA-PSS-VERIFY | 8.1.2 |

In Table 1, NIST 180-4 refers to NIST Federal Information Processing Standard (FIPS) Publication 180-4, "Secure Hash Standards (SHS)", published in March 2012. In one embodiment, the authentication procedure may be performed at the UE using asymmetric cryptography. Asymmetric cryptography uses a key pair, comprising of a private and public key. A message containing a digital signature created using the private key may be verified using the public key. In one implementation, the server has access to the private key and the UEs have access to the public key. For example, the public key may be transferred by a server to a UE by point to point means as in steps 201 and 202 of FIG. 2. Upon receiving the broadcasted message, the UE may verify the signature part of the received message (e.g. block 1208 or block 1308) using the public key and verify that the message originated from the server.

At the server, a digital signature may be computed over the entire broadcast message (that has already been ciphered if ciphering is used) by first hashing and masking the message to yield a message representation of fixed length, such as 2047 bits. The message representation may then be signed using the RSA private key generating a signature of length 2048 bits. At the UE, the digital signature may be retrieved from the broadcast message and may be converted back to an expected message representation using the RSA public key. The expected message representation may then be compared against the actual message representation derived from the received message and if they are equal, the broadcast message is verified and authenticated.

The public key and a salt length for the authentication may be provided to a UE by a server and may be assigned a unique ID by the server. The transfer of the public key and the salt length to the UE may occur using point to point LPP/LPPe before the UE begins to receive broadcast Assistance Data— e.g. as described for step 201 and 202 in FIG. 2. The server identifies the public key and salt length to be used to authenticate any received broadcast LPP or LPP/LPPe message by including, as part of the broadcast message (e.g. as part of block 1208 in FIG. 12 or block 1308 in FIG. 13), the unique identifier for the public key and salt length pair that was sent earlier point to point.

A UE may authenticate any broadcast message received that contains a digital signature if the UE already has the identified public key and salt length. If a server has earlier indicated by point to point means that authentication shall be used for a particular broadcast system, a UE may ignore any broadcast message received that does not contain the digital signature. Broadcast messages that fail authentication may also be discarded and the UE may cease using the associated broadcast system for some implementation dependent time period.

In one embodiment, when receiving a new broadcast message, a target may perform verification and decoding using the following steps (described in more detail in FIG. 14) in any order suitable:

1) Verification from broadcast control parameters that the message is not a duplicate and has a valid time and geographic area applicability.

2) Verification from broadcast control parameters that the message contains (or may contain) types of Assistance Data of interest to the UE.

3) Verification that the UE has the correct key or keys to perform authentication and deciphering when either or both of these are required.

4) Verification of any digital signature if included.

5) Deciphering of message content if ciphering was used.

6) Decoding of message content.

Figure 14:
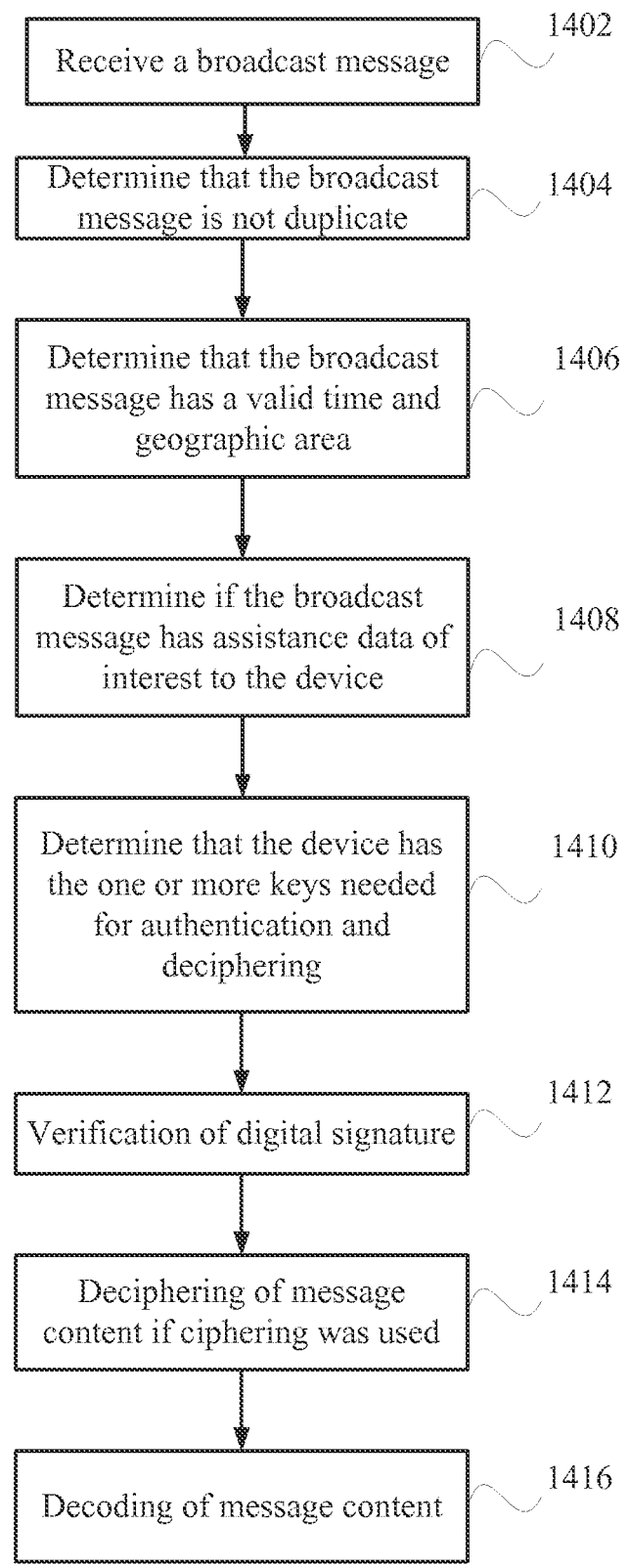
FIG. 14 illustrates a flow diagram for an exemplary embodiment for verifying a broadcast message at a device.

FIG. 14 illustrates a flow diagram for an exemplary embodiment for verifying a broadcast message already received or being received at a target UE device. The process 1400 is performed by processing logic that comprises hardware (circuitry, dedicated logic, etc.), software (such as is run on a general purpose computing system or a dedicated machine), firmware (embedded software), or any combination thereof. In one embodiment, the process 1400 is performed by one or more computer systems 2300 as described in FIG. 23. In one embodiment, the receiving and transmitting steps described below may be facilitated utilizing the transceiver 2350 described in FIG. 23.

In one embodiment, a server generates the broadcast message and is a Location Server 504. In another embodiment, the broadcast message is broadcast using a server belonging to a node, such as a Broadcast Subsystem 506. The device discussed below may represent a UE 502/2212 and perform embodiments of the invention. One or more processors may be used to decipher and authenticate messages. In some instances, a co-processor such as a crypto-processor may be used for certain functions.

As shown if FIGS. 12 and 13, the broadcast message may comprise a plurality of broadcast control parameters and a Provide Assistance Data message. An encapsulated broadcast message may be an LPP or LPP/LPPe message. The Location Server 504 may or may not select ciphering and/or digitally signing the encapsulated broadcast message. Additional message portions may be included in the encapsulated broadcast message, if the Location Server ciphers or digitally signs the encapsulated broadcast message.

The order described with respect to the flow diagram is an exemplary order and may be reordered in any suitable manner without departing from the scope of the invention. In some implementations, various steps may be performed simultaneously. The method of FIG. 14 may be performed by components of the UE 502, such as the device described in FIG. 23, using hardware, software or firmware.

At block 1402, the device receives or begins to receive a broadcast message, using the transceiver 2350. In one embodiment, the device begins processing the information, using the processor 2310, comprised in the broadcast message while still receiving portions of the broadcast message. For instance, the device may start processing portions of the broadcast control parameters and/or header associated with the broadcast message before or while receiving other portions of the broadcast message.

In some implementations, it may be advantageous to process portions of the header and/or broadcast control parameters before processing the rest of the message. For instance, for a ciphered message, the broadcast control parameters may provide more information on the protocol and keys used in ciphering the message. Similarly, for a digitally signed message, the device may retrieve the appropriate public key, convert the digital signature and also start hashing portions (or blocks) of the digital message as it is received by the device. Also, various steps for authenticating a message, such as converting the digital signature and hashing the message, may also be performed simultaneously or in parallel to each other. It may be an advantage to begin processing the message, using the processor 2310, while it is still being received in order to more quickly determine if the message is valid, of use to the UE and can be completely decoded. If one or more of these conditions is not fulfilled, the UE may cease receiving the message thereby saving radio resources and possibly permitting other activities to more quickly occur.

At block 1404, the device determines that the broadcast message is or is not a duplicate message using broadcast control parameters, at the processor 2310 using stored information at the working memory 2335 or other buffers. In an exemplary implementation, this may be determined using a timestamp or a unique message ID embedded in the header of the message. In one exemplary embodiment, a timestamp may be included in the message data that is digitally signed for the broadcast message, thus preventing an attacker from resending a message with a valid digital signature at some later time that is inconsistent with the timestamp.

At block 1406, the device determines, using the processor 2310, whether the broadcast message is applicable to the device by checking the time and geographic applicability of the broadcast message. For instance, a broadcast message with an old timestamp, an old time duration or a time duration in the future that has yet to occur or a broadcast message that belongs to a different geographic area or different area of a network may be discarded by the device. In some embodiments, a device may choose to receive and store a broadcast message carrying a time duration applicable to some future time instead of discarding the message.

At block 1408, the device determines, using the processor 2310, if the broadcast message has the Assistance Data of interest to the device. The device may determine the interest based on the Assistance Data type parameters of the broadcast control parameters associated with the broadcast message.

At block 1410, the device may determine, using the processor 2310, if the one or more keys needed for the authentication or/and deciphering steps are present on the device. In some embodiments, prior to performing this step, the device may check if the device is configured to receive authenticated and ciphered messages. The keys may be partially or fully exchanged during the point-to-point communication between the server and the device (e.g. as in steps 201 and 202 in FIG. 2). In some embodiments, a new point-to-point communication between the device and the server may be established, in response to detecting that the appropriate keys are not present at the device, for retrieving the appropriate keys.

At block 1412, the device may verify the digital signature of the message, using the processor 2310, if one is included. As shown in FIGS. 12 and 13, the digital signature may be appended or prepended to the message. In addition to the message components shown in FIGS. 12 and 13, the digital signature may also be embedded in the message. A digital signature, if included, may be computed over the entire message content. The digital signature portion may contain the associated public key identifier and may appear at the beginning of the message so that a target device may determine as soon as reception begins whether it has the correct public key and, if so, may begin the authentication process while message reception is in progress.

In one embodiment, the digital signature is converted using a public key stored at the device. The digital signature for the broadcast message may be generated using an RSA algorithm. In one implementation, the RSASSA-PSS variant of the PKCS#1 v.2.1 RSA method is used as described herein above. Prior to generating the digital signature, the server may first hash the contents of the broadcast message using a one-way function as described herein in association with Table 1. In one implementation, a Secure Hash Algorithm 1 (SHA-1) algorithm is used for hashing the broadcast message contents as referred to herein in Table 1. Once the message is hashed and masked to a shorter string (e.g. containing 2047 bits), the string is digitally signed using RSA (e.g. to create a digital signature containing 2048 bits). If the broadcast message is to be ciphered, then the contents may be ciphered before digitally signing the message. This allows the device to digitally authenticate the message before deciphering the message.

Upon receiving the broadcast message, the device digitally authenticates the message if authentication is enabled. The server and the device may negotiate through point-to-point communication prior to the broadcasting if authentication may be used as part of the communication. If the device is configured to authenticate messages, and the device receives messages without the digital signature or if the digital signature fails verification, the device may discard the message. If repeated discarding of the broadcast messages is necessitated due to failed authentication, the device may cease to receive broadcast messages via a particular broadcast system and/or in a particular area, temporarily or permanently, or may switch to a different mechanism of receiving messages. For instance, the device may switch back to a point-to-point protocol with the server or obtain new keys from the server.

In one embodiment, if the device is configured to authenticate broadcast messages and if the messages have a prepended digital signature, similar to FIG. 13, the device may begin authenticating the message while receiving the message. The device may convert the digital signature using a public key stored on the device and associated with the private key used to sign the broadcast message. The device may also hash the contents of the broadcast message and compare the hashed value against the converted value. If the values match, authentication passes and the digital signature is considered verified.

At block 1414, the message content may be deciphered if ciphering is enabled, using the processor 2310. In one embodiment, the device may discover if ciphering is enabled by inspecting the broadcast control parameters. As shown in FIGS. 12 and 13, in one embodiment, the Assistance Data included in the broadcast message is deciphered using a deciphering key value stored on the device (which may be the same as the ciphering key value used by the server or may be a public key counterpart to a private key used by the server). Contents of the broadcast message may be encrypted by the server and decrypted by the device using symmetric cryptography such as AES. One implementation of the AES algorithm is further discussed in FIG. 15. At block 1416, once the contents are authenticated and deciphered (where authentication and ciphering is enabled) the contents of the broadcast message may be decoded by the device according to the LPP/LPPe protocol definition for retrieving the location Assistance Data.

It should be appreciated that the specific blocks/steps illustrated in FIG. 14 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 1400.

Figure 15:
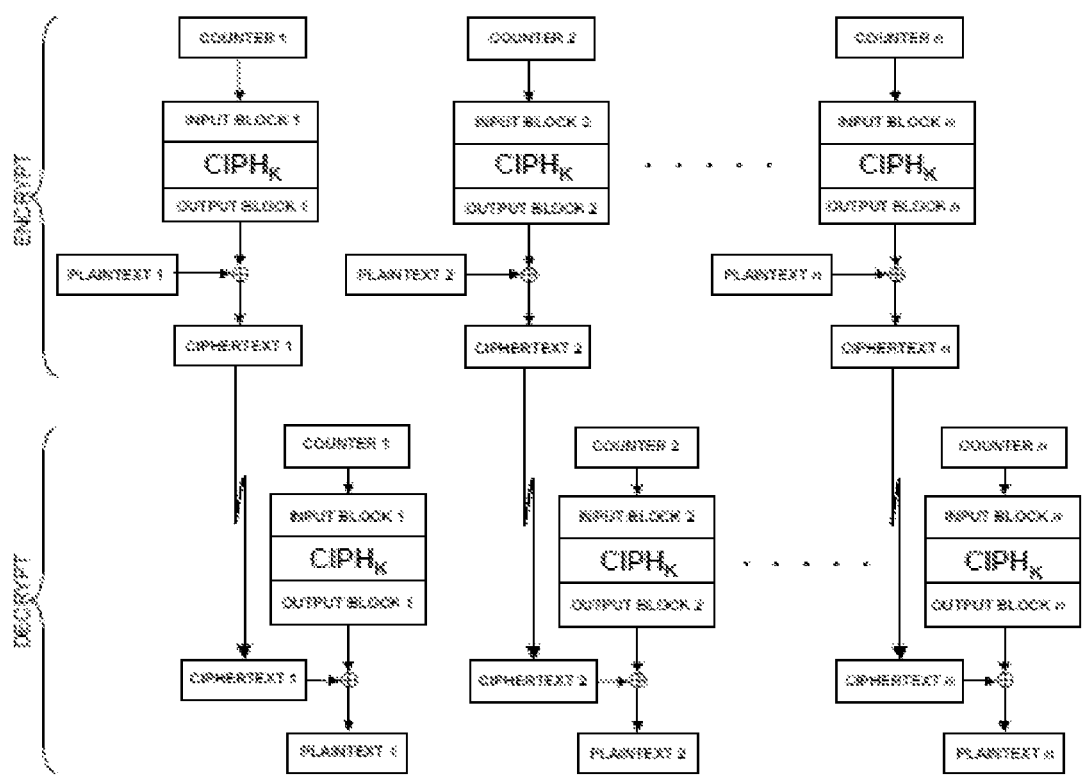
FIG. 15 describes one implementation of ciphering support.

FIG. 15 describes one implementation of AES. The following implementation provides a description of the algorithm use to cipher and decipher LPPe 1.1 broadcast Assistance Data messages. The algorithm uses AES ciphering with counter mode. AES is a block mode cipher algorithm that ciphers blocks of 128 bits at a time. However, Counter mode enables usage for a bit string that is not an exact multiple of 128 bits. Further, Counter mode enables a target (or a server) to perform most of the deciphering (or ciphering) processing independently of receipt of the data to be deciphered (or ciphered) which may enable more efficient processing—e.g. by enabling deciphering (or ciphering) to occur almost immediately when portions of data are received via broadcast (or obtained at a server). Provided counters are chosen in a non-repeating manner by the server (which is a requirement for Counter mode in some embodiments), every block of data will be ciphered in a unique manner.

The algorithm makes user of a sequence of counters <$C_1$, $C_2$, $C_3$, . . . > each containing 128 bits, where $C_1$ is specified by the server and each subsequent counter ($C_2$, $C_3$ etc.) is obtained from the previous counter by adding one modulo $2^{**}128$. Each counter $C_i$ is ciphered using the AES algorithm with a common 128 bit key to produce an output block $O_i$ of 128 bits. To perform ciphering of a broadcast message, the LPP/LPPe message is divided into blocks $B_1$, $B_2$, . . . $B_n$ of 128 bits each, except for the last block $B_n$ which may contain fewer than 128 bits. The ciphered message is obtained as a sequence of n blocks containing 128 bits each (except possibly for the last block) given by ($O_1$ XOR $B_1$), ($O_2$ XOR $B_2$), . . . ($O_n$ XOR $B_n$), where XOR denotes bitwise exclusive OR. In the case of the last block, if $B_n$ contains m bits (m<128), then the m most significant bits of $O_n$ would be used for the exclusive OR. Deciphering is performed in the same way except that the blocks $B_1$, $B_2$, . . . $B_n$ are now obtained from the ciphered message and the result of the exclusive OR operations yields the original unciphered message.

Abstract Syntax Notation One (ASN.1) Tables:

FIGS. 16A, 16B, 16C, 16D and 16E apply to broadcast of LPP and LPP/LPPe Provide Assistance Data messages and define exemplary possible broadcast restrictions and labeling applicable to the content of broadcast Assistance Data and limitations on the areas within which certain types of Assistance Data may be broadcast. FIGS. 16A, 16B, 16C, 16D and 16E also provide a means of labeling different types of Assistance Data. The labels may be used both within LPPe and by a broadcast system to concisely advertise support for particular types of Assistance Data and/or to provide broadcast scheduling information.

FIG. 16A and FIG. 16B show the different types of Assistance Data for LPP that may be broadcast where each Assistance Data type is referred to using its ASN.1 parameter name in the OMA LPPe version 1.1 TS. For each Assistance Data type, a possible area limitation is shown if the Assistance Data is only valid within a restricted area. A server may broadcast Assistance Data outside the area limitation if it is preferred to provide target devices with Assistance Data for a wider geographic area although there is no guarantee that the data will always be usable in that case. Other possible restrictions for Assistance Data are also shown where these exist—e.g. any possible restrictions on content. Assistance data that is time sensitive (e.g. GNSS time, GNSS real time integrity, GNSS acquisition assistance) may be updated as needed by the server and stale data may also be removed. For Assistance Data that includes an explicit validity area, broadcast outside the validity area may be allowed and a target may then verify presence within the validity area before using the data.

FIG. 16A and FIG. 16B also shows labels that may be used within LPPe and by a broadcast system to refer to particular types of Assistance Data—e.g. when indicating broadcast support for different types of Assistance Data within LPPe or when indicating which Assistance Data types are being broadcast by a broadcast system. A label is specified as a sequence of n (n=1 to 4) numerical elements separated by periods—e.g. 2, 2.1, 2.1.3, 2.1.3.5—where n is the nesting level of the labeled data item.

In FIGS. 16A and 16B, the nesting level of any Assistance Data type is indicated using a ">" symbol in the first column where the number of concatenated ">" symbols m shown for any data item and its associated label indicates that its nesting level is m+1 where m is in the range 0 to 3. The order of data items in FIGS. 16A and 16B may follow the ASN.1 definition in the LPPe version 1.1 TS which means that the parent data item for any nested data item at level n is the closest preceding data item in the table at level n−1. Labels are shown in column 1 and show only the final elements, since preceding elements can be inferred from the final elements for the parent data items. As an example, the Assistance Data type otdoa-ProvideAssistanceData in FIG. 16A has a nesting level of 1 and label of 2; the data type otdoa-NeighbourCellInfo (which is nested within and one level deeper than otdoa-ProvideAssistanceData in FIG. 16A) has a nesting level of 2 and a label of 2.2; and the Assistance Data type gnss-DataBitAssistance in FIG. 16A has a nesting level of 4 and a label of 3.2.N.5 where N (N=1 to 8) indicates the particular GNSS or SBAS system to which it applies.

FIGS. 16C, 16D, and 16E show the different types of Assistance Data for LPPe version 1.1 that may be broadcast, with associated area limitations and other restrictions, where each data type is referred to using its ASN.1 parameter name as defined in the LPPe version 1.1 TS. The conventions used to define nesting levels and labels are as described above in association with FIGS. 16A and 16B.

The possible restrictions and labeling shown in FIGS. 16A, 16B, 16C, 16D and 16E are examples for the LPP and LPP/LPPe positioning protocols and may be replaced by other restrictions or other means of labeling in other embodiments.

To support the novel encapsulation, data type labeling, point to point assistance, ciphering and authentication as applicable to the LPP/LPPe protocol, new LPP/LPPe extensions may be defined in some implantations. FIGS. 17A, 17B, 18, 19A, 19B, 20A, 20B, 21A, 21B, 21C and 21D are examples of a new LPPe broadcast message extensions to support point to point Assistance Data related to broadcast (e.g. as used in steps 201 and 202 of FIG. 2) and broadcasting with encapsulation, ciphering and authentication (e.g. as described in association with FIG. 13). Each figure shows the parameter content of a particular message extension in the form of a table, where the parameter content refers to new parameters added to an LPPe message to support broadcast. In each table, each row below the initial header row describes one parameter in the message extension, with the parameter name shown in the first column, the corresponding LPPe ASN.1 data type name shown in the second column, an indication of whether the parameter is optional shown in the third column (with blank entries here for parameters that are mandatory) and a description of the parameter meaning and usage given in the fourth column. The nesting level of each parameter within the message extension is shown using greater than symbols (">") in the first column where the number of consecutive ">" symbols plus one gives the nesting level. Thus, for example, a parameter with name ">>>example" would have a nesting level of 4. Any nested parameter P in a table is contained within the parameter closest to it and higher up in the table that has a nesting level one lower than that of P. Parameters with the lowest nesting level (of one) are directly contained within the message extension only. Nested parameters may only be included in a message extension when the parameter within which they are contained is also present in the message. When this condition occurs, a mandatory nested parameter will be present whereas an optional nested parameter may or may not be present. The order of parameters in the figures may closely follow the ASN.1 definition for OMA LPPe version 1.1. In some embodiments, whether particular parameters are mandatory or optional may be different to that shown in these figures.

FIGS. 17A and 17B illustrates an exemplary Broadcast Container used in embodiments of the invention. The Information Element (IE) OMA-LPPe-ver1-1-BroadcastContainer, shown in FIGS. 17A and 17B, may be used to encapsulate ciphered or unciphered LPP and LPP/LPPe Provide Assistance Data messages for delivery via broadcast. The use of this container enables transfer of information needed for ciphering support (e.g. cipher key identifier), message authentication (e.g. public key identifier and digital signature) and information that a UE can use to quickly identify the types of information being broadcast, the applicable area and time period and whether the data duplicates data already received. A UE that identifies a duplicate broadcast message or Assistance Data that is not of interest, not applicable or not supported can cease reception without the need to receive, decipher, decode and possibly authenticate the encapsulated LPP or LPP/LPPe message. Except for the encapsulated LPP or LPP/LPPe message, the parameters (e.g. control parameters) in an OMA-LPPe-ver1-1-Broadcast-Container may not need to be ciphered.

FIG. 18 illustrates exemplary enhancements in the form of additional parameters to the LPP/LPPe Request Capabilities message that enable this message to request capabilities related to support of broadcast of Assistance Data. Step 204 of FIG. 2 represents an exemplary Request Capabilities message from the Location Server 215 to the UE 220. The message may also be sent (though not shown in FIG. 2) from the UE 220 to the Location Server 215. Similarly, FIGS. 19A and 19B illustrates exemplary enhancements in the form of additional parameters to the LPP/LPPe Provide Capabilities message that enable this message to provide capabilities related to support of broadcast of Assistance Data. Step 205 of FIG. 2 represents an exemplary Provide Capabilities message from the UE 220 to the Location Server 215. The message may also be sent (though not shown in FIG. 2) from the Location Server 215 to the UE 220. FIGS. 20A and 20B illustrate exemplary enhancements in the form of additional parameters to the LPP/LPPe Request Assistance Data message that enable this message to request (in a point to point manner) Assistance Data related to support of broadcast of Assistance Data. Step 201 of FIG. 2 and step 521 of FIG. 5B represent exemplary Request Assistance Data messages from the UE 220/502 to the Location Server 215/504. FIGS. 21A, 21B, 21C and 21D illustrate exemplary enhancements in the form of additional parameters to the LPP/LPPe Provide Assistance Data message that enable this message to provide (in a point to point manner) Assistance Data related to support of broadcast of Assistance Data. Step 202 of FIG. 2 and step 522 of FIG. 5B represent exemplary Provide Assistance Data messages from the Location Server 215/504 to the UE 220/502.

Figure 22:
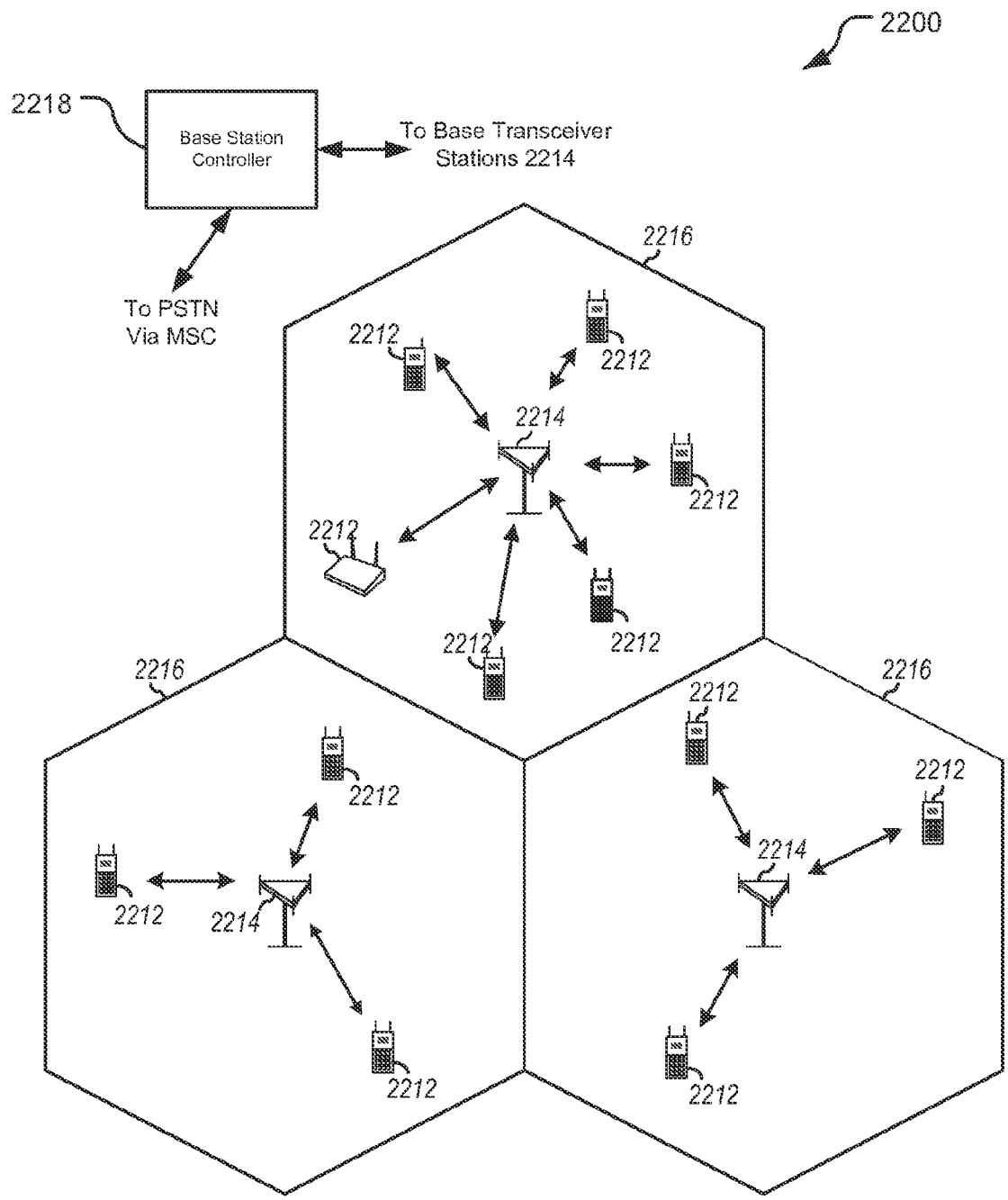
FIG. 22 is a schematic diagram of a wireless telecommunication system.

In other embodiments, message extensions partly or completely different to those exemplified in FIGS. 17A, 17B, 18, 19A, 19B, 20A, 20B, 21A, 21B, 21C, 21D may be used to support broadcasting of LPP and LPP/LPPe PAD messages Referring to FIG. 22, a wireless communication system 2200 includes various devices, such as user equipment 2212 (UE), base transceiver stations (BTSs) 2214 disposed in cells 2216, and a base station controller (BSC) 2218. The system 2200 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 2214 can wirelessly communicate with the UEs 2212 via antennas. Each of the BTSs 2214 may also be referred to as a base station, an access point, an access node (AN), a Node B, an evolved Node B (eNodeB), etc. The BTSs 2214 are configured to communicate with the UEs 2212 under the control of the BSC 2218 via multiple carriers. Each of the BTSs 2214 can provide communication coverage for a respective geographic area, here the respective cells 2216. Each of the cells 2216 of the BTSs 2214 is partitioned into multiple sectors as a function of the base station antennas. In some embodiments, one or more of the BTSs 2214 are implemented in the RAN 508 illustrated in FIG. 5A and FIG. 5B. Further, elements of FIGS. 2, 6, and 8 and other elements of FIG. 5A and FIG. 5B described above may be included in the system 2210. Although the server and Location Server discussed above and illustrated in FIGS. 2, 5A, 5B, 6, and 8 are not illustrated in FIG. 22, the Location Server may be in communication with the BTSs 2214 and/or the BSC 2218. For example, a type of SMLC implemented as the Location Server may be in communication with the BSC 2218, directly or via a gateway. In some embodiments, one or more networks separate at least two of the elements illustrated in FIG. 22, and/or separate elements illustrated in FIG. 22 from elements discussed above and/or illustrated with respect to FIGS. 2, 5A, 5B, 6, and 8.

The system 22 may include only macro base stations 2214 or it can have base stations 2214 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The UEs 2212 can be dispersed throughout the cells 2216. The UEs 2212 may be referred to as terminals, mobile stations, mobile devices, user equipment (UE), subscriber units, etc. The UEs 2212 shown in FIG. 22 include mobile telephones, personal digital assistants (PDAs) and vehicular navigation and/or communication systems, but can also include wireless routers, other handheld devices, netbooks, notebook computers, etc.

Figure 23:
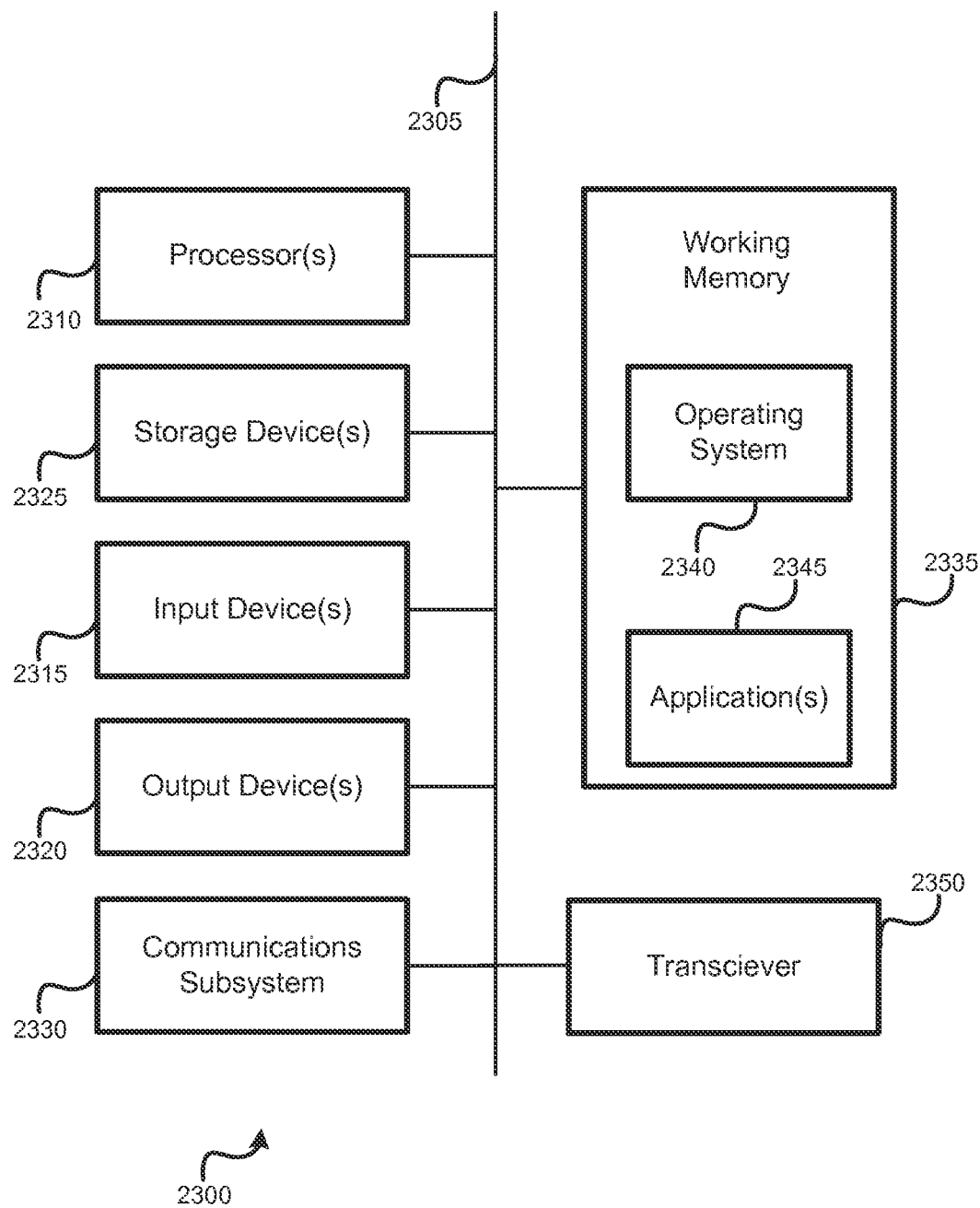
FIG. 23 is a block diagram of components of a computing device used in embodiments of the invention.

A computer system as illustrated in FIG. 23 may be incorporated as part of the previously described entities shown and discussed in reference to FIGS. 2-22. For example, computer system 2300 may be capable or, adapted to and configured to represent some or all of the components of the UE (referenced as 220 in FIG. 2, 502 in FIG. 5A, 5B, and as 2212 in FIG. 22), Location Server (referenced as 215 in FIG. 2, 504 in FIG. 5A, 5B), one or more servers implemented as part of the Broadcast Subsystem 506, such as the Gateway 510 and RAN 508 or any other computing devices from FIG. 22, such as Base Station Controller 2218 or BTSs 2214 or any other computing devices utilized in enabling embodiments of the invention. FIG. 23 provides a schematic illustration of one embodiment of a computer system 2300 that can perform the methods provided by various other embodiments, as described herein, and/or can function of the devices, such as the UE, Location Server and the servers implemented as the Broadcasting Subsystem. It should be noted that FIG. 23 is meant only to provide a generalized illustration of various components, any or all of which may be utilized as appropriate. FIG. 23, therefore, broadly illustrates how individual system elements may be implemented in a relatively separated or relatively more integrated manner.

The computer system 2300 is shown comprising hardware elements that can be electrically coupled via a bus 2305 (or may otherwise be in communication, as appropriate). The hardware elements may include one or more processors 2310, including without limitation one or more general-purpose processors and/or one or more special-purpose processors (such as digital signal processing chips, graphics acceleration processors, and/or the like); one or more input devices 2315, which can include without limitation a mouse, a keyboard and/or the like; and one or more output devices 2320, which can include without limitation a display device, a printer and/or the like.

The computer system 2300 may further include (and/or be in communication with) one or more storage devices 2325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 2300 may also include a communications subsystem 2330, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 2330 may permit data to be exchanged with a network (such as the network described below, to name one example), other computer systems, and/or any other devices described herein. In many embodiments, the computer system 2300 will further comprise a working memory 2335, which can include a RAM or ROM device, as described above.

The computer system 2300 may also include a transceiver 2350 for transmitting and receiving messages. The transceiver 2350 may comprise components, such as a transmitter and a receiver which are combined and share common circuitry or a single housing or may be separate. The transceiver 2350 may be modified to communicate with one or more network configurations, such as GSM, a CDMA, a WCDMA, a CMDA2000 1xRTT, or a LTE network.

The computer system 2300 also can comprise software elements, shown as being currently located within the working memory 2335, including an operating system 2340, device drivers, executable libraries, and/or other code, such as one or more application programs 2345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 2325 described above. In some cases, the storage medium might be incorporated within a computer system, such as the system 2100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 2300 and/or might take the form of source and/or installable code, which, upon compilation and/or installation on the computer system 2300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 2300) to perform methods in accordance with various embodiments of the invention. According to a set of embodiments, some or all of the procedures of such methods are performed by the computer system 2300 in response to processor 2310 executing one or more sequences of one or more instructions (which might be incorporated into the operating system 2340 and/or other code, such as an application program 2345) contained in the working memory 2335. Such instructions may be read into the working memory 2335 from another computer-readable medium, such as one or more of the storage device(s) 2325. Merely by way of example, execution of the sequences of instructions contained in the working memory 2335 might cause the processor(s) 2310 to perform one or more procedures of the methods described herein.

The terms "machine-readable medium" and "computer-readable medium," as used herein, refer to any medium that participates in providing data that causes a machine to operate in a specific fashion. Computer readable storage medium does not refer to transitory propagating signals. In an embodiment implemented using the computer system 2300, various computer-readable media might be involved in providing instructions/code to processor(s) 2310 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 2325. Volatile media include, without limitation, dynamic memory, such as the working memory 2335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the embodiments described herein. Also, a number of steps may be undertaken before, during, or after the above elements are considered. Accordingly, the above description does not bound the scope of the claims.

The description herein and attached figures describe a general method or protocol of broadcasting communications that can be applied to any number of networks and/or architectures. Thus, although the above description refers to LPP/LPPe, the above examples are not limited to the enumerated embodiments. Those of skill in the art will appreciate how to extend the concepts described herein to other systems or architectures. For example, user plane location-based services may be combined with any number of broadcast services according to the description herein. In some embodiments, a user and/or device may subscribe to any number of broadcast services or receive localized Assistance Data pursuant to the description herein. In this way, a user or device is not required to receive a generic set of data, but may in addition or instead receive regional data or other information that varies by region.

Further, the description herein and attached figures provide the ability to broadcast location Assistance Data in the form of LPP and LPP/LPPe messages. The description and figures further enable a common and extensible standard for location assistance broadcast that is aligned with point to point location support using LPP/LPPe and that can be used with any broadcast mechanism (e.g. BCAST, (e)MBMS, SIBs etc.). In some embodiments, charging for location assistance via broadcast is possible via ciphering. In some embodiments, support of positioning by user devices will be enhanced due to faster access to Assistance Data. In some embodiments, network loading can be reduced in comparison to point to point assistance.

One embodiment for accomplishing the benefits herein includes a UE or SET using LPP/LPPe point to point over SUPL (or possibly control plane with LTE access) to obtain information on broadcast Assistance Data availability and any decipher keys, for example form a Location Server. The embodiment may further include a Location Server packaging location Assistance Data into LPP or LPP/LPPe Provide Assistance Data messages, which are sent to a gateway (e.g. eMBMS BM-SC) or other node (e.g. MME for LTE SIB broadcast) for onward transfer to a RAN for broadcast from network base stations.

The description herein and/or attached figures may be implemented or described in a standard in some embodiments, for example to increase interoperability between devices. For example, OMA may create a new version of LPPe to enable Assistance Data to be broadcast in a standard manner and to provide a UE or SET with associated information (e.g. decipher keys). Use of LPPe to support broadcast Assistance Data may avoid additional impacts to encode Assistance Data in a different way. It may also enable broadcast using any system (e.g. not just SIBs). Further, LPPe may be used point to point (e.g. with SUPL) to provide pre-information to a UE or SET—e.g. deciphering keys and/or availability and types of broadcast Assistance Data in different areas.

In addition to the benefits above, for example supporting a wide range of access types, LPPe in combination with LPP can support a wide range of positioning methods including A-GNSS (both code phase and high accuracy carrier phase variants), OTDOA for LTE and WCDMA, Enhanced Observed Time Difference (E-OTD), enhanced cell ID (for each wireless access type including WiFi), short range node associated positioning and use of sensors. These methods may be used in terminal assisted and terminal based modes. The terminal based mode may be useful for supporting applications on the terminal and functions, for example when the terminal already has needed or desired Assistance Data or can rapidly acquire Assistance Data from a network server (e.g. SUPL SLP or LTE E-SMLC) via broadcast.

Implementations or embodiments of the description herein and/or the attached figures may enable (A) broadcast of Assistance Data within LPP/LPPe Provide Assistance Data messages, and/or (B) the ability for a terminal to obtain information from a Location Server relevant to broadcasting in (A). Such implementations or embodiments may include provision of deciphering keys to a terminal and information on broadcast availability (e.g. from which system(s) and in which areas).

Implementations or embodiments of the description herein and/or the attached figures may ensure LPP and LPP/LPPe Provide Assistance Data messages can be broadcast in an unsolicited manner and containing any data that may be associated with local base stations and WiFi APs (examples include coordinates and GNSS timing association). Implementations or embodiments of the description herein and/or the attached figures may also enable labeling of different types of Assistance Data by any broadcast system that will support LPP and/or LPP/LPPe Assistance Data broadcast. For example, labeling could be achieved by assigning numeric identifiers to different types or different combinations of types of Assistance Data (e.g. assign type 1 to A-GNSS ephemeris, type 2 to A-GNSS almanac, type 3 to WiFi assistance etc.). The labeling may enable a broadcast system to indicate to terminals the types of Assistance Data being broadcast so a terminal can decide which data to receive and decode.

Implementations or embodiments of the description herein and/or the attached figures may further enable a terminal to request Assistance Data from a Location Server (in a point to point manner) that is applicable to broadcast. Such Assistance Data may support ciphering of broadcast Assistance Data and may provide information on where and how Assistance Data is being broadcast (e.g. a geographic area or set of cell sites within which location Assistance Data is broadcast and identification of the broadcast system) as well as identifying the type or types of Assistance Data that are broadcast. In addition, implementations or embodiments of the description herein and/or the attached figures may define terminal and server capabilities associated with broadcast Assistance Data support; provide guidance for support of LPPe broadcast by specific broadcast systems such as LTE SIBs, BCAST, and eMBMS; and/or provide guidance on how servers can create LPP and LPP/LPPe broadcast messages, manage scheduling, and/or change broadcast content. By receiving location Assistance Data transferred via broadcast, terminals can accumulate Assistance Data in advance and avoid both delay and use of network signaling when a location service is needed or desired. This may be beneficial, for example, when a terminal loses network access and/or to alleviate server congestion.

Embodiments of the invention as described above may use various protocol messages. In one embodiment, parameters for messages pertaining to the LPPe standard are added to support embodiments of the invention for broadcasting location Assistance Data. The parameters may be added to the OMA LPPe standard, but are not limited to any particular standard. Thus, the messages described in FIGS. 2-21 may use the LPP and LPP/LPPe messages as described above, or the messages described below may be implemented in broadcast data implemented independent of an LPPe message or standard.

Implementations or embodiments of the description herein and/or the attached figures may allow operators to deploy an improved location service that can be available to both home users and roamers. Charging for the service is possible using ciphering. The service can provide augmentation of other broadcast services from an operator.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "capable of", "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for broadcasting data, comprising:
sending a first message from a Location Server point to point to a device using a positioning protocol, wherein the first message comprises information associated with broadcast messaging for subsequent broadcast communication from the Location Server to the device; and
broadcasting one or more Assistance Data (AD) messages from the Location Server to the device based on the information associated with the broadcast messaging.

2. The method of claim 1, wherein the information associated with the broadcast messaging comprises at least one of deciphering keys, deciphering key IDs, AD Types, AD Type IDs, scheduling of one or more AD messages, broadcast systems, broadcast areas and authentication information.

3. The method of claim 1, wherein the sending of the information associated with the broadcast messaging point to point is in response to a request received at the Location Server from the device point to point using the positioning protocol.

4. The method of claim 1, wherein the positioning protocol is an LTE Positioning Protocol (LPP) protocol combined with an LPP extensions (LPPe) protocol.

5. The method of claim 1, wherein the one or more AD messages use one or more of:
ciphering described in the information associated with the broadcast messaging sent point to point;
scheduling described in the information associated with the broadcast messaging sent point to point;
the information associated with the broadcast messaging to identify where and how the one or more AD messages are being broadcast, wherein the information identifying where and how the one or more AD messages are being broadcast comprises one or more of a geographic area within which the one or more AD messages are being broadcast, a set of cell sites within which the one or more AD messages being broadcast, a period of time for a transmission of the one or more AD messages, a validity period for the one or more AD messages or a system broadcasting the one or more AD messages; or
information identifying a type of the AD being broadcast described in the information associated with the broadcast messaging sent point to point.

6. The method of claim 1, wherein at least a portion of the one or more AD messages are ciphered, wherein the one or more AD messages are encapsulated for ciphering and wherein the one or more AD messages are ciphered using information associated with the broadcast messaging sent point to point.

7. The method of claim 1, wherein broadcasting the AD from the Location Server to the device comprises transmitting the one or more AD messages to a Broadcast Subsystem for broadcast to the device.

8. The method of claim 7, further comprising exchanging information with the Broadcast Subsystem including one or more of exchanging broadcast capabilities, receiving a request for a specific AD from the Broadcast Subsystem at the Location Server, receiving an indication from the Broadcast Subsystem at the Location Server on a current or future available broadcast capacity, or receiving an acknowledgement for the one or more AD messages successfully transferred to the Broadcast Subsystem from the Location server.

9. The method of claim 1, further comprising the Location Server associating each of the one or more AD messages with a unique message ID, wherein no more than one AD message is associated with the same unique message ID within a message validity period.

10. The method of claim 1, further comprising assigning a label to each of a plurality of broadcast AD types in an AD message from the Location Server to the device.

11. The method of claim 1, further comprising obtaining location AD associated with an access node or Global Navigation Satellite Systems (GNSS).

12. The method of claim 11, wherein the AD is obtained using Operations and Maintenance (O&M) signaling.

13. The method of claim 11, further comprising updating the one or more AD messages at the Location Server when a plurality of contents of the one or more AD messages need to be changed.

14. The method of claim 1, wherein contents or/and scheduling of the one or more AD messages are adapted based on a type and a number of point to point AD requests from a plurality of devices and/or a type of access network available in a local area.

15. The method of claim 1, wherein a broadcasting frequency of the AD is increased in response to one or more of:
determining that an increased number of devices are requesting information associated with the broadcast messaging point to point;
determining that an increased number of location requests from a plurality of devices is high;
determining that a current time is similar to a time of day associated with statistically high activity;
determining that a density of attached devices for a geographic area is high; and
determining that the Location Server is congested by point to point location service requests or by scarcity of resources.

16. The method of claim 1, wherein content for the one or more AD messages is adapted based on a level of device support detected for the device.

17. The method of claim 16, wherein the content for one or more AD messages comprises the AD for Assisted-Global Navigation Satellite System (A-GNSS) and the level of device support comprises the device supporting A-GNSS, and a frequency of the one or more AD messages is increased in response to detecting a large number of attached devices that support device based A-GNSS.

18. A method for receiving Assistance Data (AD), comprising:
receiving a first message from a Location Server point to point at a device using a positioning protocol, wherein the first message comprises information associated with broadcast messaging for subsequent broadcast communication from the Location Server to the device;
receiving one or more AD messages broadcasted from the Location Server according to the information associated with the broadcast messaging.

19. The method of claim 18, wherein the information associated with the broadcast messaging comprises at least one of deciphering keys, deciphering key IDs, AD Types, AD Type IDs, scheduling of one or more AD messages, broadcast systems, broadcast areas and authentication information.

20. The method of claim 18, wherein the positioning protocol is an LTE Positioning Protocol (LPP) protocol combined with an LPP extensions (LPPe) protocol.

21. The method of claim 18, wherein the information associated with the broadcast messaging comprises information identifying where and how one or more AD messages are being broadcast, wherein the information identifying where and how the one or more AD messages are being broadcast comprises one or more of a geographic area within which the one or more AD messages being broadcast, a set of cell sites within which the one or more AD messages are being broadcast, a period of time for a transmission of the one or more AD messages, a validity period for the one or more AD messages, a system broadcasting the one or more AD messages or a type of the AD being broadcast.

22. The method of claim 18, wherein the one or more AD messages are received through a Broadcast Subsystem.

23. A server for broadcasting data, comprising
a transceiver configured to:
send a first message from a server point to point to a device using a positioning protocol, wherein the first message comprises information associated with broadcast messaging for subsequent broadcast communication from the Location Server to the device; and
broadcast one or more Assistance Data (AD) messages from the server to the device; and
a processor configured to generate the one or more AD messages according to the information associated with the broadcast messaging.

24. The server of claim 23, wherein the information associated with the broadcast messaging comprises at least one of deciphering keys, deciphering key IDs, AD Types, AD Type IDs, scheduling of AD, broadcast systems, broadcast areas and authentication information.

25. The server of claim 23, wherein the sending of the information associated with the broadcast messaging point to point is in response to a request received at the server from the device point to point using the positioning protocol.

26. The server of claim 23, wherein the positioning protocol is an LTE Positioning Protocol (LPP) protocol combined with an LPP extensions (LPPe) protocol.

27. The server of claim 23, wherein the one or more AD messages are generated by the processor to include one or more of:
ciphering described in the information associated with the broadcast messaging sent point to point;
scheduling described in the information associated with the broadcast messaging sent point to point;
the information associated with the broadcast messaging to identify where and how the one or more AD messages are being broadcast, wherein the information identifying where and how the one or more AD messages are being broadcast comprises one or more of a geographic area within which the one or more AD messages are being broadcast, a set of cell sites within which the one or more AD messages being broadcast, a period of time for a transmission of the one or more AD messages, a validity period for the one or more AD messages or a system broadcasting the one or more AD messages; or
information identifying a type of the AD being broadcast described in the information associated with the broadcast messaging sent point to point.

28. The server of claim 23, wherein at least a portion of the one or more AD messages generated by the processor is ciphered, wherein the one or more AD messages are encapsulated for ciphering and wherein the one or more AD messages are ciphered using information associated with the broadcast messaging sent point to point.

29. The server of claim 23, wherein broadcasting the AD from the server using the transceiver to the device comprises transmitting the one or more AD messages to a Broadcast Subsystem for broadcast to the device.

30. The server of claim 23, wherein the transceiver is configured to exchange information with the Broadcast Subsystem, the exchange including one or more of exchanging broadcast capabilities, receiving a request for a specific AD from the Broadcast Subsystem, receiving an indication from the Broadcast Subsystem at the server on a current or future available broadcast capacity, or receiving an acknowledgement for the AD successfully transferred to the Broadcast Subsystem from the server.

31. The server of claim 30, wherein the processor at the server is configured to associate each of the one or more AD messages with a unique message ID, wherein no more than one AD message is associated with the same unique message ID within a message validity period.

32. The server of claim 23, wherein the processor is configured to assign a label to each of a plurality of broadcast AD types in an AD message from the server to the device.

33. The server of claim 23, wherein contents or/and scheduling of the one or more AD messages are adapted, by the processor, based on a type and a number of point to point AD requests from a plurality of devices and/or a type of access network available in a local area.

34. The server of claim 23, wherein a broadcasting frequency of the AD is increased, by the processor through the transceiver, in response to one or more of:
determining that an increased number of devices are requesting information associated with the broadcast messaging point to point;
determining an increased number of location requests from a plurality of devices is high;
determining that a current time is similar to a time of day associated with statistically high activity;
determining that a density of attached devices for a geographic area is high; and
determining that the server is congested by point to point location service requests or by scarcity of resources.

35. The server of claim 23, wherein content for the one or more AD messages is adapted, by the processor, based on a level of device support detected for the device.

36. A device for receiving Assistance Data (AD), comprising
a transceiver configured to:
receive a first message from a Location Server point to point using a positioning protocol, wherein the first message comprises information associated with broadcast messaging for subsequent broadcast communication from the Location Server to the device; and
receive one or more AD messages from the Location Server; and
a processor configured to:
process the one or more AD messages according to the information associated with broadcast messaging.

37. The device of claim 36, wherein the information associated with the broadcast messaging comprises at least one of deciphering keys, deciphering key IDs, AD Types, AD Type IDs, scheduling of AD, broadcast systems, broadcast areas and authentication information.

38. The device of claim 36, wherein the positioning protocol is an LTE Positioning Protocol extensions (LPPe) protocol.

39. The device of claim 36, wherein the information associated with the broadcast messaging comprises information identifying where and how the one or more AD messages are being broadcast, and wherein the information identifying where and how the one or more AD messages are being broadcast comprises one or more of a geographic area within which the one or more AD messages are being broadcast, a set of cell sites within which the one or more AD messages being broadcast, a period of time for a transmission of the one or more AD messages, a validity period for the one or more AD messages or a system broadcasting the one or more AD messages.

40. The device of claim 36, wherein the information associated with the broadcast messaging comprises information identifying a type of the AD being broadcast.

41. The device of claim 36, wherein the one or more AD messages from the Location Server are received through a Broadcast Subsystem.

42. A non-transitory computer readable storage medium, wherein the non-transitory computer readable storage medium comprises instructions executable by a processor, the instructions comprising instructions to:
  send a first message from a Location Server point to point to a device using a positioning protocol, wherein the first message comprises information associated with broadcast messaging for subsequent broadcast communication from the Location Server to the device; and
  broadcast one or more Assistance Data (AD) messages from the Location Server to the device according to the information associated with the broadcast messaging.

43. A non-transitory computer readable storage medium, wherein the non-transitory computer readable storage medium comprises instructions executable by a processor, the instructions comprising instructions to:
  receive a first message from a Location Server point to point to a device using a positioning protocol, wherein the first message comprises information associated with broadcast messaging for subsequent broadcast communication from the Location Server to the device; and
  receive one or more AD messages broadcasted from the Location Server according to the information associated with the broadcast messaging.

44. An apparatus, comprising:
  means for sending a first message from a Location Server point to point to a device using a positioning protocol, wherein the first message comprises information associated with broadcast messaging for subsequent broadcast communication from the Location Server to the device; and
  means for broadcasting one or more Assistance Data (AD) messages from the server to the device according to the information associated with the broadcast messaging.

45. A device, comprising:
  means for receiving a first message from a Location Server point to point to the device using a positioning protocol, wherein the first message comprises information associated with broadcast messaging for subsequent broadcast communication from the Location Server to the device; and
  means for receiving one or more AD messages broadcasted from the Location Server according to the information associated with the broadcast messaging.

46. The method of claim 1, further comprising receiving, at the Location Server, location estimate information for the location of the device, wherein the location estimate information is generated by the device using the one or more broadcasted AD messages.

47. The method of claim 18, further comprising:
  generating location estimate information using one or more AD messages broadcasted from the Location Server; and
  sending the location estimate information to the Location Server.

* * * * *